(12) United States Patent
Dong et al.

(10) Patent No.: US 12,407,768 B2
(45) Date of Patent: Sep. 2, 2025

(54) FOLDABLE MECHANISM AND FOLDABLE TERMINAL

(71) Applicant: Honor Device Co., Ltd., Shenzhen (CN)

(72) Inventors: Shaohong Dong, Shenzhen (CN); Guimin Chen, Shenzhen (CN); Ruihao Chen, Shenzhen (CN); Kaifang Jin, Shenzhen (CN); Changfu Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/029,474

(22) PCT Filed: Dec. 29, 2022

(86) PCT No.: PCT/CN2022/143394
§ 371 (c)(1),
(2) Date: Mar. 30, 2023

(87) PCT Pub. No.: WO2023/185167
PCT Pub. Date: Oct. 5, 2023

(65) Prior Publication Data
US 2024/0364800 A1 Oct. 31, 2024

(30) Foreign Application Priority Data
Mar. 31, 2022 (CN) .......................... 202210334431.6

(51) Int. Cl.
*G06F 1/16* (2006.01)
*H04M 1/02* (2006.01)

(52) U.S. Cl.
CPC .......... *H04M 1/022* (2013.01); *G06F 1/1616* (2013.01); *G06F 1/1681* (2013.01)

(58) Field of Classification Search
None
See application file for complete search history.

(56) References Cited

U.S. PATENT DOCUMENTS

| 11,336,759 | B2 | 5/2022 | Liao et al. |
| 11,917,780 | B2 * | 2/2024 | Caplow-Munro ... H05K 5/0226 |

(Continued)

FOREIGN PATENT DOCUMENTS

| CN | 111698355 A | 9/2020 |
| CN | 112449036 A | 3/2021 |

(Continued)

*Primary Examiner* — Imani N Hayman
*Assistant Examiner* — Rashen E Morrison
(74) *Attorney, Agent, or Firm* — Slater Matsil, LLP

(57) ABSTRACT

A foldable mechanism and a foldable terminal are provided. The foldable mechanism includes a base, a pressing plate assembly, and a flexible support plate, where the pressing plate assembly is mounted on the base, and the flexible support plate is mounted on the pressing plate assembly. The pressing plate assembly includes a first pressing plate swing arm, and a rotating portion of the first pressing plate swing arm is rotatably connected to the base, to implement a rotatable connection between the first pressing plate swing arm and the base. The flexible support plate is mounted on the first pressing plate swing arm and may bend under driving of the first pressing plate swing arm, and a bending direction of the flexible support plate is parallel to a rotation center of the first pressing plate swing arm relative to the base.

20 Claims, 24 Drawing Sheets

(56) References Cited

U.S. PATENT DOCUMENTS

| | | | |
|---|---|---|---|
| 11,953,949 B2* | 4/2024 | An | H05K 5/0226 |
| 12,007,808 B2* | 6/2024 | Park | G06F 1/1618 |
| 12,133,344 B2* | 10/2024 | Chang | F16C 11/04 |
| 2019/0278338 A1* | 9/2019 | Siddiqui | G06F 1/1656 |
| 2021/0368032 A1 | 11/2021 | Liao et al. | |
| 2022/0104370 A1* | 3/2022 | Wu | H05K 5/0017 |
| 2022/0303371 A1* | 9/2022 | Liao | H04M 1/0268 |
| 2023/0164253 A1 | 5/2023 | Xu et al. | |
| 2023/0403347 A1* | 12/2023 | Liu | H04M 1/022 |
| 2024/0004430 A1 | 1/2024 | Zhao et al. | |

FOREIGN PATENT DOCUMENTS

| | | |
|---|---|---|
| CN | 113067923 A | 7/2021 |
| CN | 113067924 A | 7/2021 |
| CN | 113194183 A | 7/2021 |
| CN | 113315860 A | 8/2021 |
| CN | 113763814 A | 12/2021 |
| CN | 113833741 A | 12/2021 |
| CN | 113795683 B | 12/2022 |
| WO | 2021129882 A1 | 7/2021 |

\* cited by examiner

FOLDABLE MECHANISM AND FOLDABLE TERMINAL

CROSS-REFERENCE TO RELATED APPLICATIONS

This application is a national stage of International Application No. PCT/CN2022/143394 filed on Dec. 29, 2022, which claims priority to Chinese Patent Application No. 202210334431.6 filed on Mar. 31, 2022. The disclosures of both of the aforementioned applications are hereby incorporated by reference in their entireties.

TECHNICAL FIELD

This application relates to the field of foldable terminals, and in particular, to a foldable mechanism and a foldable terminal.

BACKGROUND

With the development of science and technology, the era of a large-screen intelligent terminal is approaching, and a foldable terminal is favored by a user because of advantages such as a large screen and easy-to-carry. Currently, a foldable terminal usually implements folding and unfolding by using a foldable mechanism. However, an existing foldable mechanism usually requires a large amount of components to implement folding and unfolding, leading to a complex structure of the foldable mechanism, which is not conducive to a lightweight design of the foldable terminal.

SUMMARY

This application provides a foldable mechanism and a foldable terminal, which can simplify a structure of the foldable mechanism, thereby implementing a lightweight design of the foldable terminal.

According to a first aspect, this application provides a foldable mechanism, including a base, a pressing plate assembly, and a flexible support plate, where the pressing plate assembly is mounted on the base, and the flexible support plate is mounted on the pressing plate assembly. The pressing plate assembly includes a first pressing plate swing arm, and a rotating portion of the first pressing plate swing arm is rotatably connected to the base, to implement a rotatable connection between the first pressing plate swing arm and the base. The flexible support plate is mounted on the first pressing plate swing arm and may bend under driving of the first pressing plate swing arm, and a bending direction of the flexible support plate is parallel to a rotation center of the first pressing plate swing arm relative to the base.

In the foldable mechanism shown in this application, the flexible support plate is directly mounted on the first pressing plate swing arm without requiring a spring to mount the flexible support plate on the base, so that a quantity of components of the foldable mechanism is simplified. In this way, an assembly process of the foldable mechanism is simplified, which is conducive to improve the assembly precision of the foldable mechanism, and a structure of the foldable mechanism is simplified, so that the structure of the foldable mechanism is simple. In a case that the foldable mechanism is applied to a foldable terminal, a lightweight design of the foldable terminal can be implemented. In addition, a partial thickness of the flexible support plate can be very thin, which is further conducive to implement a light and thin design of the foldable mechanism.

In an implementation, there are four first pressing plate swing arms, and the four first pressing plate swing arms are arranged at intervals, to ensure the assembly stability between the pressing plate assembly and the base.

In an implementation, the rotating portion of the first pressing plate swing arm is slidably and rotatably connected to the base, to implement a slidable and rotatable connection between the first pressing plate swing arm and the base. In a case that the first pressing plate swing arm rotates relative to the base, the first pressing plate swing arm generates a relative displacement with the base, and the displacement generated by the first pressing plate swing arm matches a size change generated due to bending of the flexible support plate, thereby ensuring a flat flexible support plate and preventing the flexible support plate from generating wrinkles.

In an implementation, the pressing plate assembly of the foldable mechanism further includes a second pressing plate swing arm, and a rotating portion of the second pressing plate swing arm is rotatably connected to the base, to implement a rotatable connection between the second pressing plate swing arm and the base. The flexible support plate is further mounted on the second pressing plate swing arm and bends under driving of the second pressing plate swing arm, so that the bending direction of the flexible support plate is further parallel to a rotation center of the second pressing plate swing arm relative to the base.

In the foldable mechanism shown in this application, the flexible support plate is directly mounted on the first pressing plate swing arm and the second pressing plate swing arm without requiring a spring to mount the flexible support plate on the base, so that a quantity of components of the foldable mechanism is simplified. In this way, an assembly process of the foldable mechanism is simplified, which is conducive to improve the assembly precision of the foldable mechanism, and a structure of the foldable mechanism is simplified, so that the structure of the foldable mechanism is simple. In a case that the foldable mechanism is applied to a foldable terminal, a lightweight design of the foldable terminal can be implemented.

In an implementation, there are four second pressing plate swing arms, and the four second pressing plate swing arms are arranged at intervals, to ensure the assembly stability between the pressing plate assembly and the base.

In an implementation, the rotating portion of the second pressing plate swing arm is slidably and rotatably connected to the base, to implement a slidable and rotatable connection between the second pressing plate swing arm and the base. In a case that the second pressing plate swing arm rotates relative to the base, the second pressing plate swing arm generates a displacement with the base, and the displacement generated by the second pressing plate swing arm matches a size change generated due to bending of the flexible support plate, thereby ensuring a flat flexible support plate and preventing the flexible support plate from generating wrinkles.

In an implementation, a connection portion of the first pressing plate swing arm is provided with an assembly hole. A connection portion of the second pressing plate swing arm is provided with an assembly hole. The flexible support plate includes a flexible support portion, a first fixing portion, and a second fixing portion. The flexible support portion is provided with a plurality of strip-shaped grooves, and the plurality of strip-shaped grooves are parallel to each other and arranged at intervals. An extending direction of each of the strip-shaped grooves is parallel to the bending direction of the flexible support plate, to ensure the flexibility of the flexible support plate. The first fixing portion and the second fixing portion are both fixedly connected to a bottom surface of the flexible support portion, the first fixing portion is mounted in the assembly hole of the first pressing plate swing arm, and the second fixing portion is mounted in the assembly hole of the second pressing plate swing arm, to implement assembly between the flexible support plate and the pressing plate assembly.

In an implementation, openings of the plurality of strip-shaped grooves are all located on a bottom surface of the flexible support plate, to ensure the integrity of a top surface of the flexible support plate. Each of the strip-shaped groove is recessed from the bottom surface of the flexible support plate in a direction away from the top surface, and runs through a front end surface and a rear end surface of the flexible support plate. The strip-shaped grooves are disposed at intervals with both the first fixing portion and the second fixing portion.

In an implementation, the pressing plate assembly of the foldable mechanism further includes a first pressing plate and a second pressing plate. The first pressing plate is slidably connected to a sliding portion of the first pressing plate swing arm, to implement a slidable connection between the first pressing plate and the first pressing plate swing arm. The second pressing plate is slidably connected to a sliding portion of the second pressing plate swing arm, to implement a slidable connection between the second pressing plate and the second pressing plate swing arm.

In a case that the foldable mechanism is in a flattened state, the first pressing plate and the second pressing plate are respectively located on two opposite sides of the base, and a top surface of the first pressing plate and a top surface of the second pressing plate are flush with a top surface of the flexible support plate and jointly form a support surface.

In a case that the foldable mechanism is applied to a foldable terminal, the support surface can support a foldable part of a display screen. Therefore, a good display effect of the display screen can be ensured, and in a case that the foldable part is touched, the foldable part is not easily damaged or recessed due to touching of an external force, thereby improving the use reliability of the display screen. In addition, the flexible support plate is not provided with an opening. Therefore, the top surface of the flexible support plate is a complete flat surface, and an area of the support surface is relatively large, so that the foldable part can be better supported, thereby improving a support effect of the flexible support plate to the foldable part.

In an implementation, the foldable mechanism further includes a connection assembly, and the connection assembly is mounted on the base. The connection assembly includes a first fixing frame and a second fixing frame. The first fixing frame is slidably and rotatably connected to the first pressing plate. The second fixing frame is slidably and rotatably connected to the second pressing plate.

In a case that the foldable mechanism is in a folded state, the first fixing frame, the second fixing frame, the first pressing plate, the second pressing plate, and the flexible support plate enclose to form an avoidance space, and the avoidance space is in a droplet shape.

In a case that the foldable mechanism is applied to a foldable terminal, the avoidance space may avoid an R angle formed when the foldable part bends, so that the foldable part does not bend at a relatively large angle, thereby avoiding a poor phenomenon such as a crease in the display screen, and helping prolong a service life of the display screen.

In an implementation, the base is provided with an avoidance groove. In a case that the foldable mechanism is in a folded state, the avoidance groove is configured to avoid a bottom portion of the flexible support plate, thereby preventing interference generated between the base and the flexible support plate and helping form the avoidance space in the droplet shape.

In an implementation, the connection assembly further includes a first primary swing arm and a second primary swing arm. A rotating portion of the first primary swing arm is rotatably connected to the first fixing frame, to implement a rotatable connection between the first primary swing arm and the first fixing frame. A sliding portion of the first primary swing arm is slidably and rotatably connected to the base, to implement a slidable and rotatable connection between the first primary swing arm and the base. A rotating portion of the second primary swing arm is rotatably connected to the second fixing frame, to implement a rotatable connection between the second primary swing arm and the second fixing frame. A sliding portion of the second primary swing arm is slidably and rotatably connected to the base, to implement a slidable and rotatable connection between the second primary swing arm and the base.

In an implementation, the flexible support portion is further provided with a first avoidance groove and a second avoidance groove, and openings of the first avoidance groove and the second avoidance groove are both located on the bottom surface of the flexible support portion.

In a case that the foldable mechanism is in a flattened state, the first avoidance groove is configured to avoid the sliding portion of the first primary swing arm, and the second avoidance groove is configured to avoid the sliding portion of the second primary swing arm, to prevent interference generated between the first primary swing arm and the second primary swing arm with the flexible support plate. Therefore, the flexible support portion may not be abutted against by the first primary swing arm and the second primary swing arm and protrude out relative to the top surface of the first pressing plate and the top surface of the second pressing plate, thereby ensuring that the top surface of the flexible support plate is flush with the top surface of the first pressing plate and the top surface of the second pressing plate.

The first avoidance groove and the second avoidance groove are both in communication with one or more strip-shaped grooves.

In an implementation, the connection assembly of the foldable mechanism further includes a first secondary swing arm and a second secondary swing arm. A sliding portion of the first secondary swing arm is slidably connected to the first fixing frame, to implement a slidable connection between the first secondary swing arm and the first fixing frame. A rotating portion of the first secondary swing arm is rotatably connected to the base, to implement a rotatable connection between the first secondary swing arm and the base. A sliding portion of the second secondary swing arm is slidably connected to the second fixing frame, to implement a slidable connection between the second secondary swing arm and the second fixing frame. A rotating portion of the second secondary swing arm is rotatably connected to the base, to implement a rotatable connection between the second secondary swing arm and the base.

In an implementation, the flexible support portion is further provided with a third avoidance groove and a fourth avoidance groove, and openings of the third avoidance groove and the fourth avoidance groove are both located on the bottom surface of the flexible support portion. In a case that the foldable mechanism is in a flattened state, the third avoidance groove is configured to avoid the rotating portion of the first secondary swing arm, and the fourth avoidance groove is configured to avoid the rotating portion of the second secondary swing arm, to prevent interference generated between the first secondary swing arm and the second secondary swing arm with the flexible support plate. Therefore, the flexible support portion may not be abutted against by the first secondary swing arm and the second secondary swing arm and protrude out relative to the top surface of the first pressing plate and the top surface of the second pressing plate, thereby ensuring that the top surface of the flexible support plate is flush with the top surface of the first pressing plate and the top surface of the second pressing plate.

The third avoidance groove and the fourth avoidance groove are both in communication with one or more strip-shaped grooves.

In an implementation, the foldable mechanism further includes a damping assembly, and the damping assembly is mounted on the connection assembly. In a process that the connection assembly is folded or unfolded relative to the base, the damping assembly may provide a damping force.

The damping assembly includes a first damping member and a second damping member. The first damping member is mounted on the first fixing frame, is fixedly connected to the first secondary swing arm, and may slide relative to the first fixing frame under driving of the first secondary swing arm. The second damping member is mounted on the second fixing frame, is fixedly connected to the second secondary swing arm, and may slide relative to the second fixing frame under driving of the second secondary swing arm.

In a case that the foldable mechanism is applied to a foldable terminal, in a process that a user uses the foldable terminal, for example, when the foldable terminal is in a folded state or a flattened state and when the foldable terminal is switched between the folded state and the unfolded state, the user can apparently feel the damping force provided by the damping assembly, so that the user can experience a good hand feeling, and the use experience of the user is improved.

In an implementation, the foldable mechanism further includes a synchronization assembly, and the synchronization assembly is mounted on the base and slidably connected to the connection assembly. The synchronization assembly is slidably connected to the first secondary swing arm and the second secondary swing arm, so that the first secondary swing arm and the second secondary swing arm rotate synchronously relative to the base.

In an implementation, the rotating portion of the first secondary swing arm is provided with a first spiral groove, and the rotating portion of the second secondary swing arm is provided with a second spiral groove.

The synchronization assembly of the foldable mechanism includes a fixing column and a synchronization slider, the fixing column is mounted on the base, and the synchronization slider is slidably connected to the fixing column. A first cam of the synchronization slider is mounted in the first spiral groove, and may slide relative to the rotating portion of the first secondary swing arm in the first spiral groove. A second cam of the synchronization slider is mounted in the second spiral groove, and may slide relative to the rotating portion of the second secondary swing arm in the second spiral groove.

When the first secondary swing arm rotates relative to the base, the first cam slides relative to the rotating portion of the first secondary swing arm in the first spiral groove, to drive the synchronization slider to slide relative to the fixing column, drive the second cam to slide relative to the rotating portion of the second secondary swing arm in the second spiral groove, and further drive the second secondary swing arm to rotate relative to the base, thereby implementing synchronous rotation between the first secondary swing arm and the second secondary swing arm.

Similarly, when the second secondary swing arm rotates relative to the base, the synchronization assembly may drive the first secondary swing arm to rotate relative to the base, thereby implementing the synchronous rotation between the first secondary swing arm and the second secondary swing arm.

In an implementation, the base is an integrally formed structural member, so that the overall strength of the base can be improved, and the structure stability of the base can be ensured. Compared with an existing base structure, the base shown in this application does not need a fixing member such as a screw or a screw nail to implement assembly between a holder and a shaft cover. This is conducive to assembly of the foldable mechanism, the assembly precision of the base can be improved, and a quantity of components of the foldable mechanism is also simplified, which is conducive to implement a lightweight design of the foldable terminal.

In an implementation, the base is provided with a first engagement groove, and the first engagement groove is an arc-shaped groove. The rotating portion of the first pressing plate swing arm is in a shape of an arc-shaped plate, and the rotating portion of the first pressing plate swing arm is mounted in the first engagement groove and slides and rotates relative to the base in the first sliding groove.

Since the base is an integrally formed structural member, the first engagement groove does not need to be formed through engagement of the shaft cover and the holder. In the foldable mechanism, a sum of a thickness of the first engagement groove and a thickness of the rotating portion of the first pressing plate swing arm is relatively small, so that space occupied by the foldable mechanism can be reduced, which is conducive to implement a light and thin design of the foldable mechanism.

In an implementation, the base is provided with a second engagement groove, the rotating portion of the second pressing plate swing arm is in a shape of an arc-shaped plate, and the rotating portion of the second pressing plate swing arm is mounted in the second engagement groove and slides and rotates in the second engagement groove.

According to a second aspect, this application provides a foldable terminal, including a first housing, a second housing, and the foldable mechanism according to any one of the foregoing, where the foldable mechanism is connected between the first housing and the second housing.

In the foldable mechanism used by the foldable terminal shown in this application, the flexible support plate is directly mounted on the first pressing plate swing arm without requiring a spring to mount the flexible support plate on the base, so that a quantity of components of the foldable mechanism is simplified. In this way, an assembly process of the foldable mechanism is simplified, which is conducive to improve the assembly precision of the foldable mechanism, and a structure of the foldable mechanism is simplified, so that the structure of the foldable mechanism is simple, which is conducive to implement a lightweight design of the foldable terminal. In addition, a partial thickness of the flexible support plate can be very thin, which is further conducive to implement a light and thin design of the foldable terminal.

In an implementation, the foldable terminal further includes a display screen, and the display screen includes a first display part, a second display part, and a foldable part, where the foldable part is connected between the first display part and the second display part. The first display part is mounted in the first housing, the second display part is mounted in the second housing, and the foldable part is disposed opposite to the foldable mechanism.

In a case that the foldable terminal is in an unfolded state, the top surface of the flexible support plate supports the foldable part.

The first pressing plate and the second pressing plate are respectively located on two opposite sides of the base, and the top surface of the first pressing plate and the top surface of the second pressing plate are flush with the top surface of the flexible support plate and jointly form a support surface to support the foldable part.

The support surface can support the foldable part of the display screen. Therefore, a good display effect of the display screen can be ensured, and in a case that the foldable part is touched, the foldable part is not easily damaged or recessed due to touching of an external force, thereby improving the use reliability of the display screen. In addition, the flexible support plate is not provided with an opening. Therefore, the top surface of the flexible support plate is a complete flat surface, and an area of the support surface is relatively large, so that the foldable part can be better supported, thereby improving a support effect of the flexible support plate to the foldable part.

In an implementation, in a case that the foldable terminal is in a folded state, the foldable part is received in the avoidance space of the foldable mechanism.

The first fixing frame, the second fixing frame, the first pressing plate, the second pressing plate, and the flexible support plate enclose to form an avoidance space, and the avoidance space is in a droplet shape. The droplet-shaped avoidance space may avoid an R angle formed when the foldable part bends, so that the foldable part does not bend at a relatively large angle, thereby avoiding a poor phenomenon such as a crease in the display screen, and helping prolong a service life of the display screen.

BRIEF DESCRIPTION OF THE DRAWINGS

To describe the technical solutions in the embodiments of this application more clearly, the following describes the accompanying drawings required in the embodiments of this application.

DETAILED DESCRIPTION OF ILLUSTRATIVE EMBODIMENTS

The following clearly and completely describes the technical solutions in the embodiments of this application with reference to the accompanying drawings in the embodiments of this application.

Figure 1:
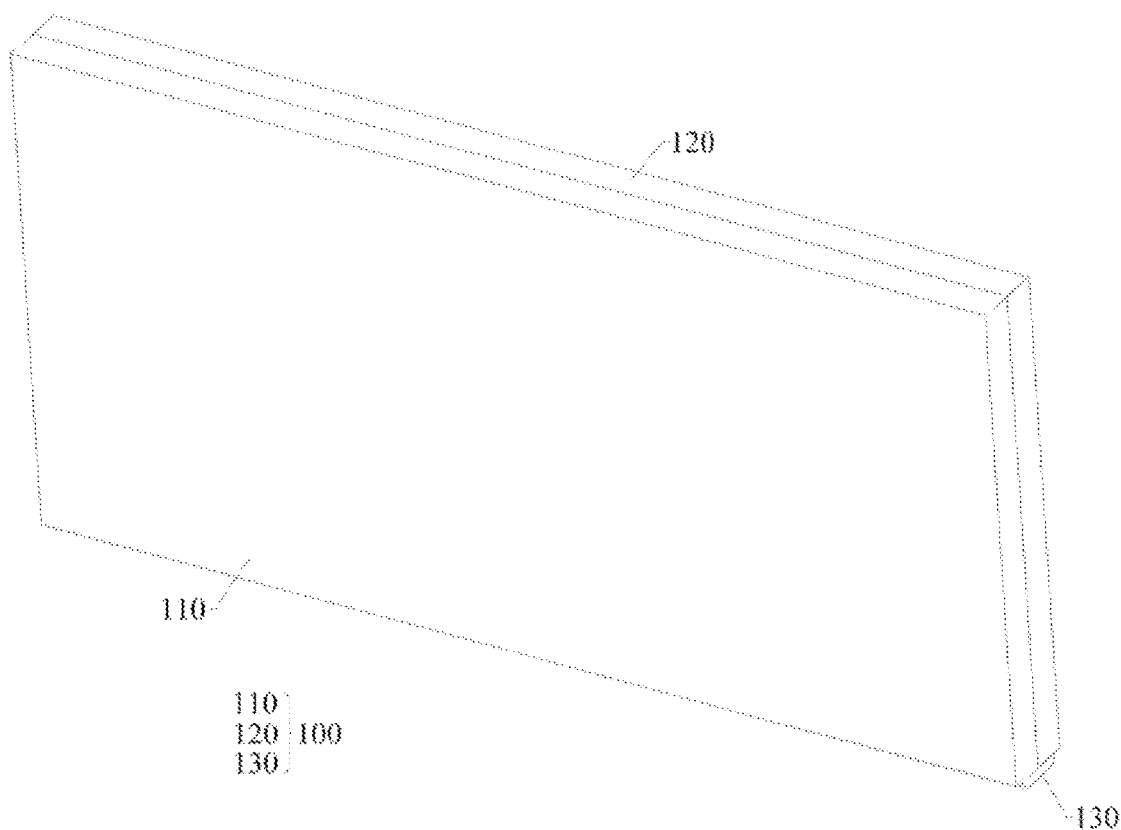
FIG. 1 is a schematic structural diagram of a foldable terminal in a state according to an embodiment of this application.
Figure 2:
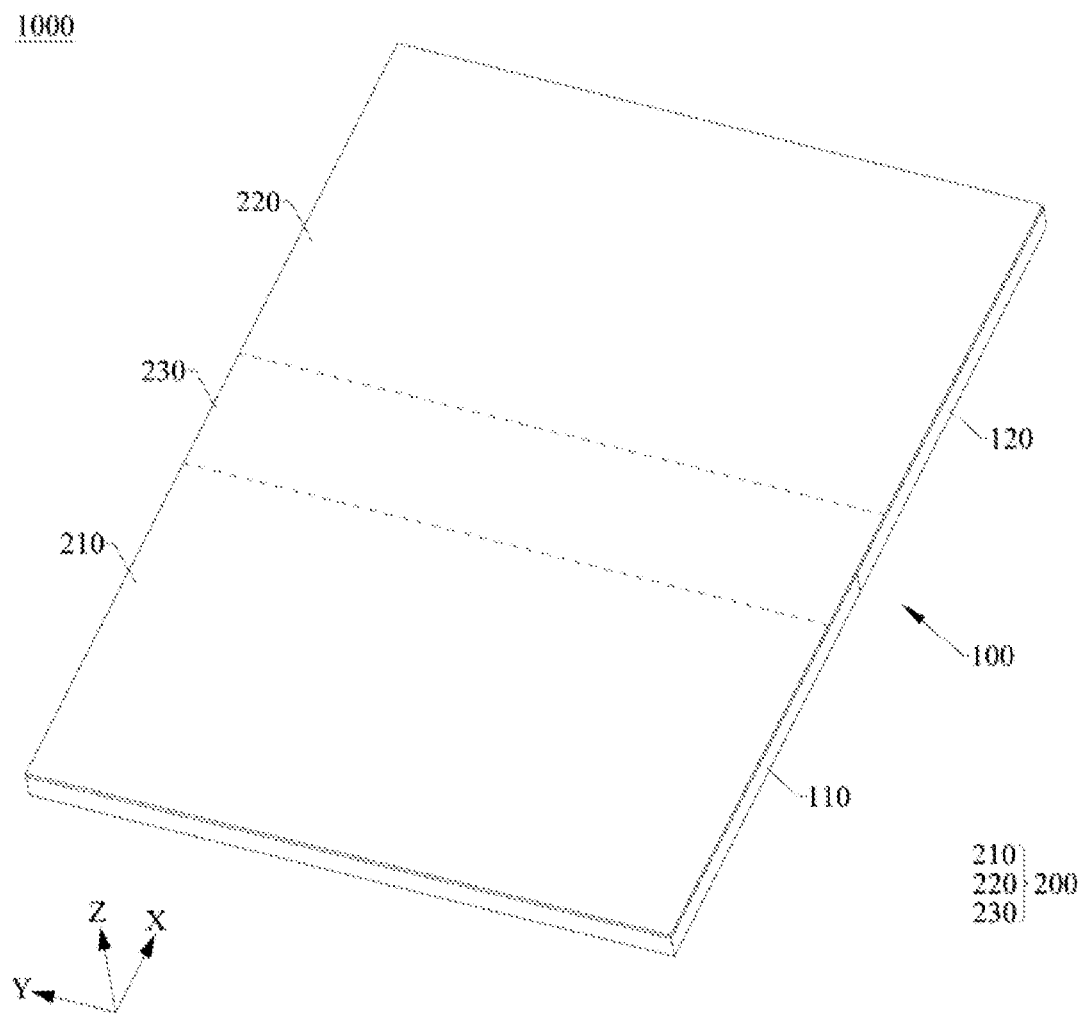
FIG. 2 is a schematic structural diagram of the foldable terminal shown in FIG. 1 in a second state.

Refer to FIG. 1 and FIG. 2, FIG. 1 is a schematic structural diagram of a foldable terminal 1000 in a state according to an embodiment of this application, and FIG. 2 is a schematic structural diagram of the foldable terminal 1000 shown in FIG. 1 in a second state.

The foldable terminal 1000 may be a foldable electronic product such as a mobile phone, a tablet computer, a personal computer, a multimedia player, an e-book reader, a notebook computer, a vehicle-mounted device, or a wearable device. In this embodiment, the foldable terminal 1000 is a foldable mobile phone. That is, the foldable terminal 1000 is a mobile phone that can be switched between a folded state and an unfolded state.

For ease of description, a length direction of the shown foldable terminal 1000 is defined as an X-axis direction, a length direction of the foldable terminal 1000 is defined as a Y-axis direction, and a thickness direction of the foldable terminal 1000 is defined as a Z-axis direction, where the X-axis direction, the Y-axis direction, and the Z-axis direction are perpendicular to each other.

It should be noted that, limitation words such as parallel and perpendicular that are about a relatively position relationship mentioned in the embodiments of this application are all said for a current processing level rather than absolute and strict definitions in mathematics, so that existence of a slight deviation is also permitted, and approximately parallel and approximately perpendicular are also included. For example, A being parallel to B refers to that A is parallel to or approximately parallel to B, provided that an angle between A and B ranges from 0 degree to 10 degrees. For example, A being perpendicular to B refers to that A is perpendicular to or approximately perpendicular to B, provided that an angle between A and B ranges from 80 degrees to 100 degrees.

In this embodiment, an extending direction of a rotation axis of the foldable terminal 1000 is the Y-axis direction. That is, the foldable terminal 1000 can be relatively unfolded or relatively folded around the Y-axis direction. The foldable terminal 1000 shown in FIG. 1 is in a folded state, a size of the foldable terminal 1000 in the X-axis direction is relatively small, and the foldable terminal 1000 is easy to carry. The foldable terminal 1000 shown in FIG. 2 is in an unfolded state, a size of the foldable terminal 1000 in the X-axis direction is relatively large, and the foldable terminal 1000 has a relatively large display area. For example, an unfolding angle α of the foldable terminal 1000 shown in FIG. 2 is 180 degrees. That is, the foldable terminal 1000 shown in FIG. 2 is in a flattened state.

It should be noted that, a slight deviation is allowed for all angles described as examples in the embodiments of this application. For example, the unfolding angle α of the foldable terminal 1000 shown in FIG. 2 being 180 degrees refers to that a may be 180 degrees, or may be approximately 180 degrees, for example, 170 degrees, 175 degrees, 185 degrees, and 190 degrees. An angle for example described in the following may be used for same understanding.

It should be understood that the foldable terminal 1000 shown in the embodiments of this application is a terminal that may be folded for one time. In some other embodiments, the foldable terminal 1000 may also be a terminal that may be folded for a plurality of times (more than twice). In this case, the foldable terminal 1000 may include a plurality of parts, two adjacent parts may be folded relatively close to each other to cause the foldable terminal 1000 to be in a folded state, and two adjacent parts may be also unfolded relatively far from each other to cause the foldable terminal 1000 to be in an unfolded state.

Figure 3:
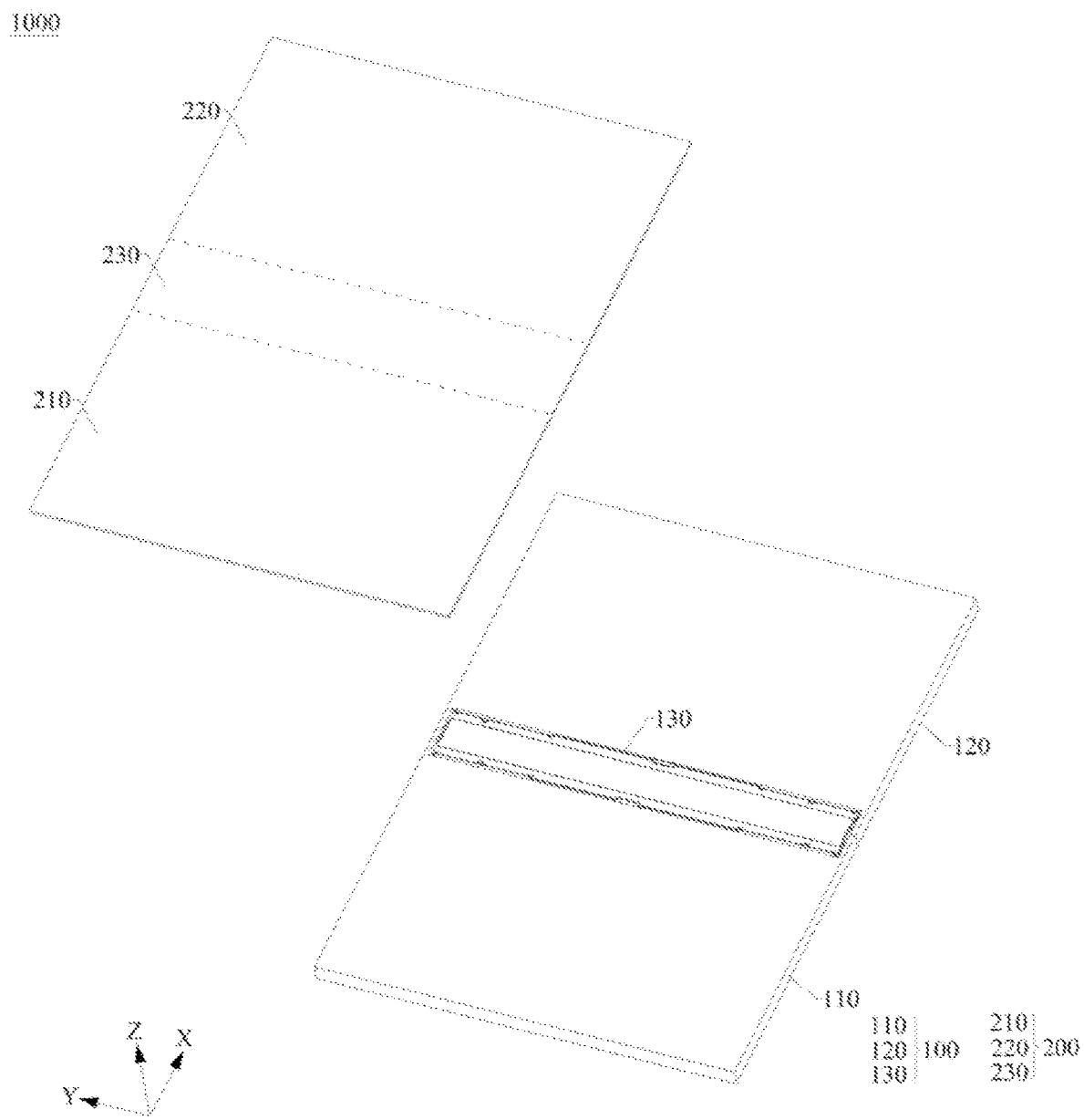
FIG. 3 is a schematic exploded structural view of the foldable terminal shown in FIG. 2.

Refer to FIG. 3, FIG. 3 is a schematic exploded structural view of the foldable terminal 1000 shown in FIG. 2.

The foldable terminal 1000 includes a foldable apparatus 100 and a display screen 200, and the display screen 200 is mounted in the foldable apparatus 100. The display screen 200 includes a display surface (not marked in the figure) away from the foldable apparatus 100, and the display surface is configured to display information such as text, an image, or a video. In this embodiment, the display screen 200 includes a first display part 210, a second display part 220, and a foldable part 230, where the foldable part 230 is connected between the first display part 210 and the second display part 220. The foldable part 230 may bend around the Y-axis direction.

As shown in FIG. 1, when the foldable terminal 1000 is in a folded state, the first display part 210 and the second display part 220 are disposed opposite to each other, and the foldable part 230 bends. In this case, the display screen 200 is in a folded state, and an exposed area of the display screen 200 is relatively small, thereby greatly reducing a probability that the display screen 200 is damaged, and effectively protecting the display screen 200. As shown in FIG. 2, when the foldable terminal 1000 is in an unfolded state, the first display part 210 and the second display part 220 are unfolded opposite to each other, and the foldable part 230 does not bend and is flattened. In this case, angles between the first display part 210, the second display part 220, and the foldable part 230 are all a, and the display screen 200 has a large display area, so as to implement large-screen display of the foldable terminal 1000 and improve the use experience of the user.

It should be understood that, the foldable terminal 1000 shown in this embodiment of this application is folded inward, and the display screen 200 of the foldable terminal 1000 in the folded state is located on an inner side of the foldable apparatus 100. In some other embodiments, the foldable terminal 1000 may also be folded outward. In this case, the display screen 200 of the foldable terminal 1000 in the folded state is located on an outer side of the foldable apparatus 100.

Figure 4:
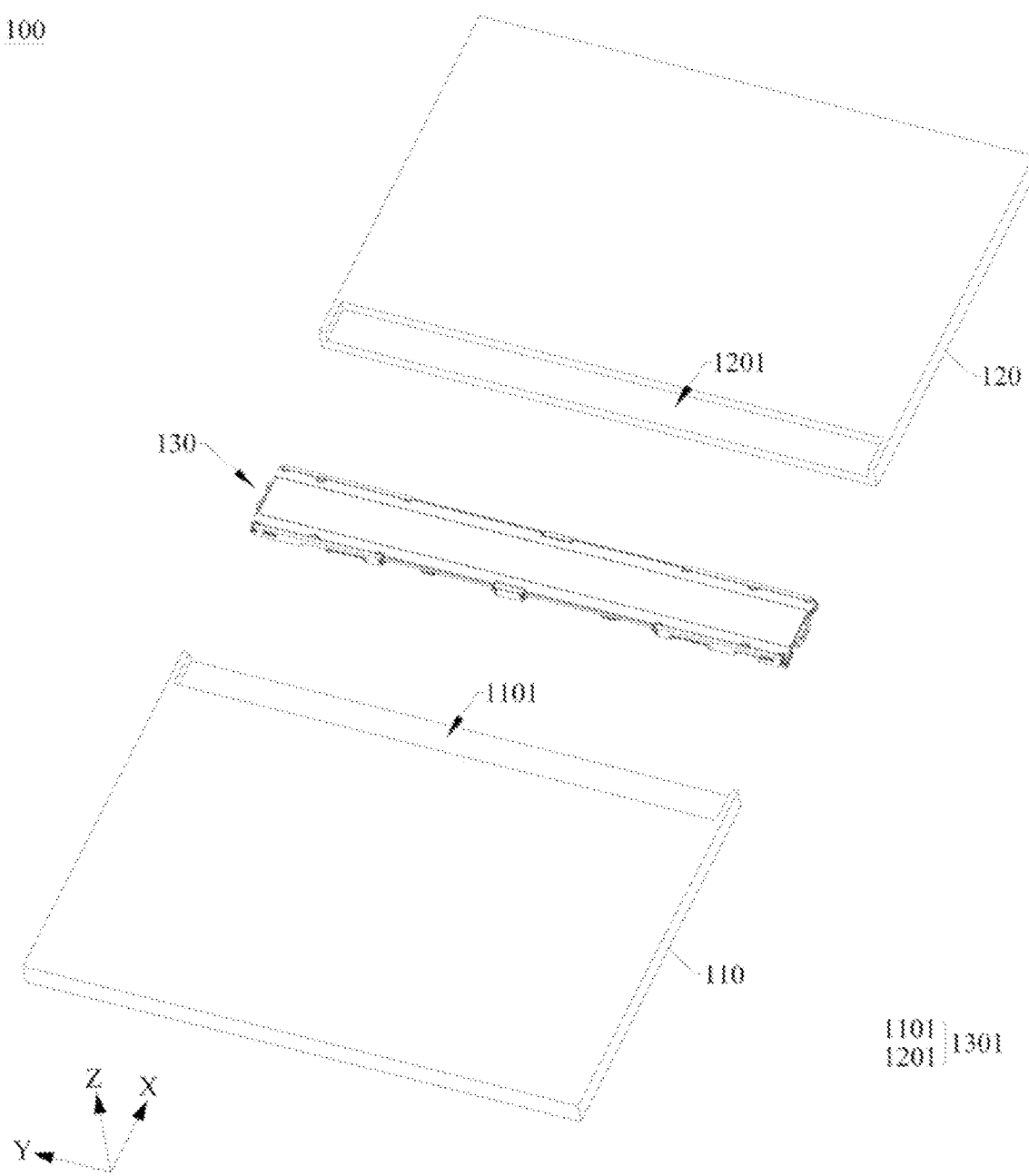
FIG. 4 is a schematic exploded structural view of a foldable apparatus in the foldable terminal shown in FIG. 3.

Refer to FIG. 4, FIG. 4 is a schematic exploded structural view of the foldable apparatus 100 in the foldable terminal 1000 shown in FIG. 3.

In this embodiment, the foldable apparatus 100 includes a first housing 110, a second housing 120, and a foldable mechanism 130. The foldable mechanism 130 is connected between the first housing 110 and the second housing 120, so as to implement a rotatable connection between the first housing 110 and the second housing 120. Specifically, the first housing 110 carries the first display part 210, and the second housing 120 carries the second display part 220. In other words, the first display part 210 is mounted in the first housing 110, and the second display part 220 is mounted in the second housing 120. The foldable mechanism 130 is disposed opposite to the foldable part 230.

The first housing 110 and the second housing 120 may rotate relative to each other through the foldable mechanism 130, so that the foldable apparatus 100 is switched between a folded state and an unfolded state. Specifically, the first housing 110 and the second housing 120 may rotate relative to each other to be disposed opposite to each other, so that the foldable apparatus 100 is in a folded state, as shown in FIG. 1. In this case, the foldable mechanism 130 is in a folded state. The first housing 110 and the second housing 120 may also rotate relative to each other to be unfolded to each other, so that the foldable apparatus 100 is in an unfolded state, as shown in FIG. 2. In this case, the foldable mechanism 130 is in an unfolded state. For example, the foldable terminal 1000 shown in FIG. 2 is in a flattened state, and an angle between the first housing 110 and the second housing 120 is a. In this case, the foldable mechanism 130 is in a flattened state.

The first housing 110 is provided with a first receiving groove 1101, and the first receiving groove 1101 is located on a side of the first housing 110 facing the second housing 120. An opening of the first receiving groove 1101 is located on a top surface of the first housing 110. The first receiving groove 1101 is recessed in a direction from the top surface to a bottom surface of the first housing 110, and runs through a right side surface of the first housing 110.

The second housing 120 and the first housing 110 have a same structure and are mirror-symmetrical with respect to the foldable mechanism 130. The second housing 120 is provided with a second receiving groove 1201, and the second receiving groove 1201 is located on a side of the second housing 120 facing the first housing 110. An opening of the second receiving groove 1201 is located on a top surface of the second housing 120. The second receiving groove 1201 is recessed in a direction from the top surface to a bottom surface of the second housing 120, and runs through a side surface of the second housing 120 facing the first housing 110.

When the foldable apparatus 100 is in a flattened state, that is, when an angle between the first housing 110 and the second housing 120 is a, the first receiving groove 1101 and the second receiving groove 1201 enclose to form a receiving space 1301. The foldable mechanism 130 is mounted in the receiving space 1301. A part of the foldable mechanism 130 is mounted in the first receiving groove 1101 of the first housing 110, and a part of the foldable mechanism 130 is mounted in the second receiving groove 1201 of the second housing 120.

It should be noted that, in this embodiment of this application, orientation words such as "top", "bottom", "left", "right", "front", and "rear" that are used when the foldable terminal 1000 is described are mainly described according to a display orientation of the foldable terminal 1000 in FIG. 2, where a direction facing a Z-axis positive direction is "top", a direction facing a Z-axis negative direction is "bottom", a direction facing an X-axis positive direction is "right", a direction facing an X-axis negative direction is "left", a direction facing a Y-axis positive direction is "rear", and a direction facing a Y-axis negative direction is "front", which do not form a limitation on orientations of the foldable terminal 1000 in an actual application scenario.

In an existing foldable mechanism, a screen is usually supported by using a floating plate, and the floating plate is usually mounted on the base by using springs. The floating plate goes down relative to the base under action of the springs and goes up relative to the base under action of swing arms, and a large amount of components are required in the foldable mechanism to drive the floating plate to move relative to the base. As a result, assembly of the foldable mechanism is complex, and a problem of a poor assembly precision easily occurs, leading to a complex structure of the foldable mechanism, which is not conducive to a lightweight design of the foldable terminal. In addition, openings need to be provided on the floating plate to avoid the swing arms, to prevent interference generated between the floating plate and the swing arms. As a result, the screen cannot be completely supported, and dents may easily occur on the screen, affect the use experience of the user. The following describes a structure of the foldable mechanism 130 in the foldable terminal 1000 shown in this embodiment of this application.

Figure 5:
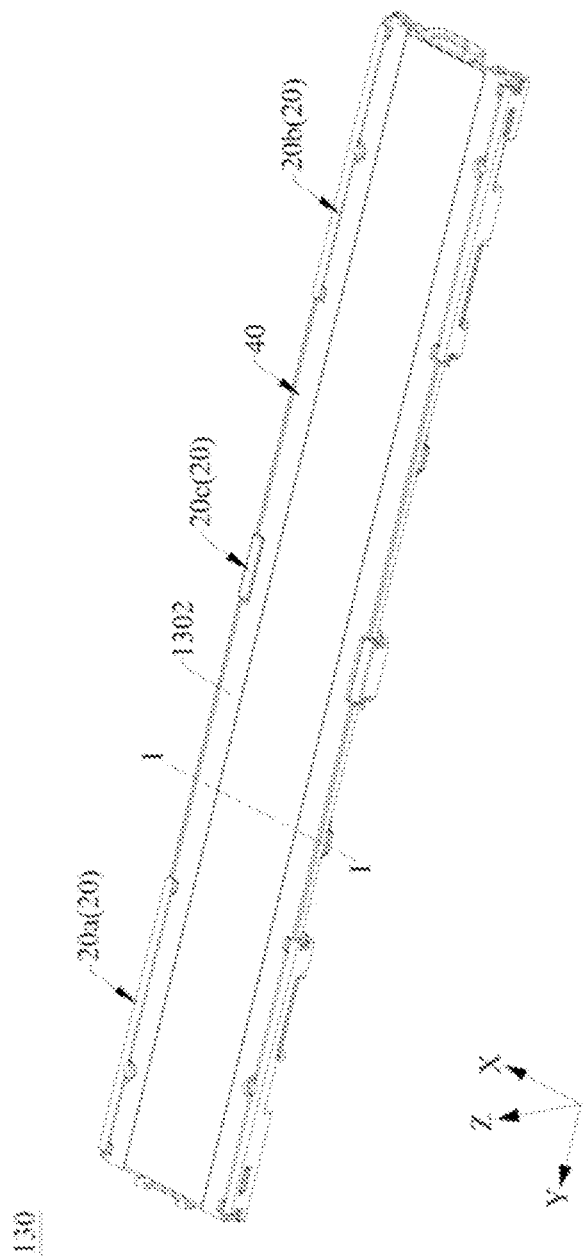
FIG. 5 is a schematic structural diagram of a foldable mechanism in the foldable apparatus shown in FIG. 4.
Figure 6:
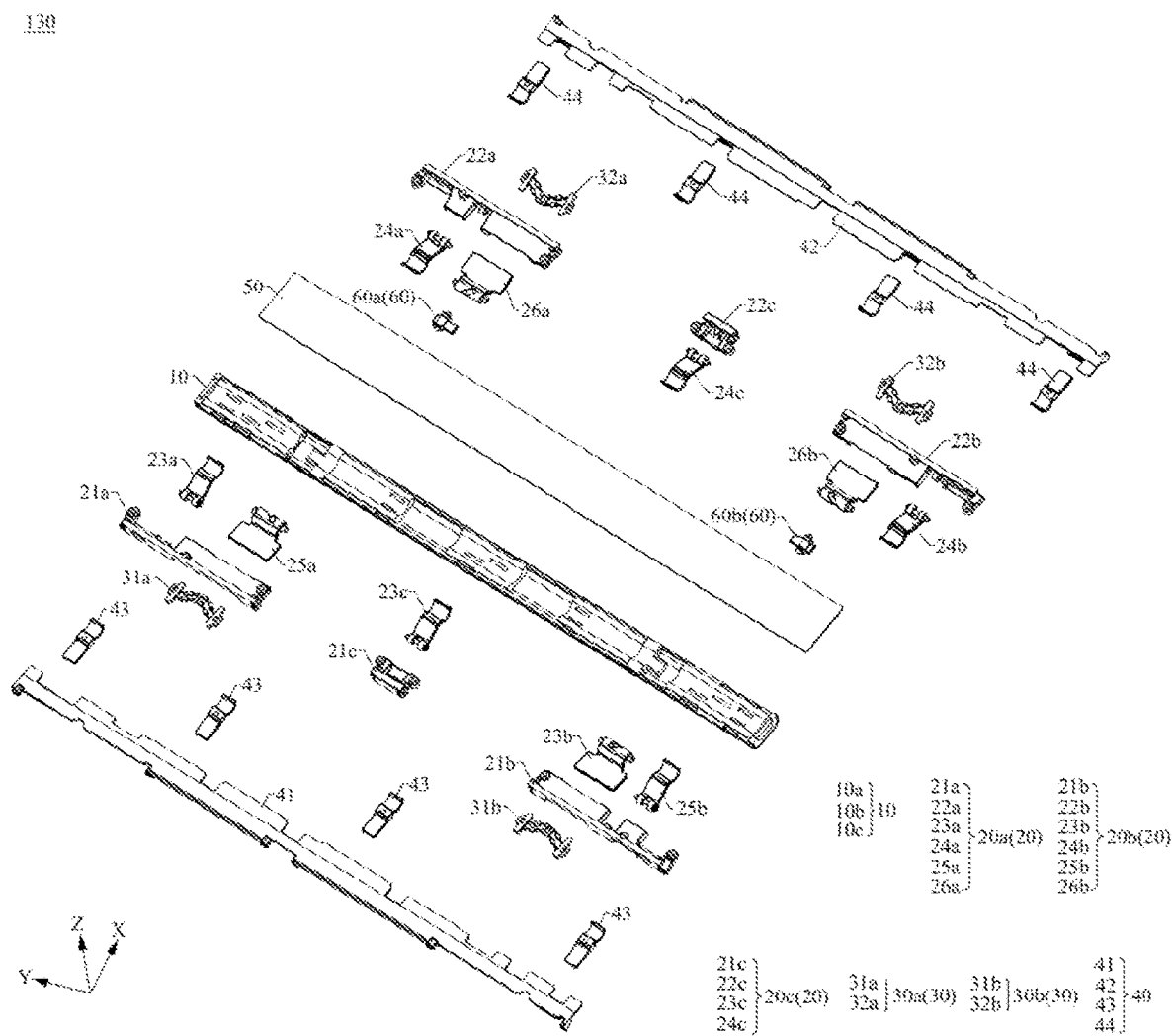
FIG. 6 is a schematic exploded structural view of the foldable mechanism shown in FIG. 5.

Refer to FIG. 5 and FIG. 6, FIG. 5 is a schematic structural diagram of a foldable mechanism 130 in the foldable apparatus 100 shown in FIG. 4, and FIG. 6 is a schematic exploded structural view of the foldable mechanism 130 shown in FIG. 5.

The foldable mechanism 130 includes a base 10, a connection assembly 20, a damping assembly 30, a pressing plate assembly 40, and a flexible support plate 50. The connection assembly 20 and the pressing plate assembly 40 are both mounted on the base 10, and may be both folded or unfolded relative to the base 10, so as to switch between a folded state and an unfolded state. The damping assembly 30 is mounted on the connection assembly 20 and may be folded or unfolded relative to the base 10 under driving of the connection assembly 20, so as to switch between a folded state and an unfolded state. The flexible support plate 50 is mounted on the pressing plate assembly 40 and may be folded or unfolded under driving of the pressing plate assembly 40, so as to switch between a folded state and an unfolded state. For example, the base 10 extends in the Y-axis direction.

In this embodiment, there are three connection assemblies 20, and the three connection assemblies 20 are arranged at intervals in the Y-axis direction. The three connection assemblies 20 are respectively a first connection assembly 20a, a second connection assembly 20b, and a third connection assembly 20c, where the third connection assembly 20c is located between the first connection assembly 20a and the second connection assembly 20b. The first connection assembly 20a is located on a front side of the foldable mechanism 130, the second connection assembly 20b is located on a rear side of the foldable mechanism 130, and the third connection assembly 20c is located on a middle portion of the foldable mechanism 130. In some other embodiments, there may be one, two, or at least four connection assemblies 20, and a quantity of the connection assemblies 20 is not specifically limited in this application.

The first connection assembly 20a includes a first fixing frame 21a, a second fixing frame 22a, a first primary swing arm 23a, a second primary swing arm 24a, a first secondary swing arm 25a, and a second secondary swing arm 26a. The first primary swing arm 23a is rotatably connected to the first fixing frame 21a and is slidably and rotatably connected to the base 10. The second primary swing arm 24a is rotatably connected to the second fixing frame 22a and is slidably and rotatably connected to the base 10a. The first secondary swing arm 25a is rotatably connected to the first fixing frame 21a and is rotatably connected to the base 10. The second secondary swing arm 26a is slidably connected to the second fixing frame 22a and is rotatably connected to the base 10.

When the first connection assembly 20a is switched between the folded state and the unfolded state, a direction in which the first fixing frame 21a, the first primary swing arm 23a, and the first secondary swing arm 25a rotate relative to the base 10 is a first direction, and a direction in which the second fixing frame 22a, the second primary swing arm 24a, and the second secondary swing arm 26a rotate relative to the base 10 is a second direction, where the second direction is opposite to the first direction.

For example, when the first connection assembly 20a is switched from the folded state to the unfolded state, the first fixing frame 21a, the first primary swing arm 23a, and the first secondary swing arm 25a rotate relative to the base 10 in an anticlockwise direction, and the second fixing frame 22a, the second primary swing arm 24a, and the second secondary swing arm 26a rotate relative to the base 10 in a clockwise direction. When the first connection assembly 20a is switched from the unfolded state to the folded state, the first primary swing arm 23a and the first secondary swing arm 25a rotate relative to the base 10 in a clockwise direction, and the second primary swing arm 24a and the second secondary swing arm 26a rotate relative to the base 10 in an anticlockwise direction.

It should be noted that, the second connection assembly 20b and the first connection assembly 20a may be same or similar assemblies, structures that are symmetrical or partially symmetrical, or different structures. The second connection assembly 20b may be centrally symmetrical with the first connection assembly 20a. For basic structures of components, a connection relationship between the components, and a connection relationship between the components and other components outside the components in the second connection assembly 20b, refer to a related design of the first connection assembly 20a, and a detailed structure or position arrangement of the components of the second connection assembly 20b may be different from that of the first connection assembly 20a.

In this embodiment, the second connection assembly 20b includes a first fixing frame 21b, a second fixing frame 22b, a first primary swing arm 23b, a second primary swing arm 24a, a first secondary swing arm 25b, and a second secondary swing arm 26b. For structures of components, and connection relationships between the components and the base 10, the pressing plate assembly 40, and the damping assembly 30 of the second connection assembly 20b, refer to related description of the first connection assembly 20a.

The third connection assembly 20c includes a first fixing frame 21c, a second fixing frame 22c, a first primary swing arm 23c, and a second primary swing arm 24c. For structures of components, and connection relationships between the components and the base 10, the pressing plate assembly 40, and the damping assembly 30 of the third connection assembly 20c, refer to related description of the first connection assembly 20a. In some other embodiments, the third connection assembly 20c may also include a first secondary swing arm and a second secondary swing arm (not shown in the figure), which is not specifically limited in this application.

It should be noted that, the first fixing frame 21a of the first connection assembly 20a, the first fixing frame 21b of the second connection assembly 20b, and the first fixing frame 21c of the third connection assembly 20c may be structural members that are independent of each other, or may be a plurality of parts of an integral structural member; and/or the second fixing frame 22a of the first connection assembly 20a, the second fixing frame 22b of the second connection assembly 20b, and the second fixing frame 22c of the third connection assembly 20c may be structural members that are independent of each other, or may be a plurality of parts of an integral structural member.

It should be understood that, "and/or" mentioned in this embodiment of this application refers to both "and" and "or". For example, A and/or B includes three cases: Only A exists, only B exists, and both A and B exist, and description of "and/or" in the following may be understood as the same meaning.

In addition, the foldable mechanism 130 further includes a synchronization assembly 60, and the synchronization assembly 60 is mounted on the base 10 and slidably connected to the connection assembly 20. In this embodiment, there are two synchronization assemblies 60, and the two synchronization assemblies 60 are arranged at intervals in the Y-axis direction. The two synchronization assemblies 60 are respectively a first synchronization assembly 60a and a second synchronization assembly 60b. The first synchronization assembly 60a is mounted on a front side of the base 10, and is slidably connected to the first secondary swing arm 25a and the second secondary swing arm 26a, so that the first secondary swing arm 25a and the second secondary swing arm 26a rotate synchronously relative to the base 10. The second synchronization assembly 60b is mounted on a rear side of the base 10, and is slidably connected to the first secondary swing arm 25a and the second secondary swing arm 26a, so that the first secondary swing arm 25b and the second secondary swing arm 26b rotate synchronously relative to the base 10.

It should be noted that, the second synchronization assembly 60b and the first synchronization assembly 60a may be same or similar assemblies, structures that are symmetrical or partially symmetrical, or different structures. The second synchronization assembly 60b may be mirror-symmetrical with the first synchronization assembly 60a. For basic structures of components, a connection relationship between the components, and a connection relationship between the components and other components outside the components in the second synchronization assembly 60b, refer to a related design of the first synchronization assembly 60a, and a detailed structure or position arrangement of the components of the second synchronization assembly 60b may be different from that of the first synchronization assembly 60a.

In this embodiment, there are two damping assemblies 30, and the two damping assemblies 30 are arranged at intervals in the Y-axis direction. The two damping assemblies 30 are respectively a first damping assembly 30a and a second damping assembly 30b, and the first damping assembly 30a is mounted on the first connection assembly 20a. In a process that the first connection assembly 20a is folded or unfolded relative to the base 10, the first damping assembly 30a may provide a damping force. The second damping assembly 30b is mounted on the second connection assembly 20b. In a process that the second connection assembly 20b is folded or unfolded relative to the base 10, the second damping assembly 30b may provide a damping force. In a process that a user uses the foldable terminal 1000, for example, when the foldable terminal 1000 is in a folded state or a flattened state and when the foldable terminal 1000 is switched between the folded state and the unfolded state, the user can apparently feel the damping force provided by the first damping assembly 30a and the second damping assembly 30b, so that the user can experience a good hand feeling, and the use experience of the user is improved.

In some other embodiments, there may also be three damping assemblies 30, and the three damping assemblies 30 are respectively a first damping assembly 30a, a second damping assembly 30b, and a third damping assembly (not shown in the figure), where the third damping assembly is mounted on the third connection assembly 20c. In a process that the third connection assembly 20c is folded or unfolded relative to the base 10, the third damping assembly may provide a damping force. Alternatively, there may be one or at least four damping assemblies 30, and a quantity of the damping assemblies 30 is not specifically limited in this application.

In this embodiment, the first damping assembly 30a includes a first damping member 31a and a second damping member 32a. The first damping member 31a is mounted on the first fixing frame 21a, is fixedly connected to the first secondary swing arm 25a, and may slide relative to the first fixing frame 21a under driving of the first secondary swing arm 25a. The second damping member 32a is mounted on the second fixing frame 22a, is fixedly connected to the second secondary swing arm 26a, and may slide relative to the second fixing frame 22a under driving of the second secondary swing arm 26a.

It should be noted that, the second damping assembly 30b and the first damping assembly 30a may be same or similar assemblies, structures that are symmetrical or partially symmetrical, or different structures. The second damping assembly 30b may be mirror-symmetrical with the first damping assembly 30a. For basic structures of components, a connection relationship between the components, and a connection relationship between the components and other components outside the components in the second damping assembly 30b, refer to a related design of the first damping assembly 30a, and a detailed structure or position arrangement of the components of the second damping assembly 30b may be different from that of the first damping assembly 30a.

In this embodiment, the second damping assembly 30b includes a first damping member 31b and a second damping member 32b. The first damping member 31b is mounted on the first fixing frame 21b, is fixedly connected to the first secondary swing arm 25b, and may slide relative to the first fixing frame 21b under driving of the first secondary swing arm 25b. The second damping member 32b is mounted on the second fixing frame 22b, is fixedly connected to the second secondary swing arm 26b, and may slide relative to the second fixing frame 22b under driving of the second secondary swing arm 26b. For structures of components, and connection relationships between the components and the base 10, the second connection assembly 20b, and the pressing plate assembly 40 of the second damping assembly 30b, refer to related description of the first damping assembly 30a.

The pressing plate assembly 40 is slidably and rotatably connected to the connection assembly 20. In this embodiment, the pressing plate assembly 40 includes a first pressing plate 41, a second pressing plate 42, a first pressing plate swing arm 43, and a second pressing plate swing arm 44. A front side of the first pressing plate 41 is slidably and rotatably connected to the first fixing frame 21a, a rear side of the first pressing plate 41 is slidably and rotatably connected to the first fixing frame 21b, and a middle portion of the first pressing plate 41 is slidably and rotatably connected to the first fixing frame 21c. A front side of the second pressing plate 42 is slidably and rotatably connected to the second fixing frame 22a, a rear side of the second pressing plate 42 is slidably and rotatably connected to the second fixing frame 22b, and a middle portion of the second pressing plate 42 is slidably and rotatably connected to the second fixing frame 22c. There are four first pressing plate swing arms 43 and four second pressing plate swing arms 44. In the Y-axis direction, the four first pressing plate swing arms 43 are arranged at intervals, and the four second pressing plate swing arms 44 are arranged at intervals. In some other embodiments, there may also be one, two, or at least four first pressing plate swing arms 43, and/or there may also be one, two, or at least four second pressing plate swing arms 44. A quantity of the first pressing plate swing arms 43 and a quantity of the second pressing plate swing arms 44 are not specifically limited in this application.

Each first pressing plate swing arm 43 is slidably connected to the first pressing plate 41 and is slidably and rotatably connected to the base 10. Each second pressing plate swing arm 44 is slidably connected to the second pressing plate 42 and is slidably and rotatably connected to the base 10. Rotation centers of the first pressing plate swing arm 43 and the second pressing plate swing arm 44 relative to the base 10 are both parallel to the Y-axis direction. In some other embodiments, each first pressing plate swing arm 43 may also be rotatably connected to the base 10, and/or each second pressing plate swing arm 44 may also be rotatably connected to the base 10.

The flexible support plate 50 is mounted on the first pressing plate swing arm 43 and the second pressing plate swing arm 44, and may bend under driving of the first pressing plate swing arm 43 and the second pressing plate swing arm 44 to be folded or unfolded, to implement mutual switching between the folded state and the unfolded state. A bending direction of the flexible support plate 50 is the Y-axis direction, and is parallel to the rotation centers of the first pressing plate swing arm 43 and the second pressing plate swing arm 44 relative to the base 10. It should be noted that, the bending direction of the flexible support plate 50 being the Y-axis direction refers to that the flexible support plate 50 may bend around the Y-axis direction.

Figure 7:
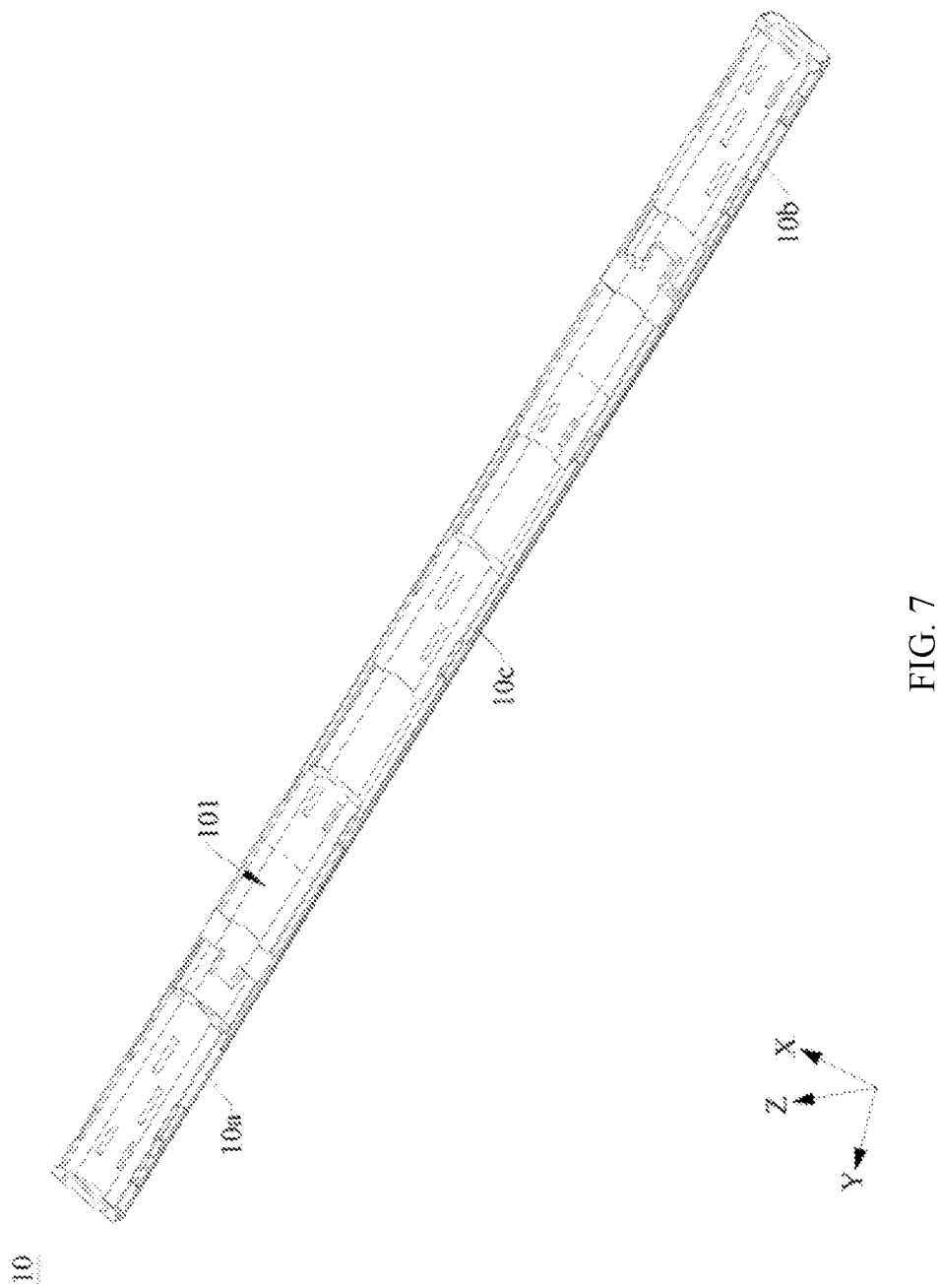
FIG. 7 is a schematic structural diagram of a base in the foldable mechanism shown in FIG. 6.

Refer to FIG. 7, FIG. 7 is a schematic structural diagram of the base 10 in the foldable mechanism 130 shown in FIG. 6.

The base 10 is provided with an avoidance groove 101, and an opening of the avoidance groove 101 is located on a top surface of the base 10. Specifically, the opening of the avoidance groove 101 is located in a middle region of the top surface of the base 10. The avoidance groove 101 is recessed in a direction from the top surface to a bottom surface of the base 10 (the Z-axis negative direction shown in the figure). The avoidance groove 101 extends in the Y-axis direction. The avoidance groove 101 is an arc-shaped groove. That is, a groove bottom wall of the avoidance groove 101 is an arc-shaped surface.

In this embodiment, the base 10 includes a first part 10a, a second part 10b, and a third part 10c, where the first part 10a, the second part 10b, and the third part 10c are sequentially arranged in the Y-axis direction, and the third part 10c is connected between the first part 10a and the second part 10b. The first part 10a is located on the front side of the base 10 and may be mated with the first connection assembly 20a and the first synchronization assembly 60a (as shown in FIG. 6). The second part 10b is located on the rear side of the base 10 and may be mated with the second connection assembly 20b and the second synchronization assembly 60b (as shown in FIG. 6). The third part 10c is located on a middle portion of the base 10 and may be mated with the third connection assembly 20c (as shown in FIG. 6).

It should be noted that, the first part 10a and the second part 10b may be same or similar assemblies, structures that are symmetrical or partially symmetrical, or different structures. For example, the first part 10a and the second part 10b may be centrally symmetrical, to improve the symmetry of the base 10, simplify the whole structure of the base 10, improve the structure stability of the base 10, and reduce manufacturing costs of the base 10. For basic structures of components, a connection relationship between the components, and a connection relationship between the components and other components outside the components in the second part 10b, refer to a related design of the first part 10a, and a detailed structure or position arrangement of the components of the second part 10b may be different from that of the first part 10a.

In this embodiment, the base 10 is an integrally formed structural member, so that the overall strength of the base 10 can be improved, and the structure stability of the base 10 can be ensured. Compared with an existing base structure, the base shown in this embodiment of this application does not need a fixing member such as a screw or a screw nail to implement assembly between a holder and a shaft cover. In this way, a quantity of components of the foldable mechanism 130 is simplified, which is conducive to assembly of the foldable mechanism 130 and may also improve the assembly precision of the base 10.

The base 10 may be made of a high-strength and wear-resistant material, so that the base 10 has a relatively high strength and good wear resistance, thereby preventing the base 10 from being worn and affecting the use reliability of the foldable mechanism 130, and ensuring the use experience of the foldable mechanism 130. For example, the base is integrally formed by a high-strength and wear-resistant metal material such as stainless steel or titanium alloy, or the base 10 may be integrally formed by a stainless steel material and a high-strength plastic material through injection molding, or the base 10 may be integrally formed by titanium alloy and a high-strength plastic material through injection molding, or the base 10 may be integrally formed by aluminum alloy and a high-strength plastic material through injection molding.

Figure 8:
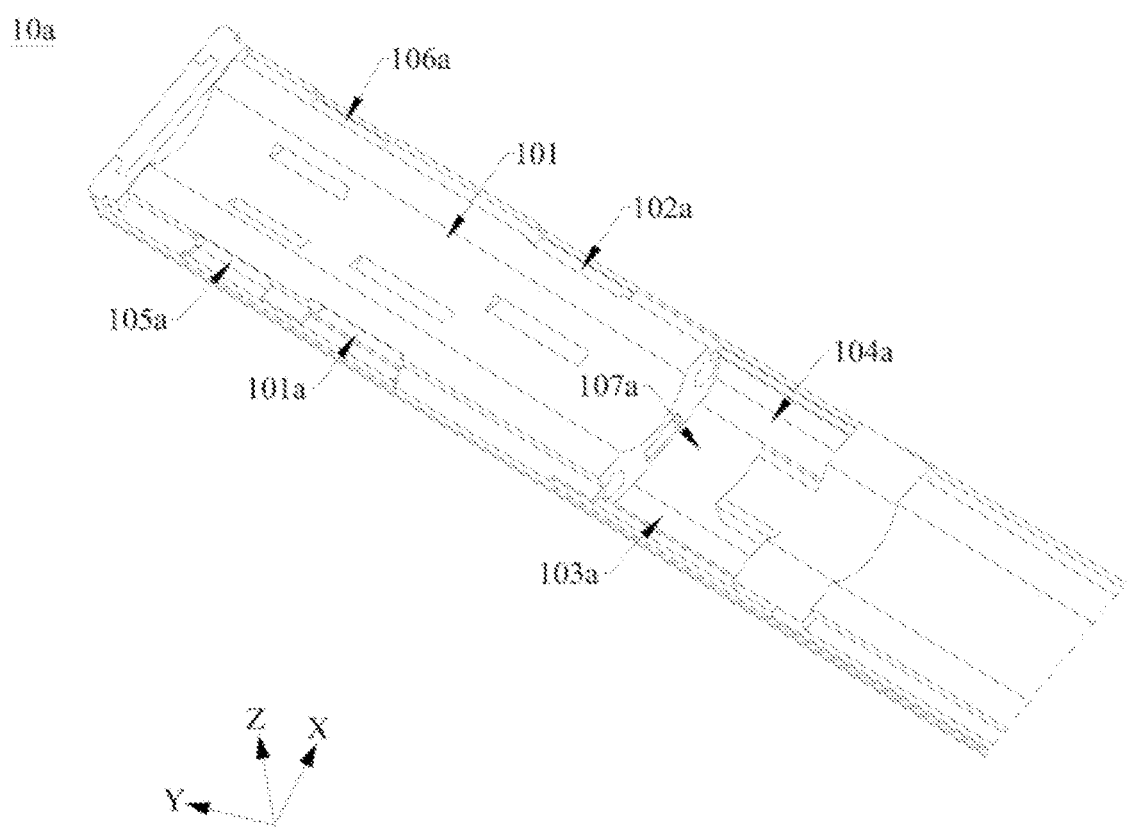
FIG. 8 is a schematic structural diagram of a first part in the base shown in FIG. 7.

Refer to FIG. 7 and FIG. 8, FIG. 8 is a schematic structural diagram of the first part 10a in the base 10 shown in FIG. 7.

The first part 10a of the base 10 is provided with a first sliding groove 101a, a second sliding groove 102a, a first rotating groove 103a, a second rotating groove 104a, a first engagement groove 105a, and a second engagement groove 106a. The first sliding groove 101a, the first rotating groove 103a, and the first engagement groove 105a are all located on a left side of the first part 10a, and all run through a left side surface of the first part 10a and the groove bottom wall of the avoidance groove 101. In the Y-axis negative direction, the first engagement groove 105a, the first sliding groove 101a, and the first rotating groove 103a are sequentially arranged at intervals. The second sliding groove 102a, the second rotating groove 104a, and the second engagement groove 106a are all located on a right side of the first part 10a, and all run through a right side surface of the first part 10a and the groove bottom wall of the avoidance groove 101. In the Y-axis negative direction, the second engagement groove 106a, the second sliding groove 102a, and the second rotating groove 104a are sequentially arranged at intervals.

In the Y-axis direction, the first sliding groove 101a and the second sliding groove 102a are disposed at intervals. In the X-axis direction, the first rotating groove 103a and the second rotating groove 104a are disposed at intervals and opposite to each other, and the first engagement groove 105a and the second engagement groove 106a are disposed at intervals and opposite to each other. The first sliding groove 101a, the second sliding groove 102a, the first engagement groove 105a and the second engagement groove 106a are all arc-shaped grooves. That is, groove bottom walls of the first sliding groove 101a, the second sliding groove 102a, the first engagement groove 105a, and the second engagement groove 106a are all arc-shaped surfaces.

The first rotating groove 103a includes two first groove side walls (not marked in the figure), and in the Y-axis direction, the two first groove side walls are disposed at intervals and opposite to each other. Each first groove side wall is provided with a first mounting hole (not marked in the figure), and the first mounting hole extends in the Y-axis direction. Both the two first mounting holes are circular holes and are disposed coaxially.

It should be noted that, the "coaxially" mentioned in this embodiment of this application refers to that extended lines of axes overlap with each other. For example, A being coaxial with B refers to that an extended line of an axis of A overlaps with an extended line of an axis of B, and description of "coaxially" in the following may be understood as the same meaning.

The second rotating groove 104a includes two second groove side walls (not marked in the figure), and in the Y-axis direction, the two second groove side walls are disposed at intervals and opposite to each other. Each second groove side wall is provided with a second mounting hole (not marked in the figure), and the second mounting hole extends in the Y-axis direction. Both the two second mounting holes are circular holes and are disposed coaxially. In the X-axis direction, each second mounting hole is disposed at intervals with one first mounting hole.

In addition, the first part 10a of the base 10 is further provided with a communication groove 107a, and an opening of the communication groove 107a is located on the groove bottom wall of the avoidance groove 101. The communication groove 107a extends in a direction from the groove bottom wall of the avoidance groove 101 to a bottom surface of the first part 10a (the Z-axis negative direction shown in the figure). Specifically, the communication groove 107a is located between the first rotating groove 103a and the second rotating groove 104a, and is in communication with the first rotating groove 103a and the second rotating groove 104a.

The communication groove 107a includes a third groove side wall and a fourth groove side wall (not marked in the figure), and in the Y-axis direction, the third groove side wall and the fourth groove side wall are disposed at intervals and opposite to each other. The third groove side wall is provided with a third mounting hole (not marked in the figure), and the third mounting hole extends in the Y-axis positive direction. The fourth groove side wall is provided with a bump (not marked in the figure), and the bump extends in the Y-axis positive direction. The bump is provided with a fourth mounting hole (not shown in the figure), and an opening of the fourth mounting hole is located on a surface of the bump away from the fourth groove side wall. The fourth mounting hole extends in the Y-axis negative direction. The third mounting hole and the fourth mounting hole are both square holes, and the third mounting hole and the fourth mounting hole are disposed opposite to each other.

Figure 9:
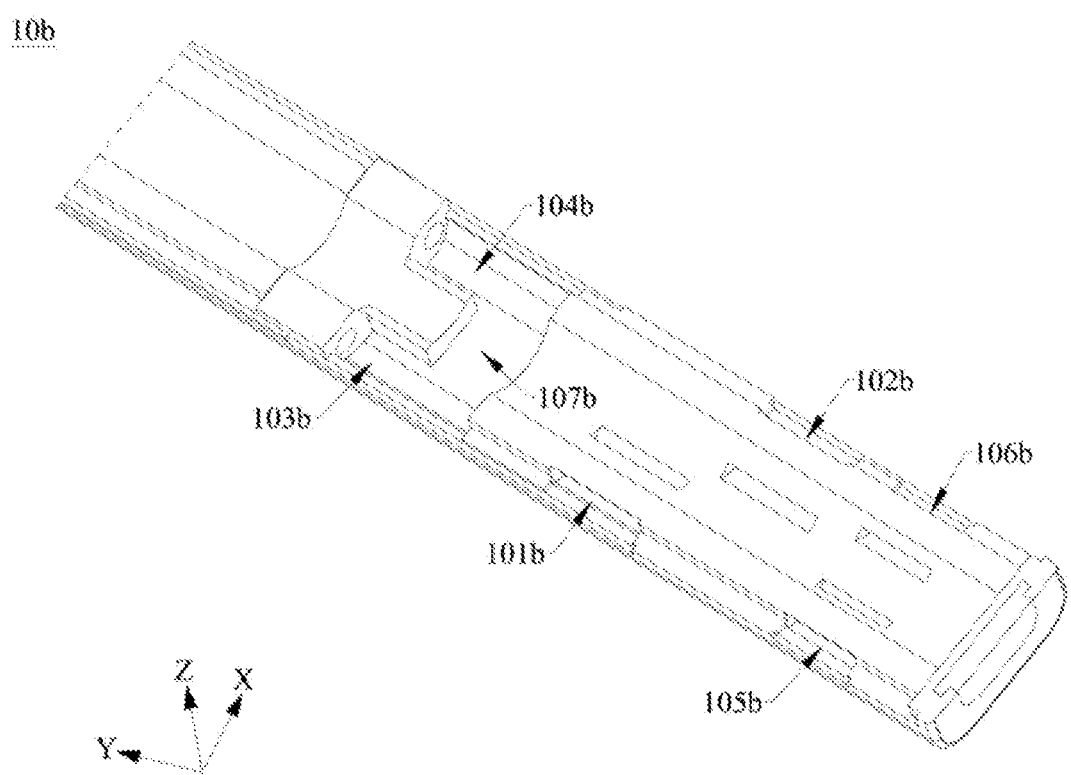
FIG. 9 is a schematic structural diagram of a second part in the base shown in FIG. 7.

Refer to FIG. 8 and FIG. 9, FIG. 9 is a schematic structural diagram of the second part 10b in the base 10 shown in FIG. 7.

The second part 10b of the base 10 is provided with a first sliding groove 101b, a second sliding groove 102b, a first rotating groove 103b, a second rotating groove 104a, a first engagement groove 105b, a second engagement groove 106b, and a communication groove 107b. In this embodiment, for structures of the first sliding groove 101a, the second sliding groove 102b, the first rotating groove 103b, the second rotating groove 104b, the first engagement groove 105b, the second engagement groove 106b, and the communication groove 107b, respectively refer to related description of the first sliding groove 101a, the second sliding groove 102a, the first rotating groove 103a, the second rotating groove 104a, the first engagement groove 105a, the second engagement groove 106a, and the communication groove 107a in the first part 10a in the above, and details are not described herein again. In the Y-axis positive direction, the first engagement groove 105b, the first sliding groove 101b, and the first rotating groove 103b are sequentially arranged at intervals, and the second engagement groove 106b, the second sliding groove 102b, and the second rotating groove 104a are sequentially arranged at intervals.

Figure 10:
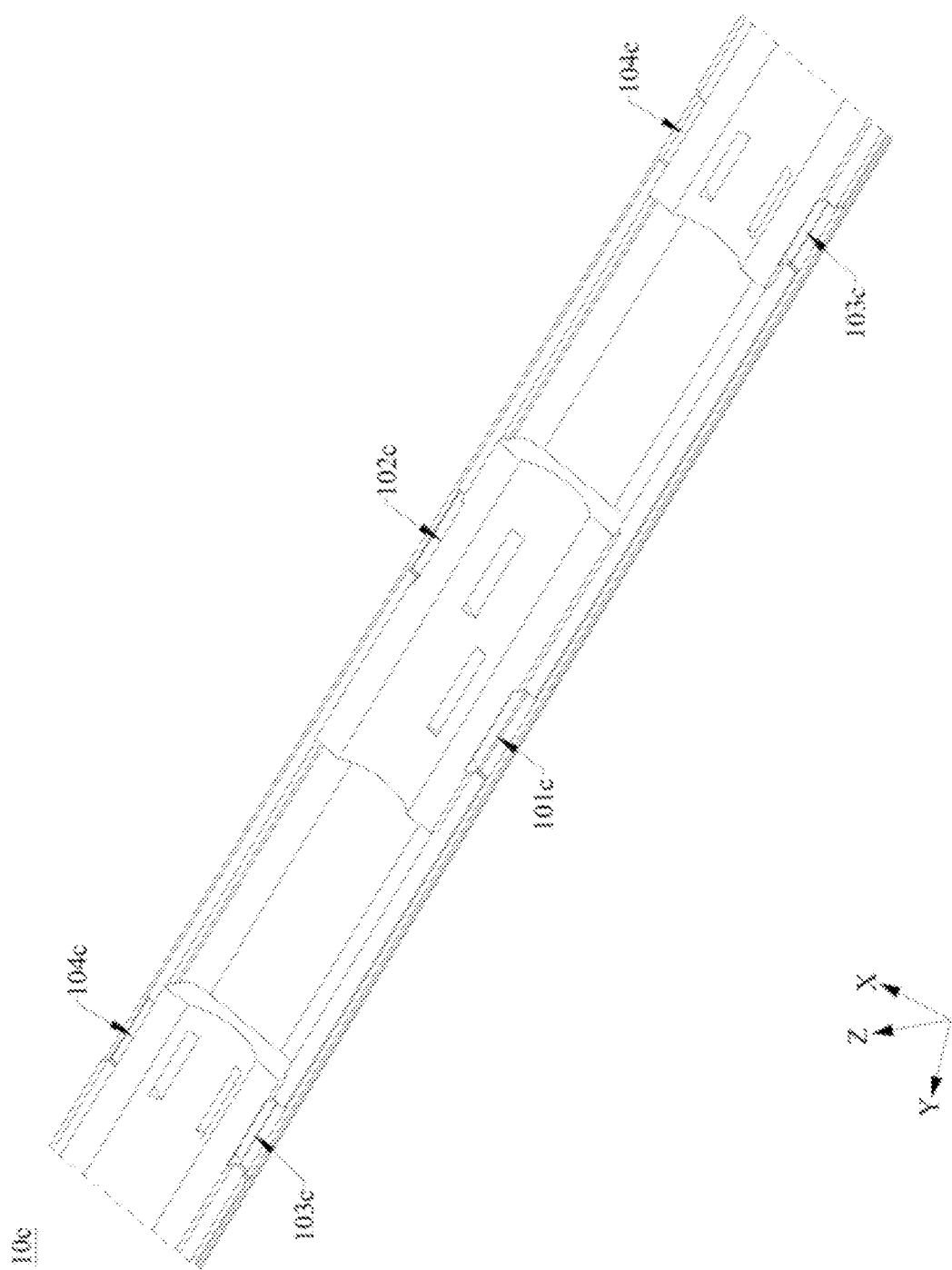
FIG. 10 is a schematic structural diagram of a third part in the base shown in FIG. 7.

Refer to FIG. 8 and FIG. 10, FIG. 10 is a schematic structural diagram of the third part 10c in the base 10 shown in FIG. 7.

The third part 10c of the base 10 is provided with a first sliding groove 101c, a second sliding groove 102c, a first engagement groove 103c, and a second engagement groove 104c. In this embodiment, for structures of the first sliding groove 101c, the second sliding groove 102c, the first engagement groove 103c, and the second engagement groove 104c, respectively refer to related description of the first sliding groove 101a, the second sliding groove 102a, the first engagement groove 105a, and the second engagement groove 106a in the first part 10a in the above, and details are not described herein again.

There are two first engagement grooves 103c and two second engagement grooves 104c. In the Y-axis direction, the two first engagement grooves 103c are respectively located on two opposite sides of the first sliding groove 101c, and the two second engagement grooves 104c are respectively located on two opposite sides of the second sliding groove 102c. In the X-axis direction, one first engagement groove 103c and one second engagement groove 104c are disposed at intervals and opposite to each other.

Figure 11:
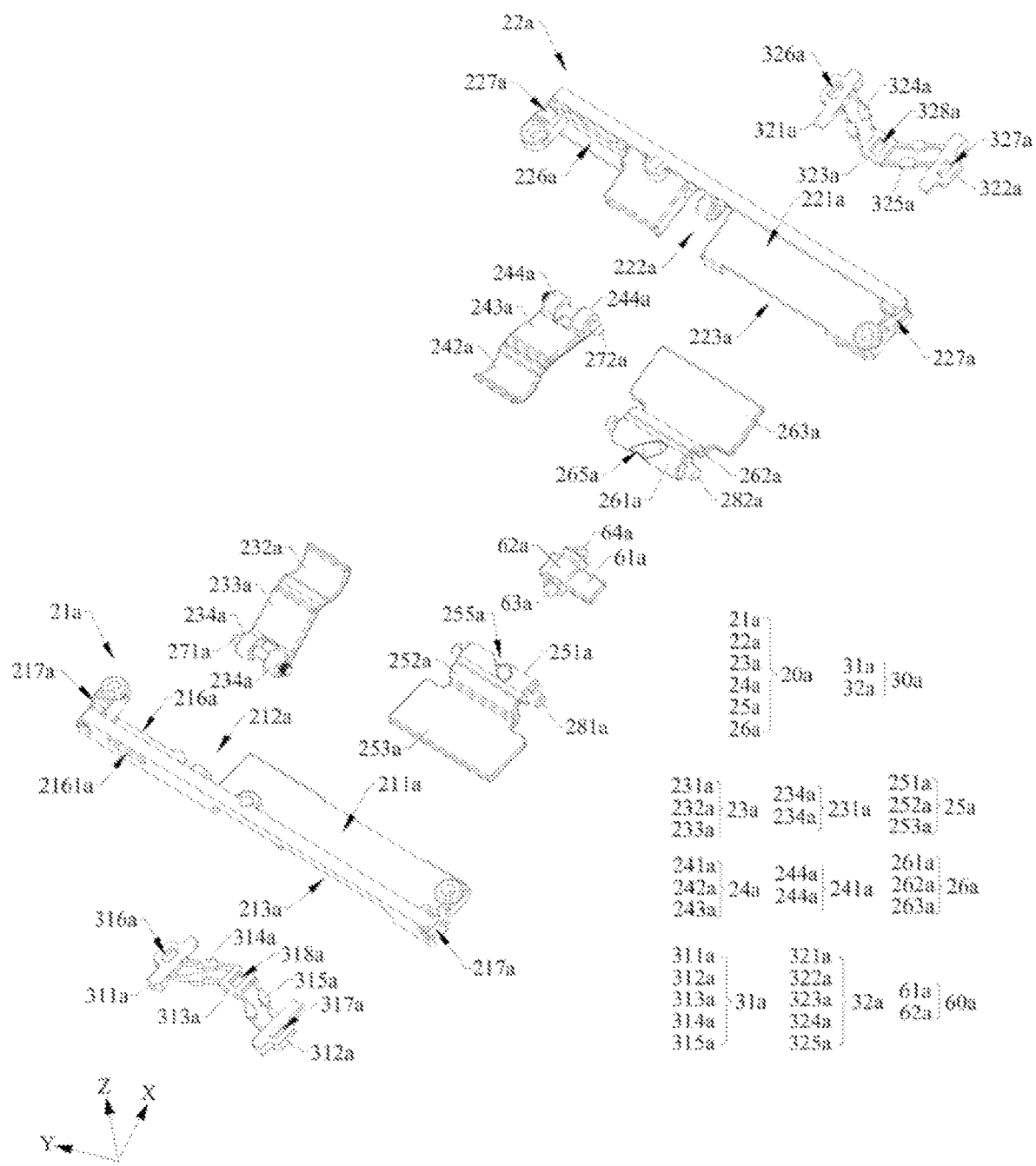
FIG. 11 is a schematic structural diagram of a first connection assembly, a first damping assembly, and a first synchronization assembly in the foldable mechanism shown in FIG. 6.
Figure 12:
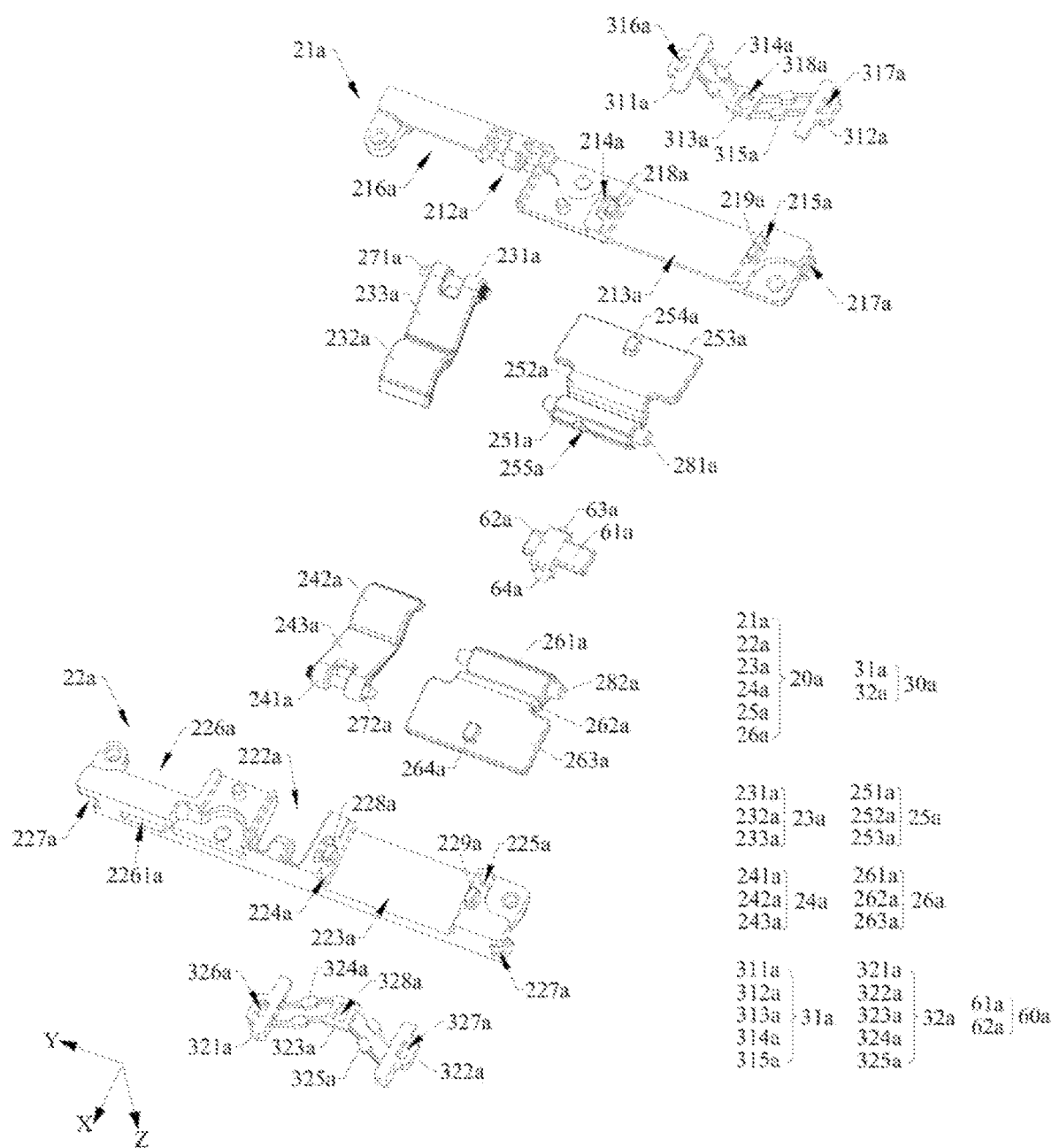
FIG. 12 is a schematic structural diagram of the first connection assembly, the first damping assembly, and the first synchronization assembly shown in FIG. 11 from another perspective.

Refer to FIG. 8, FIG. 11, and FIG. 12, FIG. 11 is a schematic structural diagram of the first connection assembly 20a, the first damping assembly 30a, and the first synchronization assembly 60a in the foldable mechanism 130 shown in FIG. 6, and FIG. 12 is a schematic structural diagram of the first connection assembly 20a, the first damping assembly 30a, and the first synchronization assembly 60a shown in FIG. 11 from another perspective.

The first fixing frame 21a is provided with a receiving notch 211a, a mounting notch 212a, a chute 213a, a first mounting groove 214a, a second mounting groove 215a, an avoidance groove 216a, and a guiding groove 217a. An opening of the receiving notch 211a is located on a top surface of the first fixing frame 21a. The receiving notch 211a is recessed in a direction from the top surface to a bottom surface of the first fixing frame 21a (that is, the Z-axis negative direction shown in the figure), and runs through a front end surface, a rear end surface, and a right side surface of the first fixing frame 21a. In some other embodiments, the receiving notch 211a may not run through the front end surface of the first fixing frame 21a, and/or the receiving notch 211a may not run through the rear end surface of the first fixing frame 21a, and/or the receiving notch 211a may not run through the right side surface of the first fixing frame 21a.

An opening of the mounting notch 212a is located on the right side surface of the first fixing frame 21a. The mounting notch 212a is recessed in a direction from the right side surface to a left side surface of the first fixing frame 21a (the X-axis negative direction shown in the figure), and runs through the bottom surface of the first fixing frame 21a and a groove bottom wall of the receiving notch 211a. In some other embodiments, the mounting notch 212a may not run through the bottom surface of the first fixing frame 21a.

The mounting notch 212a includes two groove side walls disposed opposite to each other and a groove bottom wall (not marked in the figure) connected between the two groove side walls. The two groove side walls of the mounting notch 212a are both provided with a mounting hole (not marked in the figure), and the mounting hole is recessed in the Y-axis direction. The two mounting holes are circular holes, and the two mounting holes are coaxial. For example, axes of the two mounting holes are parallel to the Y-axis direction.

The groove bottom wall of the mounting notch 212a is convexly provided with a mounting boss (not marked in the figure), and the mounting boss is disposed at intervals with the two groove side walls of the mounting notch 212a. The mounting boss is provided with a through hole (not marked in the figure), and in the Y-axis direction, the through hole runs through the mounting boss. The through hole is a circular hole, and the through hole is coaxial with the two mounting holes. For example, an axis of the through hole is parallel to the Y-axis direction. In some other embodiments, the groove bottom wall of the mounting notch 212a may not be convexly provided with the mounting boss.

The chute 213a is located on one side of the mounting notch 212a facing the Y-axis negative direction, and is disposed at intervals with the mounting notch 212a. An opening of the chute 213a is located on the right side surface of the first fixing frame 21a. The chute 213a is recessed in a direction from the right side surface to the left side surface of the first fixing frame 21a, and runs through the left side surface of the first fixing frame 21a and the bottom surface of the first fixing frame 21a. For example, a cross section of the chute 213a is in a square shape. In some other embodiments, the cross section of the chute 213a may alternatively be a circular hole or a special-shaped hole.

In the Y-axis direction, the first mounting groove 214a and the second mounting groove 215a are located on two opposite sides of the chute 213a, and are in communication with the chute 213a. The first mounting groove 214a is located on one side of the chute 213a facing the Y-axis positive direction. An opening of the first mounting groove 214a is located on the bottom surface of the first fixing frame 21a. The first mounting groove 214a is recessed in a direction from the bottom surface to the top surface of the first fixing frame 21a, and runs through a groove side wall of the chute 213a. A groove side wall of the first mounting groove 214a is convexly provided with a first fixing block 218a, and the first fixing block 218a extends from the groove bottom wall of the first mounting groove 214a in the Z-axis negative direction. For example, the first fixing block 218a is in a shape of a square block.

The second mounting groove 215a is located on one side of the chute 213a facing the Y-axis negative direction. A structure of the second mounting groove 215a is approximately the same as the structure of the first mounting groove 214a, and is not described herein again. A groove bottom wall of the second mounting groove 215a is convexly provided with a second fixing block 219a. For example, the second fixing block 219a is in a shape of a square block.

The avoidance groove 216a is located on one side of the mounting notch 212a away from the chute 213a, and is disposed at intervals with the mounting notch 212a. An opening of the avoidance groove 216a is located on the right side surface of the first fixing frame 21a. The avoidance groove 216a is recessed in a direction from the right side surface to the left side surface of the first fixing frame 21a, and runs through the bottom surface of the first fixing frame 21a and the groove bottom wall of the receiving notch 211a. In addition, a groove bottom wall of the avoidance groove 216a is provided with a sliding hole 2161a, and the sliding hole 2161a extends in the X-axis negative direction and runs through the left side surface of the first fixing frame 21a. For example, the sliding hole 2161a is a square hole.

In some other embodiments, the avoidance groove 216a may not run through the bottom surface of the first fixing frame 21a, and/or the avoidance groove 216a may not run through the groove bottom wall of the receiving notch 211a, and/or the groove bottom wall of the avoidance groove 216a may not be provided with the sliding hole 2161a, or the sliding hole 2161a may not run through the left side surface of the first fixing frame 21a.

An opening of the guiding groove 217a is located on the groove bottom wall of the receiving notch 211a. The guiding groove 217a is recessed in a direction from the groove bottom wall of the receiving notch 211a to the bottom surface of the first fixing frame 21a (the Z-axis negative direction shown in the figure), and runs through the left side surface of the first fixing frame 21a. The guiding groove 217a is an arc-shaped groove. That is, a groove bottom wall of the guiding groove 217a is an arc-shaped surface. In some other embodiments, the guiding groove 217a may not run through the left side surface of the first fixing frame 21a.

In this embodiment, there are two guiding grooves 217a. One guiding groove 217a is located on one side of the avoidance groove 216a away from the mounting notch 212a, is disposed at intervals with the avoidance groove 216a, and runs through the top surface of the first fixing frame 21a and the front end surface of the first fixing frame 21a. The other guiding groove 217a is located on one side of the chute 213a away from the mounting notch 212a, is disposed at intervals with the chute 213a, and runs through the top surface of the first fixing frame 21a and the rear end surface of the first fixing frame 21a. In some other embodiments, the guiding groove 217a may not run through the top surface of the first fixing frame 21a, and/or the guiding groove 217a may not run through the front end surface of the first fixing frame 21a, and/or the guiding groove 217a may not run through the rear end surface of the first fixing frame 21a.

In this embodiment, the first primary swing arm 23a includes a rotating portion 231a, a connection portion 232a, and a sliding portion 233a, where the connection portion 232a is connected between the rotating portion 231a and the sliding portion 233a. The rotating portion 231a includes two sub-rotating portions 234a, and the two sub-rotating portions 234a are arranged at intervals in the Y-axis direction. Each sub-rotating portion 234a is provided with a through hole (not marked in the figure), and in the Y-axis direction, the through hole runs through the sub-rotating portion 234.

A structure of the rotating portion 231a is adapted to a structure of the mounting notch 212a. In addition, the first connection assembly 20a further includes a first pin shaft 271a, and the first pin shaft 271a may run through the through holes of the two sub-rotating portions 234a. Specifically, the first pin shaft 271a may be mounted in the mounting notch 212a. The first pin shaft 271a may run through the through hole of the mounting boss in the mounting notch 212a. Two ends of the first pin shaft 271a are respectively mounted in the mounting holes of the two groove side walls of the mounting notch 212a, and are respectively fixedly connected to hole walls of the two mounting holes. In this embodiment, the first pin shaft 271a is a circular shaft, and an axis of the first pin shaft 271a is parallel to the Y-axis direction. The two sub-rotating portions 234a may rotate relative to the first pin shaft 271a, to implement a rotatable connection between the rotating portion 231a and the first pin shaft 271a, and further implement a rotatable connection between the first primary swing arm 23a and the first fixing frame 21a.

The connection portion 232a is in a shape of a flat plate. A structure of the sliding portion 233a is adapted to a structure of the first sliding groove 101a. The sliding portion 233a is in a shape of an arc-shaped plate, and an axis of the sliding portion 233a is parallel to the Y-axis direction. The sliding portion 233a is mounted in the first sliding groove 101a, and may slide and rotate in the first sliding groove 101a, to implement a slidable and rotatable connection between the sliding portion 233a and the base 10, and further implement a slidable and rotatable connection between the first primary swing arm 23a and the base 10. In this case, the sliding portion 233a and the first sliding groove 101a are coaxial.

It may be understood that, since the base 10 is an integrally formed structural member, the first sliding groove 101a does not need to be formed through cooperation of a shaft cover and a holder. In the foldable mechanism 130, a sum of a thickness of the first sliding groove 101a and a thickness of the sliding portion 233a is relatively small, so that space occupied by the foldable mechanism 130 can be reduced, which is conducive to implement a light and thin design of the foldable mechanism 130.

In this embodiment, the first secondary swing arm 25a includes a rotating portion 251a, a connection portion 252a, and a sliding portion 253a, where the connection portion 252a is connected between the rotating portion 251a and the sliding portion 253a. The sliding portion 253a is in a shape of a flat plate. A bottom surface of the sliding portion 253a is convexly provided with a third fixing block 254a, and the third fixing block 254a extends in the Z-axis negative direction. The third fixing block 254a is disposed in a middle region of the bottom surface of the sliding portion 253a. For example, the third fixing block 254a is in a shape of a square block.

A structure of the sliding portion 253a is adapted to a structure of the chute 213a. The sliding portion 253a may be mounted in the chute 213a, and may slide relative to the first fixing frame 21a in the chute 213a, to implement a slidable connection between the first secondary swing arm 25a and the first fixing frame 21a.

In this embodiment, the rotating portion 251a is in a shape of a cylinder. The rotating portion 251a is provided with a through hole (not marked in the figure) and a first spiral groove 255a. In the Y-axis direction, the through hole runs through the rotating portion 251a. The first spiral groove 255a is located on one side of the rotating portion 251a away from the connection portion 252a. The first spiral groove 255a extends along an axis of the rotating portion 251a in a winding manner.

A structure of the rotating portion 251a is adapted to a structure of the first rotating groove 103a. In addition, the first connection assembly 20a further includes a first rotating shaft 281a, and the first rotating shaft 281a runs through the through hole of the rotating portion 251a. Specifically, the first rotating shaft 281a may be mounted in the first rotating groove 103a. Two ends of the first rotating shaft 281a are respectively mounted in the first mounting holes of the two first groove side walls in the first rotating groove 103a, and are respectively fixedly connected to hole walls of the two first mounting holes. The rotating portion 251a may rotate relative to the first rotating shaft 281a, to implement a rotatable connection between the rotating portion 251a and the base 10, and further implement a rotatable connection between the first secondary swing arm 25a and the base 10.

In this embodiment, the first rotating shaft 281a is a circular shaft, an axis of the first rotating shaft 281a is parallel to the Y-axis direction, and the first rotating shaft is coaxial with the rotating portion 251a. In this case, the rotation center of the rotating portion 251a of the first secondary swing arm 25a relative to the base 10 is the axis of the first rotating shaft 281a. That is, the rotation center of the first secondary swing arm 25a relative to the base 10 is the axis of the first rotating shaft 281a.

The second fixing frame 22a is provided with a receiving notch 221a, a mounting notch 222a, a chute 223a, a first mounting groove 224a, a second mounting groove 225a, an avoidance groove 226a, and a guiding groove 227a. For structures of the receiving notch 221a, the mounting notch 222a, the chute 223a, the first mounting groove 224a, the second mounting groove 225a, the avoidance groove 226a, and the guiding groove 227a, respectively refer to related description of the receiving notch 211a, the mounting notch 212a, the chute 213a, the first mounting groove 214a, the second mounting groove 215a, the avoidance groove 216a, and the guiding groove 217a in the first fixing frame 21a, and details are not described herein again.

The receiving notch 221a further runs through a left side surface of the second fixing frame 22a. Openings of the mounting notch 222a and the chute 223a are located on the left side surface of the second fixing frame 22a. A groove bottom wall of the first mounting groove 224a is convexly provided with a first fixing block 228a, and a groove bottom wall of the second mounting groove 225a is convexly provided with a second fixing block 229a. An opening of the avoidance groove 226a is located on the left side surface of the second fixing frame 22a, a groove bottom wall of the avoidance groove 226a is provided with a sliding hole 2261a, and the sliding hole 2261a extends in the X-axis positive direction and runs through a right side surface of the second fixing frame 22a.

The second primary swing arm 24a includes a rotating portion 241a, a connection portion 242a, and a sliding portion 243a, where the connection portion 242a is connected between the rotating portion 241a and the sliding portion 243a. For a structure of the second primary swing arm 24a, refer to related description of the first primary swing arm 23a in the above, and details are not described herein again.

The rotating portion 241a includes two sub-rotating portions 244a. A structure of the rotating portion 241a is adapted to a structure of the mounting notch 222a. In addition, the first connection assembly 20a further includes a second pin shaft 272a, and the second pin shaft 272a may run through through holes (not shown in the figure) of the two sub-rotating portions 244a. Specifically, the second pin shaft 272a may be mounted in the mounting notch 222a. The second pin shaft 272a is a circular shaft, and an axis of the second pin shaft 272a is parallel to the Y-axis direction. The two sub-rotating portions 244a may rotate relative to the second pin shaft 272a, to implement a rotatable connection between the rotating portion 241a and the second pin shaft 272a, and further implement a rotatable connection between the second primary swing arm 24a and the second fixing frame 22a.

A structure of the sliding portion 243a is adapted to a structure of the second sliding groove 102a. The sliding portion 243a is in a shape of an arc-shaped plate, and an axis of the sliding portion 243a is parallel to the Y-axis direction. The sliding portion 243a is mounted in the second sliding groove 102a, and may slide and rotate in the second sliding groove 102a, to implement a slidable and rotatable connection between the sliding portion 243a and the base 10, and further implement a slidable and rotatable connection between the second primary swing arm 24a and the base 10. The sliding portion 243a and the second sliding groove 102a are coaxial.

It may be understood that, since the base 10 is an integrally formed structural member, the second sliding groove 102a does not need to be formed through cooperation of a shaft cover and a holder. A sum of a thickness of the second sliding groove 102a and a thickness of the sliding portion 243a is relatively small, so that space occupied by the foldable mechanism 130 can be reduced, which is conducive to implement a light and thin design of the foldable mechanism 130.

The second secondary swing arm 26a includes a rotating portion 261a, a connection portion 262a, and a sliding portion 263a, where the connection portion 262a is connected between the rotating portion 261a and the sliding portion 263a. For a structure of the second secondary swing arm 26a, refer to related description of the first secondary swing arm 25a in the above, and details are not described herein again.

A bottom surface of the sliding portion 263a is convexly provided with a third fixing block 264a. A structure of the sliding portion 263a is adapted to a structure of the chute 223a. The sliding portion 263a may be mounted in the chute 223a, and may slide relative to the second fixing frame 22a in the first chute 223a, to implement a slidable connection between the sliding portion 263a and the second fixing frame 22a, and further implement a slidable connection between the second secondary swing arm 26a and the second fixing frame 22a.

The rotating portion 261a is provided with a through hole (not marked in the figure) and a second spiral groove 265a. A structure of the rotating portion 261a is adapted to a structure of the second rotating groove 104a. In addition, the first connection assembly 20a further includes a second rotating shaft 282a, and the second rotating shaft 282a runs through the through hole of the rotating portion 261a. Specifically, the second rotating shaft 282a may be mounted in the second rotating groove 104a. The rotating portion 261a may rotate relative to the second rotating shaft 282a, to implement a rotatable connection between the rotating portion 261a and the base 10, and further implement a rotatable connection between the second secondary swing arm 26a and the base 10.

The second rotating shaft 282a is a circular shaft, and an axis of the second rotating shaft 282a is parallel to the Y-axis direction. In this case, the rotation center of the rotating portion 261a of the second secondary swing arm 26a relative to the base 10 is the axis of the second rotating shaft 282a. That is, the rotation center of the second secondary swing arm 26a relative to the base 10 is the axis of the second rotating shaft 282a.

In a process that the first connection assembly 20a is switched between the folded state and the unfolded state, when the first fixing frame 21a rotates relative to the base 10, the first fixing frame 21a drives the first primary swing arm 23a to rotate relative to the first fixing frame 21a, drives the first primary swing arm 23a to slide and rotate relative to the base 10, further drives the first secondary swing arm 25a to slide relative to the first fixing frame 21a, and further drives the first secondary swing arm 25a to rotate relative to the base 10. Similarly, when the second fixing frame 22a rotates relative to the base 10, the second fixing frame 22a drives the second primary swing arm 24a to rotate relative to the second fixing frame 22a, drives the second primary swing arm 24a to slide and rotate relative to the base 10, further drives the second secondary swing arm 26a to slide relative to the second fixing frame 22a, and further drives the second secondary swing arm 26a to rotate relative to the base 10.

The first damping member 31a includes a first fixing portion 311a, a second fixing portion 312a, a third fixing portion 313a, a first connecting portion 314a, and a second connecting portion 315a. The third fixing portion 313a is located between the first fixing portion 311a and the second fixing portion 312a, and is disposed at intervals with the first fixing portion 311a and the second fixing portion 312a. The first connecting portion 314a is fixedly connected between the first fixing portion 311a and the third fixing portion 313a. The second connecting portion 315a is fixedly connected between the second fixing portion 312a and the third fixing portion 313a. The first damping member 31a is an integrally formed structural member.

The first fixing portion 311a is provided with a first fixing hole 316a, and the first fixing hole 316a runs through the first fixing portion 311a in a thickness direction of the first fixing portion 311a. The second fixing portion 312a is provided with a second fixing hole 317a, and the second fixing hole 317a runs through the second fixing portion 312a in a thickness direction of the second fixing portion 312a. The third fixing portion 313a is provided with a third fixing hole 318a, and the third fixing hole 318a runs through the third fixing portion 313a in a thickness direction of the third fixing portion 313a.

Specifically, the first fixing portion 311a is mounted in the first mounting groove 214a, and the second fixing portion 312a is mounted in the second mounting groove 215a, to implement assembly between the first damping member 31a and the first fixing frame 21a. The third fixing portion 313a is fixedly connected to the sliding portion 253a of the first secondary swing arm 25a, to implement a fixed connection between the first damping member 31a and the first secondary swing arm 25a. The first fixing block 218a is mounted in the first fixing hole 316a, the second fixing block 219a is mounted in the second fixing hole 317a, and the third fixing block 254a is mounted in the third fixing hole 318a.

When the first secondary swing arm 25a slides relative to the first fixing frame 21a, the sliding portion 253a drives the third fixing portion 313a to move relative to the first fixing portion 311a and the second fixing portion 312a, and the first connecting portion 314a and the second connecting portion 315a are deformed to generate a damping force. In a process that the user folds or unfolds the foldable terminal 1000, the user can feel the damping force generated by the first connecting portion 314a and the second connecting portion 315a due to deformation, so that the user can feel a good hand feeling, thereby improving the use experience of the user.

The second damping member 32a includes a first fixing portion 321a, a second fixing portion 322a, a third fixing portion 323a, a first connecting portion 324a, and a second connecting portion 325a. For the first fixing portion 321a, the second fixing portion 322a, the third fixing portion 323a, the first connecting portion 324a, and the second connecting portion 325a, respectively refer to related description of the first fixing portion 311a, the second fixing portion 312a, the third fixing portion 313a, the first connecting portion 314a, and the second connecting portion 315a in the first damping member 31a in the above, and details are not described herein again.

Specifically, the first fixing portion 321a is mounted in the first mounting groove 224a, and the second fixing portion 322a is mounted in the second mounting groove 225a, to implement assembly between the second damping member 32a and the second fixing frame 22a. The third fixing portion 323a is fixedly connected to the sliding portion 263a of the second secondary swing arm 26a, to implement a fixed connection between the second damping member 32a and the second secondary swing arm 26a. The first fixing block 228a is mounted in the first fixing hole 326a, the second fixing block 229a is mounted in the second fixing hole 327a, and the third fixing block 264a is mounted in the third fixing hole 328a.

When the second secondary swing arm 26a slides relative to the second fixing frame 22a, the sliding portion 253a drives the third fixing portion 323a to move relative to the first fixing portion 321a and the second fixing portion 322a, and the first connecting portion 324a and the second connecting portion 325a are deformed to generate a damping force. In a process that the user folds or unfolds the foldable terminal 1000, the user can feel the damping force generated by the first connecting portion 324a and the second connecting portion 325a due to deformation, so that the user can feel a good hand feeling, thereby improving the use experience of the user.

When the first connection assembly 20a is switched between the folded state and the unfolded state, the first fixing frame 21a, the second fixing frame 22a, the first secondary swing arm 25a, and the second secondary swing arm 26a all rotate relative to the base 10, and further drives the first damping member 31a and the second damping member 32a to rotate relative to the base 10, so that the first damping assembly 30a is switched between the folded state and the unfolded state.

In the foldable mechanism 130 shown in this embodiment, the first damping assembly 30a mounted on the first connection assembly 20a is used to provide a damping force for a folding process and an unfolding process. Compared with a common damping mechanism that provides damping by using springs and cams, the first damping assembly 30a shown in this embodiment has fewer components and is easy to assemble, so that costs of the foldable mechanism 130 can be reduced, and the structure of the foldable mechanism 130 can be simplified. In addition, the first damping assembly 30a may be further directly mounted on the first connection assembly 20a without being mounted on the base 10. Therefore, the first damping assembly 30a does not need to occupy space of the base 10, which is conducive to implement a light and thin design of the foldable mechanism 130.

In some other embodiments, the first damping assembly 30a may alternatively provide the damping force in the folding process and the unfolding process of the foldable mechanism 130 by using springs and cams, which is not specifically limited in this application.

The first synchronization assembly 60 includes a fixing column 61a and a synchronization slider 62a, where the synchronization slider 62a is sleeved on the fixing column 61a and may slide relative to the fixing column 61a. The synchronization slider 62a is provided with a first cam 63a and a second cam 64a, and the first cam 63a and the second cam 64a are respectively located on two opposite sides of the synchronization slider 62a. A structure of the first cam 63a is adapted to a structure of the first spiral groove 255a, and a structure of the second cam 64a is adapted to a structure of the second spiral groove 265a.

The first synchronization assembly 60a is mounted in the communication groove 107a. Specifically, the fixing column 61a and the synchronization slider 62a are both mounted in the communication groove 107a, and the first cam 63a is mounted in the first spiral groove 255a and may slide relative to the rotating portion 251a in the first spiral groove 255a. The second cam 64a is mounted in the second spiral groove 265a and may slide relative to the rotating portion 261a in the second spiral groove 265a. One end of the fixing column 61a is mounted in the third mounting hole of the third groove side wall, and the other end is mounted in the fourth mounting hole of the bump and is fixedly connected to a hole wall of the fourth mounting hole.

When the first secondary swing arm 25a rotates relative to the base 10, the rotating portion 251a drives the first cam 63a to slide in the first spiral groove 255a, to drive the synchronization slider 62a to slide relative to the fixing column 61a, drive the second cam 64a to slide relative to the rotating portion 261a in the second spiral groove 265a, and further drive the second secondary swing arm 26*a* to rotate relative to the base 10, so as to implement synchronous rotation between the first secondary swing arm 25*a* and the second secondary swing arm 26*a*. Similarly, when the second secondary swing arm 26*a* rotates relative to the base 10, the first synchronization assembly 60*a* may drive the first secondary swing arm 25*a* to rotate relative to the base 10, thereby implementing the synchronous rotation between the first secondary swing arm 25*a* and the second secondary swing arm 26*a*.

In the foldable mechanism 130 shown in this embodiment, synchronous rotation is implemented through cooperation of spiral grooves and cams. Compared with a common manner in which synchronous rotation is implemented through gears, a quantity of components of the foldable mechanism 130 is reduced, so that an assembly error between the components is avoided, and costs of the foldable mechanism 130 are reduced. In addition, a thickness size (a size in the Z-axis direction) of the first synchronization assembly 60*a* is relatively small, which is conducive to reduce a thickness size of the foldable mechanism 130, thereby implementing a light and thin design of the foldable mechanism 130.

In some other embodiments, synchronous rotation may alternatively be implemented by using a synchronization assembly including gears, which is not specifically limited in this application.

Figure 13:
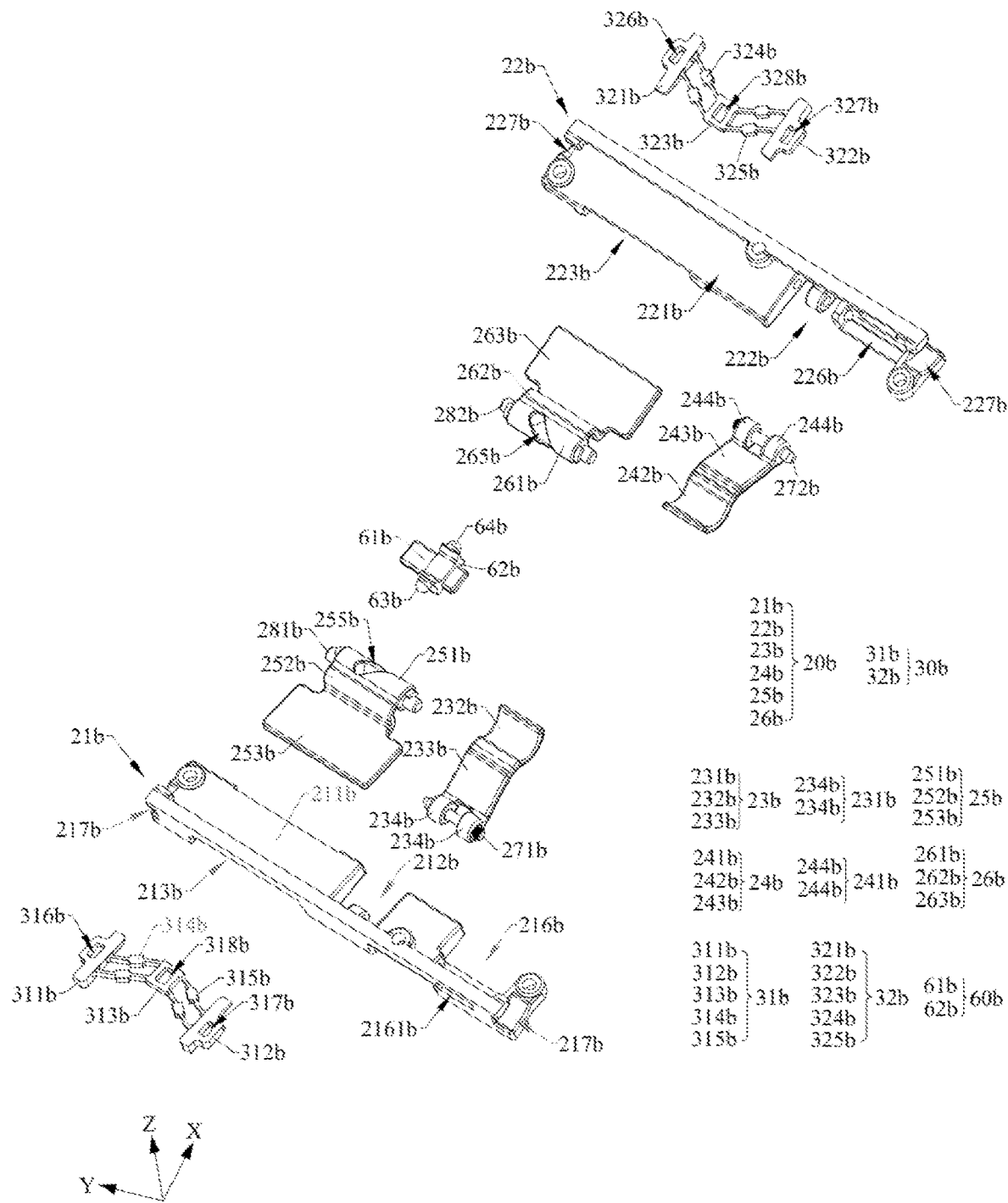
FIG. 13 is a schematic structural diagram of a second connection assembly, a second damping assembly, and a second synchronization assembly in the foldable mechanism shown in FIG. 6.
Figure 14:
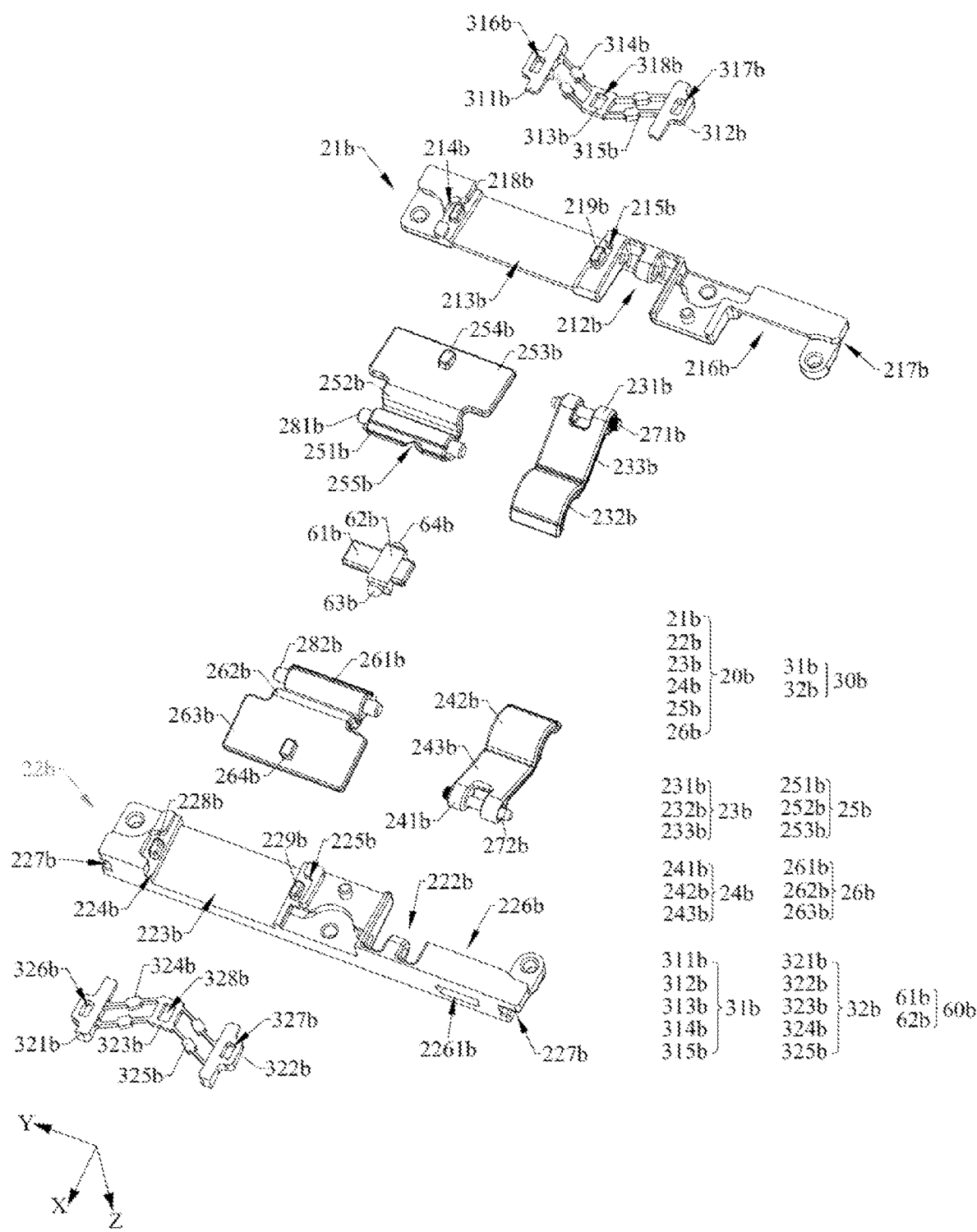
FIG. 14 is a schematic structural diagram of the second connection assembly, the second damping assembly, and the second synchronization assembly shown in FIG. 13 from another perspective.

Refer to FIG. 9, FIG. 13, and FIG. 14, FIG. 13 is a schematic structural diagram of the second connection assembly 20*b*, the second damping assembly 30*b*, and the second synchronization assembly 60*b* in the foldable mechanism 130 shown in FIG. 6, and FIG. 14 is a schematic structural diagram of the second connection assembly 20*b*, the second damping assembly 30*b*, and the second synchronization assembly 60*b* shown in FIG. 13 from another perspective.

The first fixing frame 21*b* is provided with a receiving notch 211*b*, a mounting notch 212*b*, a chute 213*b*, a first mounting groove 214*b*, a second mounting groove 215*b*, an avoidance groove 216*b*, and a guiding groove 217*b*. For structures of the receiving notch 211*b*, the mounting notch 212*b*, the chute 213*b*, the first mounting groove 214*b*, the second mounting groove 215*b*, the avoidance groove 216*b*, and the guiding groove 217*b*, respectively refer to related description of the receiving notch 211*a*, the mounting notch 212*a*, the chute 213*a*, the first mounting groove 214*a*, the second mounting groove 215*a*, the avoidance groove 216*a*, and the guiding groove 217*a* (as shown in FIG. 11 and FIG. 12) in the first fixing frame 21*a* in the above, and details are not described herein again.

The chute 213*b* is located on one side of the mounting notch 212*b* facing the Y-axis positive direction. A groove bottom wall of the first mounting groove 214*b* is convexly provided with a first fixing block 218*b*, and a groove bottom wall of the second mounting groove 215*b* is convexly provided with a second fixing block 219*b*. The avoidance groove 216*b* is located on one side of the mounting notch 212*b* facing the Y-axis negative direction. A groove bottom wall of the avoidance groove 216*b* is provided with a sliding hole 2161*b*.

The first primary swing arm 23*b* includes a rotating portion 231*b*, a connection portion 232*b*, and a sliding portion 233*b*, where the connection portion 232*b* is connected between the rotating portion 231*b* and the sliding portion 233*b*. For a structure of the first primary swing arm 23*b*, refer to related description of the first primary swing arm 23*a* (as shown in FIG. 11 and FIG. 12) in the above, and details are not described herein again.

The rotating portion 231*b* includes two sub-rotating portions 234*b*. A structure of the rotating portion 231*b* is adapted to a structure of the mounting notch 212*b*. In addition, the second connection assembly 20*b* further includes a first pin shaft 271*b*, and the first pin shaft 271*b* may run through through holes (not shown in the figure) of the two sub-rotating portions 234*b*. Specifically, the first pin shaft 271*b* may be mounted in the mounting notch 212*b*. The first pin shaft 271*b* is a circular shaft, an axis of the first pin shaft 271*b* is parallel to the Y-axis direction, and the first pin shaft 271*b* is coaxial with the first pin shaft 271*a* (as shown in FIG. 11 and FIG. 12). The two sub-rotating portions 234*b* may rotate relative to the first pin shaft 271*b*, to implement a rotatable connection between the rotating portion 231*b* and the first pin shaft 271*b*, and further implement a rotatable connection between the first primary swing arm 23*b* and the first fixing frame 21*b*.

A structure of the sliding portion 233*b* is adapted to a structure of the first sliding groove 101*b*. The sliding portion 233*b* is mounted in the first sliding groove 101*b*, and may slide and rotate in the first sliding groove 101*b*, to implement a slidable and rotatable connection between the sliding portion 233*b* and the base 10, and further implement a slidable and rotatable connection between the first primary swing arm 23*b* and the base 10. In this case, the sliding portion 233*b* and the first sliding groove 101*b* are coaxial.

It may be understood that, since the base 10 is an integrally formed structural member, the first sliding groove 101*b* does not need to be formed through cooperation of a shaft cover and a holder. A sum of a thickness of the first sliding groove 101*b* and a thickness of the sliding portion 233*b* is relatively small, so that space occupied by the foldable mechanism 130 can be reduced, which is conducive to implement a light and thin design of the foldable mechanism 130.

The first secondary swing arm 25*b* includes a rotating portion 251*b*, a connection portion 252*b*, and a sliding portion 253*b*, where the connection portion 252*b* is connected between the rotating portion 251*b* and the sliding portion 253*b*. For a structure of the first secondary swing arm 25*b*, refer to related description of the first secondary swing arm 25*b* (as shown in FIG. 11 and FIG. 12) in the first connection assembly 20*a*, and details are not described herein again.

A bottom surface of the sliding portion 253*b* is convexly provided with a third fixing block 254*b*. A structure of the sliding portion 253*b* is adapted to a structure of the chute 213*b*. The sliding portion 253*b* may be mounted in the chute 213*b*, and may slide relative to the first fixing frame 21*b* in the first chute 213*b*, to implement a slidable connection between the sliding portion 253*b* and the first fixing frame 21*b*, and further implement a slidable connection between the first secondary swing arm 25*b* and the first fixing frame 21*b*.

The rotating portion 251*b* is provided with a through hole (not marked in the figure) and a first spiral groove 255*b*. A structure of the rotating portion 251*b* is adapted to a structure of the first rotating groove 103*b*. In addition, the second connection assembly 20*b* further includes a first rotating shaft 281*b*, and the first rotating shaft 281*b* may run through the through hole of the rotating portion 251*b*. Specifically, the first rotating shaft 281*b* may be mounted in the first rotating groove 103*b*. The rotating portion 251*b* may rotate relative to the first rotating shaft 281*b*, to implement a rotatable connection between the rotating portion 251*b* and the base 10, and further implement a rotatable connection between the first secondary swing arm 25b and the base 10.

The first rotating shaft 281b is a circular shaft, an axis of the first rotating shaft 281b is parallel to the Y-axis direction, and the first rotating shaft 281b is coaxial with the first rotating shaft 281a (as shown in FIG. 11 and FIG. 12). In this case, the rotation center of the rotating portion 251b of the first secondary swing arm 25b relative to the base 10 is the axis of the first rotating shaft 281b. That is, the rotation center of the first secondary swing arm 25b relative to the base 10 is the axis of the first rotating shaft 281b.

The second fixing frame 22b is provided with a receiving notch 221b, a mounting notch 222b, a chute 223b, a first mounting groove 224b, a second mounting groove 225b, an avoidance groove 226b, and a guiding groove 227b. For structures of the receiving notch 221b, the mounting notch 222b, the chute 223b, the first mounting groove 224b, the second mounting groove 225b, the avoidance groove 226b, and the guiding groove 227b, respectively refer to related description of the receiving notch 211b, the mounting notch 212b, the chute 213b, the first mounting groove 214b, the second mounting groove 215b, the avoidance groove 216b, and the guiding groove 217b in the first fixing frame 21b, and details are not described herein again.

The receiving notch 221b further runs through a left side surface of the second fixing frame 22b. Openings of the mounting notch 222b and the chute 223b are located on the left side surface of the second fixing frame 22b. A groove bottom wall of the first mounting groove 224b is convexly provided with a first fixing block 228b, and a groove bottom wall of the second mounting groove 225b is convexly provided with a second fixing block 229b. An opening of the avoidance groove 226b is located on the left side surface of the second fixing frame 22, a groove bottom wall of the avoidance groove 226b is provided with a sliding hole 2261b, and the sliding hole 2261b extends in the X-axis positive direction and runs through a right side surface of the second fixing frame 22b.

The second primary swing arm 24b includes a rotating portion 241b, a connection portion 242b, and a sliding portion 243b, where the connection portion 242b is connected between the rotating portion 241b and the sliding portion 243b. For a structure of the second primary swing arm 24b, refer to related description of the first primary swing arm 23b in the above, and details are not described herein again.

The rotating portion 241b includes two sub-rotating portions 244b. A structure of the rotating portion 241b is adapted to a structure of the mounting notch 222b. In addition, the second connection assembly 20b further includes a second pin shaft 272b, and the second pin shaft 272b may run through through holes (not shown in the figure) of the two sub-rotating portions 244b. Specifically, the second pin shaft 272b may be mounted in the mounting notch 222b. The second pin shaft 272b is a circular shaft, an axis of the second pin shaft 272b is parallel to the Y-axis direction, and the second pin shaft 272b is coaxial with the second pin shaft 272a (as shown in FIG. 11 and FIG. 12). The two sub-rotating portions 244b may rotate relative to the second pin shaft 272b, to implement a rotatable connection between the rotating portion 241b and the second pin shaft 272b, and further implement a rotatable connection between the second primary swing arm 24b and the second fixing frame 22b.

A structure of the sliding portion 243b is adapted to a structure of the second sliding groove 102b. The sliding portion 243b is mounted in the second sliding groove 102b, and may slide and rotate in the second sliding groove 102b, to implement a slidable and rotatable connection between the sliding portion 243b and the base 10, and further implement a slidable and rotatable connection between the second primary swing arm 24b and the base 10. The sliding portion 243b and the second sliding groove 102b are coaxial.

It may be understood that, since the base 10 is an integrally formed structural member, the second sliding groove 102b does not need to be formed through cooperation of a shaft cover and a holder. A sum of a thickness of the second sliding groove 102b and a thickness of the sliding portion 243b is relatively small, so that space occupied by the foldable mechanism 130 can be reduced, which is conducive to implement a light and thin design of the foldable mechanism 130.

The second secondary swing arm 26b includes a rotating portion 261b, a connection portion 262b, and a sliding portion 263b, where the connection portion 262b is connected between the rotating portion 261b and the sliding portion 263b. For a structure of the second secondary swing arm 26b, refer to related description of the first secondary swing arm 25b in the above, and details are not described herein again.

A bottom surface of the sliding portion 263b is convexly provided with a third fixing block 264b. A structure of the sliding portion 263b is adapted to a structure of the chute 223b. The sliding portion 263b may be mounted in the chute 223b, and may slide relative to the second fixing frame 22b in the first chute 223b, to implement a slidable connection between the sliding portion 263b and the second fixing frame 22b, and further implement a slidable connection between the second secondary swing arm 26b and the second fixing frame 22b.

The rotating portion 261b is provided with a through hole (not marked in the figure) and a second spiral groove 265b. A structure of the rotating portion 261b is adapted to a structure of the second rotating groove 104b. In addition, the second connection assembly 20b further includes a second rotating shaft 282b, and the second rotating shaft 282b runs through the through hole of the rotating portion 261b. Specifically, the second rotating shaft 282b may be mounted in the second rotating groove 104b. The rotating portion 261b may rotate relative to the second rotating shaft 282b, to implement a rotatable connection between the rotating portion 261b and the base 10, and further implement a rotatable connection between the second secondary swing arm 26b and the base 10.

The second rotating shaft 282b is a circular shaft, an axis of the second rotating shaft 282b is parallel to the Y-axis direction, and the second rotating shaft 282b is coaxial with the second rotating shaft 282a (as shown in FIG. 11 and FIG. 12). In this case, the rotation center of the rotating portion 261b of the second secondary swing arm 26b relative to the base 10 is the axis of the second rotating shaft 282b. That is, the rotation center of the second secondary swing arm 26b relative to the base 10 is the axis of the second rotating shaft 282b.

When the first fixing frame 21b and the second fixing frame 22b rotate relative to the base 10, the first fixing frame 21b drives the first primary swing arm 23b to rotate relative to the first fixing frame 21b, drives the first primary swing arm 23b to slide and rotate relative to the base 10, further drives the first secondary swing arm 25b to slide relative to the first fixing frame 21b, and further drives the first secondary swing arm 25b to rotate relative to the base 10; and the second fixing frame 22b drives the second primary swing arm 24b to rotate relative to the second fixing frame 22b, drives the second primary swing arm 24b to slide and rotate relative to the base 10, further drives the second secondary swing arm 26a to slide relative to the second fixing frame 22b, and further drives the second secondary swing arm 26a to rotate relative to the base 10, to implement mutual switching of the second connection assembly 20b between the folded state and the flattened state.

In this embodiment, the second damping assembly 30b and the first damping assembly 30a (as shown in FIG. 11 and FIG. 12) have a same structure. The first damping member 31b includes a first fixing portion 311b, a second fixing portion 312b, a third fixing portion 313b, a first connecting portion 314b, and a second connecting portion 315b. For the first fixing portion 311b, the second fixing portion 312b, the third fixing portion 313b, the first connecting portion 314b, and the second connecting portion 315b, respectively refer to related description of the first fixing portion 311a, the second fixing portion 312a, the third fixing portion 313a, the first connecting portion 314a, and the second connecting portion 315a (as shown in FIG. 11 and FIG. 12) in the first damping member 31a in the above, and details are not described herein again.

Specifically, the first fixing portion 311b is mounted in the first mounting groove 214b, and the second fixing portion 312b is mounted in the second mounting groove 215b, to implement assembly between the first damping member 31b and the first fixing frame 21b. The third fixing portion 313b is fixedly connected to the sliding portion 253b of the first secondary swing arm 25b, to implement a fixed connection between the first damping member 31b and the first secondary swing arm 25b. The first fixing block 218b is mounted in the first fixing hole 316b, the second fixing block 219b is mounted in the second fixing hole 317b, and the third fixing block 254b is mounted in the third fixing hole 318b.

The second damping member 32b includes a first fixing portion 321b, a second fixing portion 322b, a third fixing portion 323b, a first connecting portion 324b, and a second connecting portion 325b. For the first fixing portion 321b, the second fixing portion 322b, the third fixing portion 323b, the first connecting portion 324b, and the second connecting portion 325b, respectively refer to related description of the first fixing portion 311b, the second fixing portion 312b, the third fixing portion 313b, the first connecting portion 314b, and the second connecting portion 315b (as shown in FIG. 11 and FIG. 12) in the first damping member 31b in the above, and details are not described herein again.

The first fixing portion 321b is mounted in the first mounting groove 224b, and the second fixing portion 322b is mounted in the second mounting groove 225b, to implement assembly between the second damping member 32b and the second fixing frame 22b. The third fixing portion 323b is fixedly connected to the sliding portion 263b of the second secondary swing arm 26b, to implement a fixed connection between the second damping member 32b and the second secondary swing arm 26b. The first fixing block 228b is mounted in the first fixing hole 326b, the second fixing block 229b is mounted in the second fixing hole 327b, and the third fixing block 264b is mounted in the third fixing hole 328b.

In this embodiment, the second synchronization assembly 60b and the first synchronization assembly 60a have a same structure. The second synchronization assembly 60b includes a fixing column 61b and a synchronization assembly 62b. Specifically, the second synchronization assembly 60b is mounted in the communication groove 107b. The fixing column 61b and the synchronization slider 62b are both mounted in the communication groove 107b, and a first cam 63b is mounted in the first spiral groove 255b and may slide relative to the rotating portion 251b in the first spiral groove 255b. A second cam 64b is mounted in the second spiral groove 265b and may slide relative to the rotating portion 261b in the second spiral groove 265b. For structures of components of the second synchronization assembly 60b, and connection relationships between the components and the second connection assembly 20b, refer to related description of the first synchronization assembly 60a.

Figure 15:
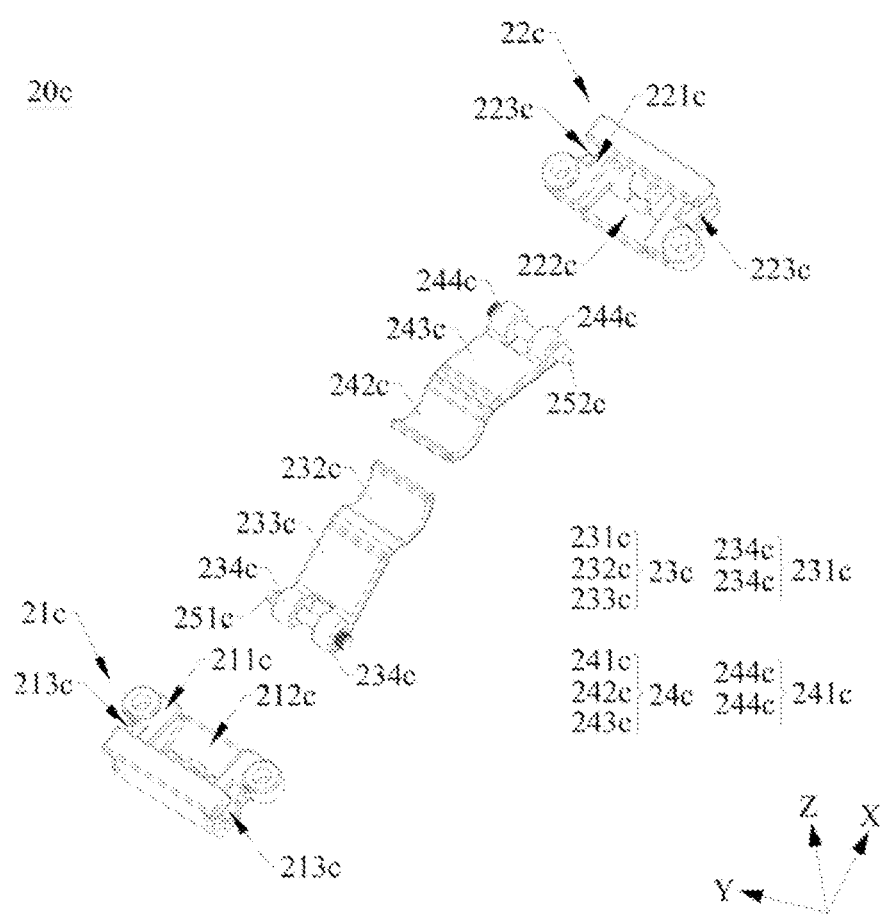
FIG. 15 is a schematic structural diagram of a third connection assembly in the foldable mechanism shown in FIG. 6.
Figure 16:
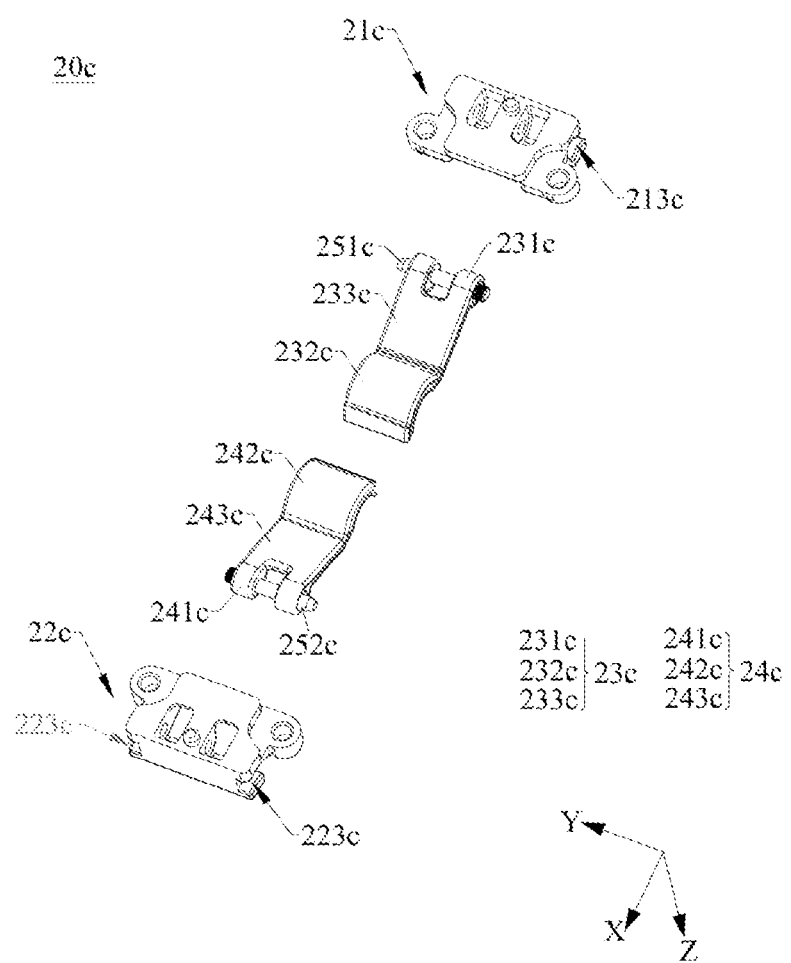
FIG. 16 is a schematic structural diagram of the third connection assembly shown in FIG. 15 from another perspective.

Refer to FIG. 10, FIG. 15, and FIG. 16, FIG. 15 is a schematic structural diagram of the third connection assembly 20c in the foldable mechanism 130 shown in FIG. 6, and FIG. 16 is a schematic structural diagram of the third connection assembly 20c shown in FIG. 15 from another perspective.

The first fixing frame 21c is provided with a receiving notch 211c, a mounting notch 212c, and a guiding groove 213c. For structures of the receiving notch 211c, the mounting notch 212c, and the guiding groove 213c, respectively refer to related description of the receiving notch 211a, the mounting notch 212a, and the guiding groove 217a (as shown in FIG. 11 and FIG. 12) in the first fixing frame 21a in the above, and details are not described herein again. The mounting notch 212c is located in a middle portion of the first fixing frame 21c.

The first primary swing arm 23c includes a rotating portion 231c, a connection portion 232c, and a sliding portion 233c, where the connection portion 232c is connected between the rotating portion 231c and the sliding portion 233c. For a structure of the first primary swing arm 23c, refer to related description of the first primary swing arm 23a (as shown in FIG. 11 and FIG. 12) in the above, and details are not described herein again.

The rotating portion 231c includes two sub-rotating portions 234c. A structure of the rotating portion 231c is adapted to a structure of the mounting notch 212c. In addition, the third connection assembly 20c further includes a first pin shaft 251c, and the first pin shaft 251c may run through through holes (not shown in the figure) of the two sub-rotating portions 234c. Specifically, the first pin shaft 251c may be mounted in the mounting notch 212c. The first pin shaft 251c is a circular shaft, an axis of the first pin shaft 251c is parallel to the Y-axis direction, and the first pin shaft 251c is coaxial with the first pin shaft 271a (as shown in FIG. 11 and FIG. 12). The two sub-rotating portions 234c may rotate relative to the first pin shaft 251c, to implement a rotatable connection between the rotating portion 231c and the first pin shaft 251c, and further implement a rotatable connection between the first primary swing arm 23c and the first fixing frame 21c.

A structure of the sliding portion 233c is adapted to a structure of the first sliding groove 101c. The sliding portion 233c is mounted in the first sliding groove 101c, and may slide and rotate in the first sliding groove 101c, to implement a slidable and rotatable connection between the sliding portion 233c and the base 10, and further implement a slidable and rotatable connection between the first primary swing arm 23c and the base 10. In this case, the sliding portion 233c and the first sliding groove 101c are coaxial.

The second fixing frame 22C is provided with a receiving notch 221c, a mounting notch 222c, and a guiding groove 223c. In this embodiment, for structures of the receiving notch 221c, the mounting notch 222c, and the guiding groove 223c, refer to related description of the receiving notch 211c, the mounting notch 212c, and the guiding groove 213C of the first fixing frame 21c in the above, and details are not described herein again. The receiving notch 221C further runs through a left side surface of the second fixing frame 22c. An opening of the mounting notch 222b is located on the left side surface of the second fixing frame 22c.

The second primary swing arm 24c includes a rotating portion 241c, a connection portion 242c, and a sliding portion 243c, where the connection portion 242C is connected between the rotating portion 241c and the sliding portion 243c. For a structure of the second primary swing arm 24c, refer to related description of the first primary swing arm 23C in the above, and details are not described herein again.

The rotating portion 241c includes two sub-rotating portions 244c. A structure of the rotating portion 241c is adapted to a structure of the mounting notch 222c. In addition, the third connection assembly 20c further includes a second pin shaft 252c, and the second pin shaft 252C may run through through holes (not shown in the figure) of the two sub-rotating portions 244c. Specifically, the second pin shaft 252C may be mounted in the mounting notch 222c. The second pin shaft 252C is a circular shaft, an axis of the second pin shaft 252C is parallel to the Y-axis direction, and the second pin shaft 252C is coaxial with the second pin shaft 272a (as shown in FIG. 11 and FIG. 12). The two sub-rotating portions 244c may rotate relative to the second pin shaft 252c, to implement a rotatable connection between the rotating portion 241C and the second pin shaft 252c, and further implement a rotatable connection between the second primary swing arm 24c and the second fixing frame 22c.

A structure of the sliding portion 243c is adapted to a structure of the second sliding groove 102c. The sliding portion 243c is mounted in the second sliding groove 102c, and may slide and rotate in the second sliding groove 102c, to implement a slidable and rotatable connection between the sliding portion 243c and the base 10, and further implement a slidable and rotatable connection between the second primary swing arm 24c and the base 10. In this case, the sliding portion 243c and the second sliding groove 102c are coaxial.

When the first fixing frame 21c and the second fixing frame 22C rotate relative to the base 10, the first fixing frame 21c drives the first primary swing arm 23c to rotate relative to the first fixing frame 21c, and drives the first primary swing arm 23c to slide and rotate relative to the base 10; and the second fixing frame 22c drives the second primary swing arm 24c to rotate relative to the second fixing frame 22c, and drives the second primary swing arm 24c to slide and rotate relative to the base 10, to implement mutual switching of the third connection assembly 20c between the folded state and the flattened state.

Figure 17:
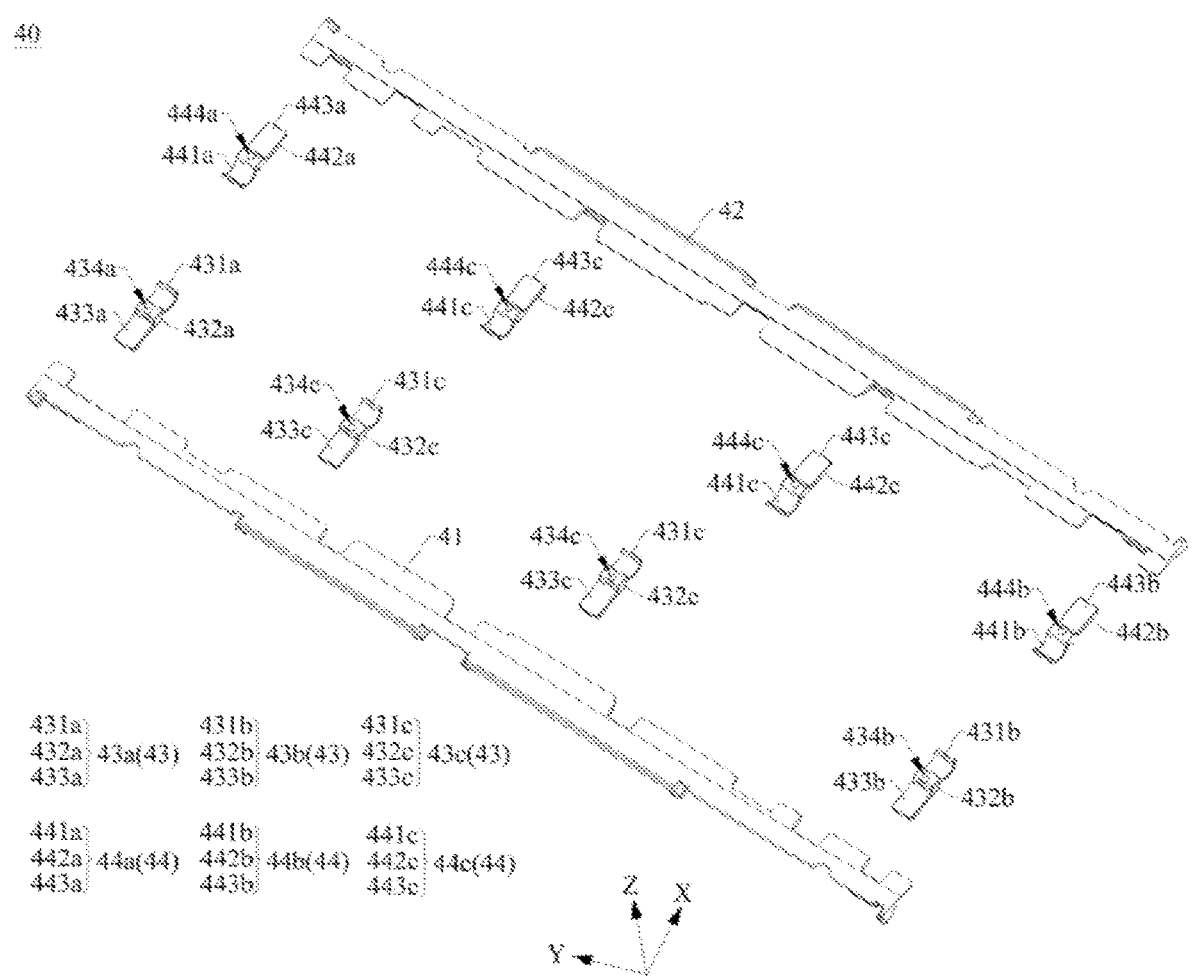
FIG. 17 is a schematic structural diagram of a pressing plate assembly in the foldable mechanism shown in FIG. 6.
Figure 18:
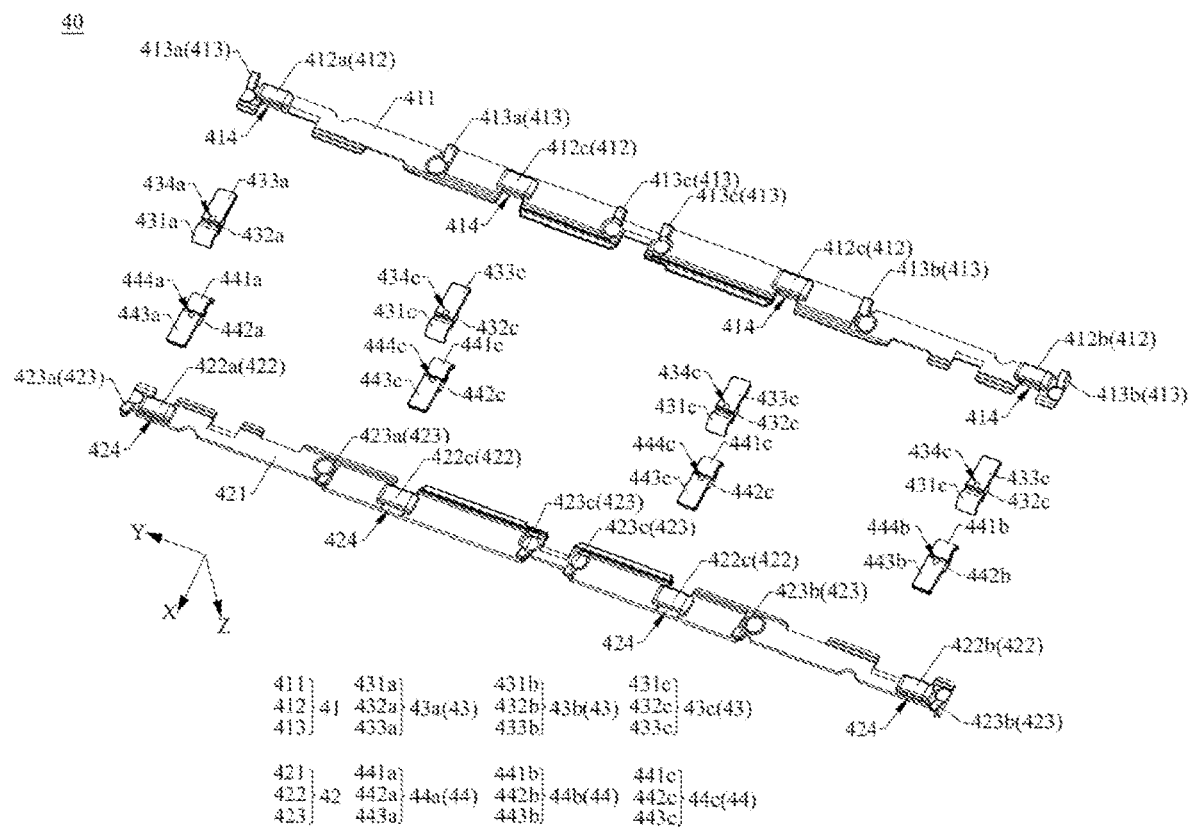
FIG. 18 is a schematic structural diagram of the pressing plate assembly shown in FIG. 17 from another perspective.

Refer to FIG. 17 and FIG. 18, FIG. 17 is a schematic structural diagram of the pressing plate assembly 40 in the foldable mechanism 130 shown in FIG. 6, and FIG. 18 is a schematic structural diagram of the pressing plate assembly 40 shown in FIG. 17 from another perspective.

The first pressing plate 41 includes a support portion 411, an assistance portion 412, and a guiding slider 413, where the assistance portion 412 and the guiding slider 413 are both fixedly connected to the support portion 411. The first pressing plate 41 is an integrally formed structural member, to improve the structural strength of the first pressing plate 41 and ensure the structure stability of the first pressing plate 41.

The integrally formed first pressing plate 41 can reduce structural members of the foldable mechanism 130, facilitates assembly of the foldable mechanism 130, and reduces costs of the foldable mechanism 130, which is conducive to a small-scale design of the foldable mechanism 130. In addition, a weight of the integrally formed first pressing plate 41 is relatively small, which is conducive to implement a lightweight design of the foldable mechanism 130.

In some other embodiments, the first pressing plate 41 may alternatively be an integral structural member formed in an assembling manner. For example, the assistance portion 412 and the guiding slider 413 may be fixedly connected to the support portion 411 through soldering or adhesion.

The support portion 411 is approximately in a shape of a strip-shaped plate. In this embodiment, the support portion 411 extends in the Y-axis direction. The assistance portion 412 is fixedly connected to a bottom surface of the support portion 411. The assistance portion 412 is provided with a sliding hole 414, and an opening of the sliding hole 414 is located on a right side surface of the assistance portion 412. The sliding hole 414 is recessed in a direction from the right side surface to a left side surface of the assistance portion 412 (the X-axis negative direction shown in the figure), and runs through the left side surface of the assistance portion 412. That is, the sliding hole 414 runs through the assistance portion 412 in the X-axis direction. For example, the sliding hole 414 is a square hole.

In some other embodiments, the sliding hole 414 may alternatively not run through the left side surface of the first pressing plate 41, or the assistance portion 412 may alternatively enclose with the support portion 411 to form the sliding hole 414. A specific formation manner of the sliding hole 414 is not limited in this application.

In this embodiment, there are four assistance portions 412, and the four assistance portions 412 are sequentially arranged at intervals in the Y-axis direction. The four assistance portions 412 are respectively a front assistance portion 412a, a rear assistance portion 412b, and middle assistance portions 412c, where there are two middle assistance portions 412c. The front assistance portion 412a is fixedly connected to a front side of the support portion 411, the rear assistance portion 412b is fixedly connected to a rear side of the support portion 411, and the two middle assistance portions 412c are fixedly connected to a middle portion of the support portion 411. In some other embodiments, there may alternatively be one, two, three, or at least five assistance portions 412, and a quantity of the assistance portions 412 is not specifically limited in this application.

The guiding slider 413 is fixedly connected to the bottom surface of the support portion 411, and is disposed at intervals with the assistance portion 412. The guiding slider 413 extends in a direction from the bottom surface to be away from a top surface of the support portion 411. A structure of the guiding slider 413 is adapted to a structure of a guiding groove (for example, the guiding groove 217a shown in FIG. 11, the guiding groove 217b shown in FIG. 13, and the guiding groove 213c shown in FIG. 15). A bottom surface of the guiding slider 413 is an arc-shaped surface.

In this embodiment, there are six guiding sliders 413, and the six guiding sliders 413 are sequentially arranged at intervals in the Y-axis direction. The six guiding sliders 413 are respectively two front guiding sliders 413a, two rear guiding sliders 413b, and two middle guiding sliders 413c. The two front guiding sliders 413a are fixedly connected to the front side of the support portion 411, and are located on two opposite sides of the front assistance portion 412a. The two rear guiding sliders 413b are fixedly connected to the rear side of the support portion 411, and are located on two opposite sides of the rear assistance portion 412b. The two middle guiding sliders 413c are fixedly connected to the middle portion of the support portion 411, are located between the two assistance portions 412c, and are disposed at intervals with the middle assistance portions 412c. In some other embodiments, there may alternatively be less than five or at least seven guiding sliders 413, and a quantity of the guiding sliders 413 is not specifically limited in this application.

In this embodiment, the four first pressing plate swing arms 43 are respectively a first front pressing plate swing arm 43a, a first rear pressing plate swing arm 43b, and first middle pressing plate swing arms 43c, where there are two first middle pressing plate swing arms 43c. In some other embodiments, there may alternatively be less than three or at least five first pressing plate swing arms 43, and a quantity of the first pressing plate swing arms 43 is not specifically limited in this application.

The first front pressing plate swing arm 43a includes a rotating portion 431a, a connection portion 432a, and a sliding portion 433a, where the connection portion 432a is connected between the rotating portion 431a and the sliding portion 433a. The sliding portion 433a is in a shape of a flat plate. A structure of the sliding portion 433a is adapted to a structure of the sliding hole 414 of the front assistance portion 412a. The sliding portion 433a may run through the sliding hole 414 of the front assistance portion 412a, and may slide relative to the first pressing plate 41 in the sliding hole 414 of the front assistance portion 412a, to implement a slidable connection between the first front pressing plate swing arm 43a and the first pressing plate 41.

The connection portion 432a is provided with an assembly hole 434a, and an opening of the assembly hole 434a is located on a top surface of the connection portion 432a. The assembly hole 434a is recessed in a direction from the top surface to a bottom surface of the connection portion 432a (the Z-axis negative direction shown in the figure), and runs through the bottom surface of the connection portion 432a. That is, the assembly hole 434a runs through the connection portion 432a in a thickness direction of the connection portion 432a (the Z-axis direction shown in the figure). For example, the assembly hole 434a is a circular hole. In some other embodiments, the assembly hole 434a may alternatively not run through the bottom surface of the connection portion 432a, and/or the assembly hole 434a may alternatively be a square hole or a special-shaped hole.

A structure of the rotating portion 431a is adapted to a structure of the first engagement groove 105a (as shown in FIG. 8). In this embodiment, the rotating portion 431a is in a shape of an arc-shaped plate, and an axis of the rotating portion 431a is parallel to the Y-axis direction. The rotating portion 431a is mounted in the first engagement groove 105a, and may slide and rotate in the first engagement groove 101a, to implement a slidable and rotatable connection between the first front pressing plate swing arm 43a and the base 10. In this case, the rotating portion 431a and the first engagement groove 105a are coaxial. A rotation center of the first front pressing plate swing arm 43a relative to the base 10 is parallel to the Y-axis direction.

It may be understood that, since the base 10 is an integrally formed structural member, the first engagement groove 105a does not need to be formed through cooperation of a shaft cover and a holder. In the foldable mechanism 130, a sum of a thickness of the first engagement groove 105a and a thickness of the rotating portion 431a is relatively small, so that space occupied by the foldable mechanism 130 can be reduced, which is conducive to implement a light and thin design of the foldable mechanism 130.

The first rear pressing plate swing arm 43b and the first front pressing plate swing arm 43a have a same structure. A connection portion 432b of the first rear pressing plate swing arm 43b is provided with an assembly hole 434b. A structure of a sliding portion 433b in the first rear pressing plate swing arm 43b is adapted to a structure of the sliding hole 414 of the rear assistance portion 412b. The sliding portion 433b may run through the sliding hole 414 of the rear assistance portion 412b, and may slide relative to the first pressing plate 41 in the sliding hole 414 of the rear assistance portion 412b, to implement a slidable connection between the first rear pressing plate swing arm 43b and the first pressing plate 41. A structure of a rotating portion 431b in the first rear pressing plate swing arm 43b is adapted to a structure of the first engagement groove 105b (as shown in FIG. 9). The rotating portion 431b is mounted in the first engagement groove 105b, and may slide and rotate in the first engagement groove 105b, to implement a slidable and rotatable connection between the first rear pressing plate swing arm 43b and the base 10. In this case, the rotating portion 431b and the first engagement groove 105b are coaxial. A rotation center of the first rear pressing plate swing arm 43b relative to the base 10 is parallel to the Y-axis direction, and is coaxial with the rotation center of the first front pressing plate swing arm 43a relative to the base 10.

The first middle pressing plate swing arm 43c and the first front pressing plate swing arm 43a have a same structure. A connection portion 432c of the first middle pressing plate swing arm 43c is provided with an assembly hole 434c. A structure of a sliding portion 433c in the first middle pressing plate swing arm 43c is adapted to a structure of the sliding hole 414 of the middle assistance portion 412c. The sliding portions 433c of the two first middle pressing plate swing arms 43c may respectively run through the sliding holes 414 of the two middle assistance portions 412c, and may slide relative to the first pressing plate 41 in the sliding holes 414, to implement a slidable connection between the two first middle pressing plate swing arms 43c and the first pressing plate 41. A structure of a rotating portion 431c in the first middle pressing plate swing arm 43c is adapted to a structure of the first engagement groove 105c (as shown in FIG. 1). The rotating portions 431c of the two first middle pressing plate swing arms 43c may be respectively mounted in two first engagement grooves 105c, and may slide and rotate in the first engagement grooves 105c, to implement a rotatable connection between the two first middle pressing plate swing arms 43c and the base 10. In this case, the rotating portion 431c and the first engagement groove 105c are coaxial. A rotation center of the first middle pressing plate swing arm 43c relative to the base 10 is parallel to the Y-axis direction, and is coaxial with the rotation center of the first front pressing plate swing arm 43a relative to the base 10.

Refer to FIG. 11, FIG. 13, and FIG. 15 together, the front side of the support portion 411 may be received in the receiving notch 211a of the first fixing frame 21a, the rear side of the support portion 411 may be received in the receiving notch 211b of the first fixing frame 21b, and the middle portion of the support portion 411 may be received in the receiving notch 211c of the first fixing frame 21c.

The front assistance portion 412a may be received in the avoidance groove 216a of the first fixing frame 21a. The sliding hole 414 of the front assistance portion 412a is in communication with the sliding hole 2161a of the first fixing frame 21a, and the sliding portion 433a of the first front pressing plate swing arm 43a may also run through the sliding hole 2161a of the first fixing frame 21a and may slide relative to the first fixing frame 21a in the sliding hole 2161a.

The rear assistance portion 412b may be received in the avoidance groove 216b of the first fixing frame 21b. The sliding hole 414 of the rear assistance portion 412b is in communication with the sliding hole 2161b of the first fixing frame 21b, and the sliding portion 433b of the first rear pressing plate swing arm 43b may also run through the sliding hole 2161b of the first fixing frame 21b and may slide relative to the first fixing frame 21b in the sliding hole 2161b.

The two front guiding sliders 413a may be respectively mounted in the two guiding grooves 217a of the first fixing frame 21a, and may slide and rotate in the guiding grooves 217a, to implement a slidable and rotatable connection between the first pressing plate 41 and the first fixing frame 21a. The two rear guiding sliders 413b may be respectively mounted in the two guiding grooves 217b of the first fixing frame 21b, and may slide and rotate in the guiding grooves 217b, to implement a slidable and rotatable connection between the first pressing plate 41 and the first fixing frame 21b. The two middle guiding sliders 413c may be respectively mounted in the two guiding grooves 213c of the first fixing frame 21c, and may slide and rotate in the guiding grooves 213c, to implement a slidable and rotatable connection between the first pressing plate 41 and the first fixing frame 21c.

The second pressing plate 42 and the first pressing plate 41 have a same structure. The second pressing plate 42 includes a support portion 421, an assistance portion 422, and a guiding slider 423, where the assistance portion 422 and the guiding slider 423 are both fixedly connected to the support portion 421. For structures of the support portion 421, the assistance portion 422, and the guiding slider 423, refer to related description of the support portion 411, the assistance portion 412, and the guiding slider 413 in the first pressing plate 41 in the above, and details are not described herein again. The assistance portion 422 is provided with a sliding hole 424.

The second pressing plate swing arm 44 and the first pressing plate swing arm 43 have a same structure. In this embodiment, there are four second pressing plate swing arms 44, and the four second pressing plate swing arms 44 are respectively a second front pressing plate swing arm 44a, a second rear pressing plate swing arm 44b, and second middle pressing plate swing arms 44c, where there are two second middle pressing plate swing arms 44c.

A connection portion 442a of the second front pressing plate swing arm 44a is provided with an assembly hole 444a. A structure of a sliding portion 443a in the second front pressing plate swing arm 44a is adapted to a structure of the sliding hole 424 of a front assistance portion 422a. The sliding portion 443a may run through the sliding hole 424 of the front assistance portion 422a, and may slide relative to the second pressing plate 42 in the sliding hole 424 of the front assistance portion 422a, to implement a slidable connection between the second front pressing plate swing arm 44a and the second pressing plate 42. A structure of a rotating portion 441a of the second front pressing plate swing arm 44a is adapted to a structure of the second engagement groove 106a. The rotating portion 441a may be mounted in the second engagement groove 106a (as shown in FIG. 8), and may slide and rotate in the second engagement groove 106a, to implement a rotatable connection between the second front pressing plate swing arm 44a and the base 10. In this case, the rotating portion 441a and the second engagement groove 106a are coaxial. A rotation center of the second front pressing plate swing arm 44a relative to the base 10 is parallel to the Y-axis direction, and is disposed at intervals with the rotation center of the first front pressing plate swing arm 43a relative to the base 10.

It may be understood that, since the base 10 is an integrally formed structural member, the second engagement groove 106a does not need to be formed through cooperation of a shaft cover and a holder. In the foldable mechanism 130, a sum of a thickness of the second engagement groove 106a and a thickness of the rotating portion 441a is relatively small, so that space occupied by the foldable mechanism 130 can be reduced, which is conducive to implement a light and thin design of the foldable mechanism 130.

The second rear pressing plate swing arm 44b and the second front pressing plate swing arm 44a have a same structure. A connection portion 442b of the second rear pressing plate swing arm 44b is provided with an assembly hole 444b. A structure of a sliding portion 443b of the second rear pressing plate swing arm 44b is adapted to a structure of the sliding hole 424 of a rear assistance portion 422b. The sliding portion 443b may run through the sliding hole 424 of the rear assistance portion 422b, and may slide relative to the second pressing plate 42 in the sliding hole 424 of the rear assistance portion 422b, to implement a slidable connection between the second rear pressing plate swing arm 44b and the second pressing plate 42. A structure of a rotating portion 441b of the second rear pressing plate swing arm 44b is adapted to a structure of the second engagement groove 106b (as shown in FIG. 9). The rotating portion 441b is mounted in the second engagement groove 106b, and may slide and rotate in the second engagement groove 106b, to implement a slidable and rotatable connection between the second rear pressing plate swing arm 44b and the base 10. In this case, the rotating portion 441b and the second engagement groove 106b are coaxial. A rotation center of the second rear pressing plate swing arm 44b relative to the base 10 is parallel to the Y-axis direction, and is coaxial with the rotation center of the second front pressing plate swing arm 44a relative to the base 10.

The second middle pressing plate swing arm 44c and the second front pressing plate swing arm 44a have a same structure. A connection portion 442c of the second middle pressing plate swing arm 44c is provided with an assembly hole 444c. A structure of a sliding portion 443c in the second middle pressing plate swing arm 44c is adapted to a structure of the sliding hole 424 of a middle assistance portion 422c. The sliding portions 443c of the two second middle pressing plate swing arms 44c may respectively run through the sliding holes 424 of the two middle assistance portions 422c, and may slide relative to the second pressing plate 42 in the sliding holes 424, to implement a slidable connection between each of the two second middle pressing plate swing arms 44c and the second pressing plate 42. A structure of a rotating portion 441c of the second middle pressing plate swing arm 44c is adapted to a structure of the second engagement groove 106c (as shown in FIG. 10). The rotating portions 441c of the two second middle pressing plate swing arms 44c may be respectively mounted in one second engagement groove 106c, and may slide and rotate in the second engagement grooves 106c, to implement a rotatable connection between the two second middle pressing plate swing arms 44c and the base 10. In this case, the rotating portion 441c and the second engagement groove 106c are coaxial. A rotation center of the second middle pressing plate swing arm 44c relative to the base 10 is parallel to the Y-axis direction, and is coaxial with the rotation center of the second front pressing plate swing arm 44*a* relative to the base 10.

Refer to FIG. 11, FIG. 13, and FIG. 15 together, in this embodiment, the front side of the support portion 421 may be received in the receiving notch 221*a* of the second fixing frame 22*a*, the rear side of the support portion 421 may be received in the receiving notch 221*b* of the second fixing frame 22*b*, and the middle portion of the support portion 421 may be received in the receiving notch 221*c* of the second fixing frame 22*c*.

The front assistance portion 422*a* may be received in the avoidance groove 226*a* of the second fixing frame 22*a*. The sliding hole 424 of the front assistance portion 422*a* is in communication with the sliding hole 2261*a* of the second fixing frame 22*a*, and the sliding portion 443*a* of the second front pressing plate swing arm 44*a* may also run through the sliding hole 2261*a* of the second fixing frame 22*a* and may slide relative to the second fixing frame 22*a* in the sliding hole 2261*a*.

The rear assistance portion 422*b* may be received in the avoidance groove 226*b* of the second fixing frame 22*b*. The sliding hole 424 of the rear assistance portion 422*b* is in communication with the sliding hole 2261*b* of the second fixing frame 22*b*, and the sliding portion 443*b* of the second rear pressing plate swing arm 44*b* may also run through the sliding hole 2261*a* of the second fixing frame 22*b* and may slide relative to the second fixing frame 22*b* in the sliding hole 2261*a*.

The two front guiding sliders 423*a* may be respectively mounted in the two guiding grooves 227*a* of the second fixing frame 22*a*, and may slide and rotate in the guiding grooves 227*a*, to implement a slidable and rotatable connection between the second pressing plate 42 and the second fixing frame 22*a*. The two rear guiding sliders 423*b* may be respectively mounted in the two guiding grooves 227*b* of the second fixing frame 22*b*, and may slide and rotate in the guiding grooves 227*b*, to implement a slidable and rotatable connection between the second pressing plate 42 and the second fixing frame 22*b*. The two middle guiding sliders 423*c* may be respectively mounted in the two guiding grooves 223*c* of the second fixing frame 22*c*, and may slide and rotate in the guiding grooves 223*c*, to implement a slidable and rotatable connection between the second pressing plate 42 and the second fixing frame 22*c*.

It should be noted that, engagement relationships between the pressing plate assembly 40 and the first connection assembly 20*a*, the second connection assembly 20*b*, and the third connection assembly 20*c* are approximately the same. To avoid repetition, description is provided below by using the engagement relationship between the pressing plate 40 and the first connection assembly 20*a* as an example.

When the first fixing frame 21*a* and the second fixing frame 22*a* rotate relative to the base 10 (as shown in FIG. 7), the first fixing frame 21*a* drives the first pressing plate 41 to slide and rotate relative to the first fixing frame 21*a*, and further drives the first pressing plate 41 to slide relative to the first pressing plate swing arm 43, to drive the first pressing plate 41 and the first pressing plate swing arm 43 to rotate relative to the base 10; and the second fixing frame 22*a* drives the second pressing plate 42 to slide and rotate relative to the second fixing frame 22*a*, and further drives the second pressing plate 42 to slide relative to the second pressing plate swing arm 44, to drive the second pressing plate 42 and the second pressing plate swing arm 44 to rotate relative to the base 10, thereby implementing mutual switching of the pressing plate assembly 40 between the folded state and the flattened state.

Figure 19:
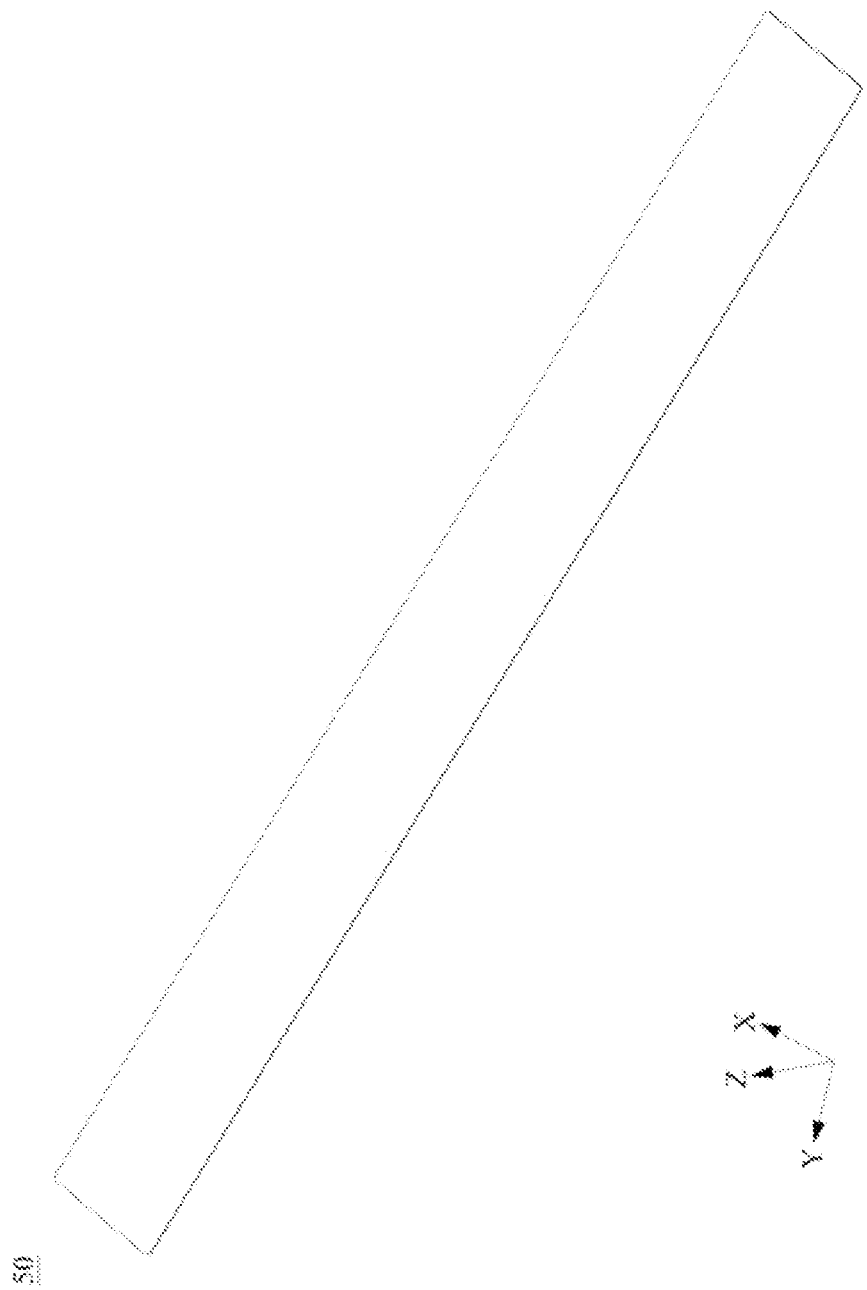
FIG. 19 is a schematic structural diagram of a support plate in the foldable mechanism shown in FIG. 6.
Figure 20:
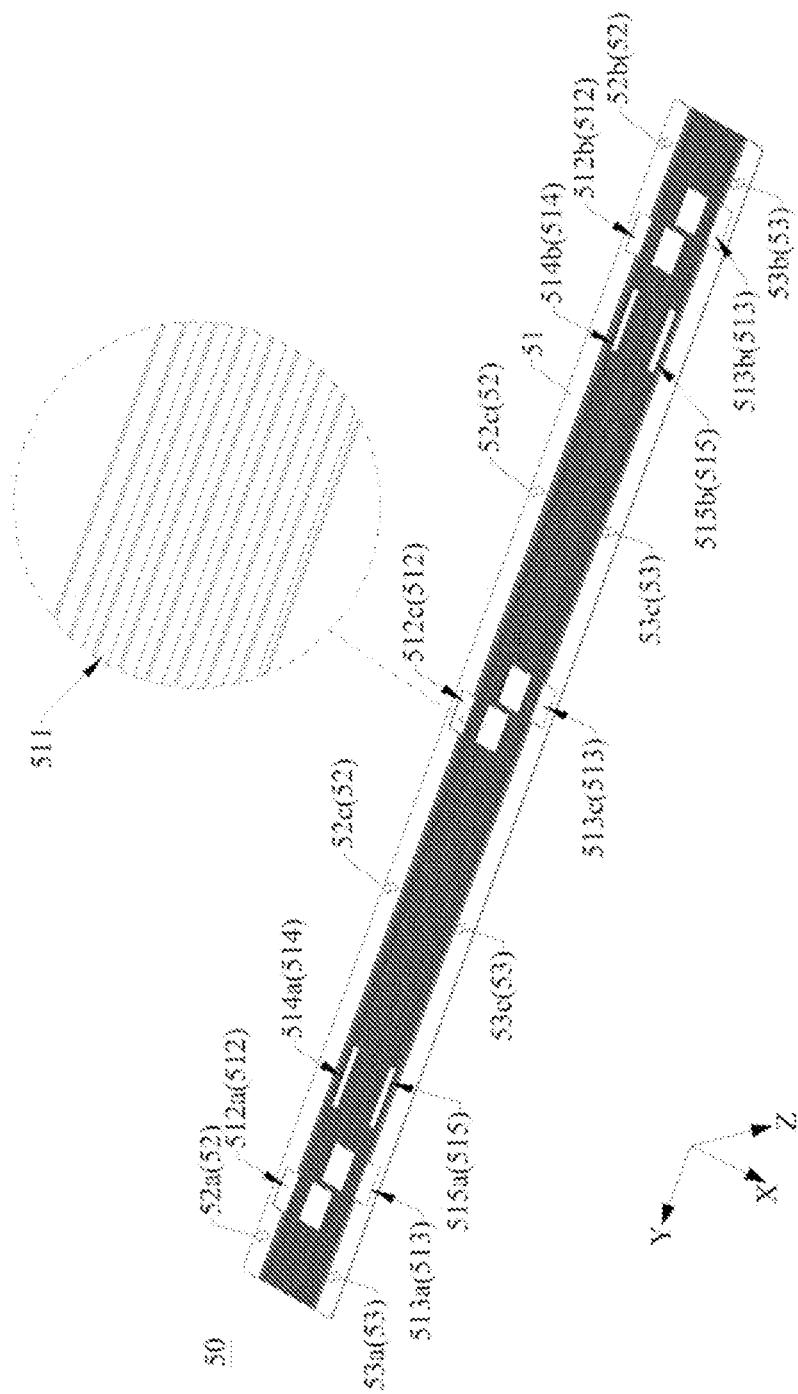
FIG. 20 is a schematic structural diagram of the support plate shown in FIG. 19 from another perspective.

Refer to FIG. 19 and FIG. 20, FIG. 19 is a schematic structural diagram of the flexible support plate 50 in the foldable mechanism 130 shown in FIG. 6, and FIG. 20 is a schematic structural diagram of the flexible support plate 50 shown in FIG. 19 from another perspective.

The flexible support plate 50 includes a flexible support portion 51, a first fixing portion 52, and a second fixing portion 53, where the first fixing portion 52 and the second fixing portion 53 are both fixedly connected to the flexible support portion 51. The flexible support plate 50 may be an integrally formed structural member, to reduce a quantity of components of the flexible support plate 50. In this way, assembly of the flexible support plate 50 is facilitated, and manufacturing costs of the flexible support plate 50 may also be reduced. It may be understood that, a partial thickness of the flexible support plate 50 may be very thin, to reduce a thickness of the flexible support plate 50, which is conducive to reduce a thickness of the foldable mechanism 130, and implements a light and thin design of the foldable mechanism 130.

The flexible support portion 51 is in a shape of a strip-shaped plate. The flexible support portion 51 extends in the Y-axis direction and may bend around the Y-axis direction. The flexible support portion 51 is provided with a plurality of strip-shaped grooves 511, and an opening of each strip-shaped groove 511 is located on a bottom surface of the flexible support portion 51, to ensure the integrity of a top surface of the flexible support portion 51. Specifically, the opening of each strip-shaped groove 511 is located in a middle region of the bottom surface of the flexible support portion 51. The strip-shaped groove 511 is recessed in a direction from the bottom surface to the top surface of the flexible support portion 51 (the Z-axis negative direction shown in the figure), and runs through a front side surface and a rear side surface of the flexible support portion 51. In the X-axis direction, the plurality of strip-shaped grooves 511 are parallel to each other and are arranged at intervals. An extending direction of the strip-shaped groove 511 is parallel to the Y-axis direction, to improve the flexibility of the flexible support portion 51, which is conducive to bending of the flexible support portion 51 in the Y-axis direction. In some other embodiments, openings of the plurality of strip-shaped grooves 511 may alternatively be located on the top surface of the flexible support portion 51.

In addition, the flexible support portion 51 is further provided with a first avoidance groove 512, a second avoidance groove 513, a third avoidance groove 514, and a fourth avoidance groove 515. Openings of the first avoidance groove 512, the second avoidance groove 513, the third avoidance groove 514, and the fourth avoidance groove 515 are all located on the bottom surface of the flexible support portion 51, and are all in communication with one or more strip-shaped grooves 511.

In this embodiment, there are three first avoidance grooves 512, and the first avoidance grooves 512 are all located on a left side of the flexible support portion 51. In the Y-axis direction, the three first avoidance grooves 512 are arranged at intervals. The three first avoidance grooves 512 are respectively a first front avoidance groove 512*a*, a first rear avoidance groove 512*b*, and a first middle avoidance groove 512*c*. The first front avoidance groove 512*a* is located on a front side of the flexible support portion 51, the first rear avoidance groove 512*b* is located on a rear side of the flexible support portion 51, and the first middle avoidance groove 512c is located on a middle portion of the flexible support portion 51.

There are three second avoidance grooves 513, and the three second avoidance grooves 513 are all located on a right side of the flexible support portion 51. In the Y-axis direction, the three second avoidance grooves 513 are arranged at intervals. The three second avoidance grooves 513 are respectively a second front avoidance groove 513a, a second rear avoidance groove 513b, and a second middle avoidance groove 513c. The second front avoidance groove 513a is located on the front side of the flexible support portion 51, is located on one side of the first front avoidance groove 512a facing the Y-axis negative direction, and is disposed at intervals with the first front avoidance groove 512a. The second rear avoidance groove 513b is located on the rear side of the flexible support portion 51, is located on one side of the first rear avoidance groove 512b facing the Y-axis negative direction, and is disposed at intervals with the first rear avoidance groove 512b. The second middle avoidance groove 513c is located on the middle portion of the flexible support portion 51, is located on one side of the first middle avoidance groove 512c facing the Y-axis negative direction, and is disposed at intervals with the first middle avoidance groove 512c.

There are two third avoidance grooves 514 and two fourth avoidance grooves 515. The two third avoidance grooves 514 are respectively a third front avoidance groove 514a and a third rear avoidance groove 514b, and the two fourth avoidance grooves 515 are respectively a fourth front avoidance groove 515a and a fourth rear avoidance groove 515b. The third front avoidance groove 514a and the fourth front avoidance groove 515a are both located on the front side of the flexible support portion 51, are both located on one side of the second front avoidance groove 513a away from the first front avoidance groove 512a, and are both disposed at intervals with the second front avoidance groove 513a. The third rear avoidance groove 514b and the fourth rear avoidance groove 515b are both located on the rear side of the flexible support portion 51, are both located on one side of the second rear avoidance groove 513b away from the first rear avoidance groove 512b, and are both disposed at intervals with the second rear avoidance groove 513b. In the X-axis direction, the third front avoidance groove 514a and the fourth front avoidance groove 515a are disposed at intervals and opposite to each other, and the third rear avoidance groove 514b and the fourth rear avoidance groove 515b are disposed at intervals and opposite to each other.

The first fixing portion 52 is fixedly connected to the bottom surface of the flexible support portion 51, and is disposed at intervals with the strip-shaped groove 511. Specifically, the first fixing portion 52 is fixedly connected to an edge region of a bottom portion of the flexible support portion 51. The first fixing portion 52 extends in a direction from the bottom surface to be away from the top surface of the flexible support portion 51 (the Z-axis positive direction shown in the figure). For example, the first fixing portion 52 is in a shape of a cylinder.

In this embodiment, there are four first fixing portions 52, the four first fixing portions 52 are all fixedly connected to the left side of the flexible support portion 51, and in the Y-axis direction, the four first fixing portions 52 are arranged at intervals. The four first fixing portions 52 are respectively a first front fixing portion 52a, a first rear fixing portion 52b, and first middle fixing portions 52c, where there are two first middle fixing portions 52c. The first front fixing portion 52a is fixedly connected to the front side of the flexible support portion 51, is located on one side of the first front avoidance groove 512a away from the third front avoidance groove 514a, and is disposed at intervals with the first front avoidance groove 512a. The first rear fixing portion 52b is fixedly connected to the rear side of the flexible support portion 51, is located on one side of the first rear avoidance groove 512b away from the third rear avoidance groove 514b, and is disposed at intervals with the second rear avoidance groove 513b. The two first middle fixing portions 52c are both fixedly connected to the middle portion of the flexible support portion 51, are respectively located on two opposite sides of the first middle avoidance groove 512c, and are both disposed at intervals with the first middle avoidance groove 512c.

The second fixing portion 53 is fixedly connected to the bottom surface of the flexible support portion 51, and is disposed at intervals with both the strip-shaped groove 511 and the first fixing portion 52. In this embodiment, for a structure of the second fixing portion 53 and a relationship between the second fixing portion 53 and the flexible support portion 51, refer to related description of the first fixing portion 52, and details are not described herein again. There are four second fixing portions 53, and the four second fixing portions 53 are all fixedly connected to the right side of the flexible support portion 51. In the Y-axis direction, the four second fixing portions 53 are arranged at intervals. The four second fixing portions 53 are respectively a second front fixing portion 53a, a second rear fixing portion 53b, and second middle fixing portions 53c, where there are two second middle fixing portions 53c.

Refer to FIG. 17 and FIG. 18 together, the first front fixing portion 52a is mounted in the assembly hole 434a of the first front pressing plate swing arm 43a, the first rear fixing portion 52b is mounted in the assembly hole 434b of the first rear pressing plate swing arm 43b, the two first middle fixing portions 52c are respectively mounted in the assembly holes 434c of the two first middle pressing plate swing arms 43c, the second front fixing portion 53a is mounted in the assembly hole 444a of the second front pressing plate swing arm 44a, the second rear fixing portion 53b is mounted in the assembly hole 444b of the second rear pressing plate swing arm 44b, and the two second middle fixing portions 53c are respectively mounted in the assembly holes 444c of the two second middle pressing plate swing arms 44c, to implement assembly between the flexible support plate 50 and the pressing plate assembly 40.

When the pressing plate assembly 40 is switched between the folded state and the unfolded state, the first pressing plate swing arm 43 and the second pressing plate swing arm 44 both rotate relative to the base 10 (as shown in FIG. 7), to drive the first fixing portion 52 and the second fixing portion 53 to rotate relative to the base 10, and further drive the flexible support portion 51 to be relatively folded or unfolded. In other words, the flexible support plate 50 may be relatively folded or unfolded under driving of the pressing plate assembly 40. That is, the flexible support plate 50 may be switched between the folded state and the unfolded state under driving of the pressing plate assembly 40.

It may be understood that, when the first pressing plate swing arm 43 and the second pressing plate swing arm 44 rotate relative to the base 10, both the first pressing plate swing arm 43 and the second pressing plate swing arm 44 may generate a relative displacement with the base 10. In this case, the displacements generated by the first pressing plate swing arm 43 and the second pressing plate swing arm 44 may match a size change generated due to bending of the flexible support plate 50, thereby ensuring that the flexible support plate 50 is maintained in a flat state, preventing the flexible support plate 50 from generating wrinkles, and improving the use reliability of the foldable mechanism 130.

Figure 21:
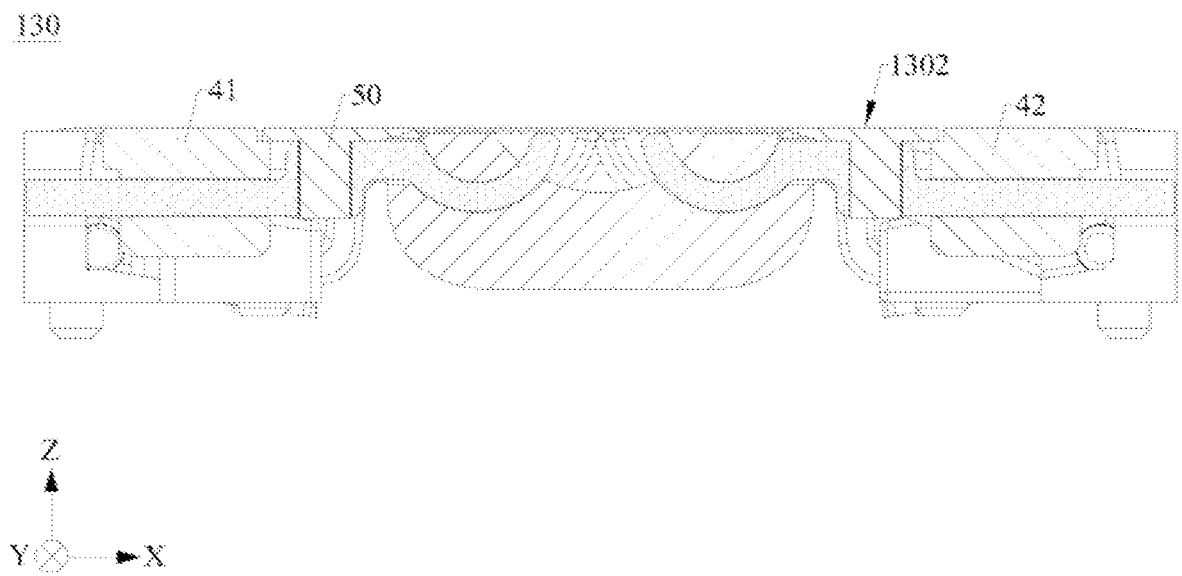
FIG. 21 is a schematic cross-sectional structural view of the foldable mechanism shown in FIG. 5 cut along I-I.
Figure 22:
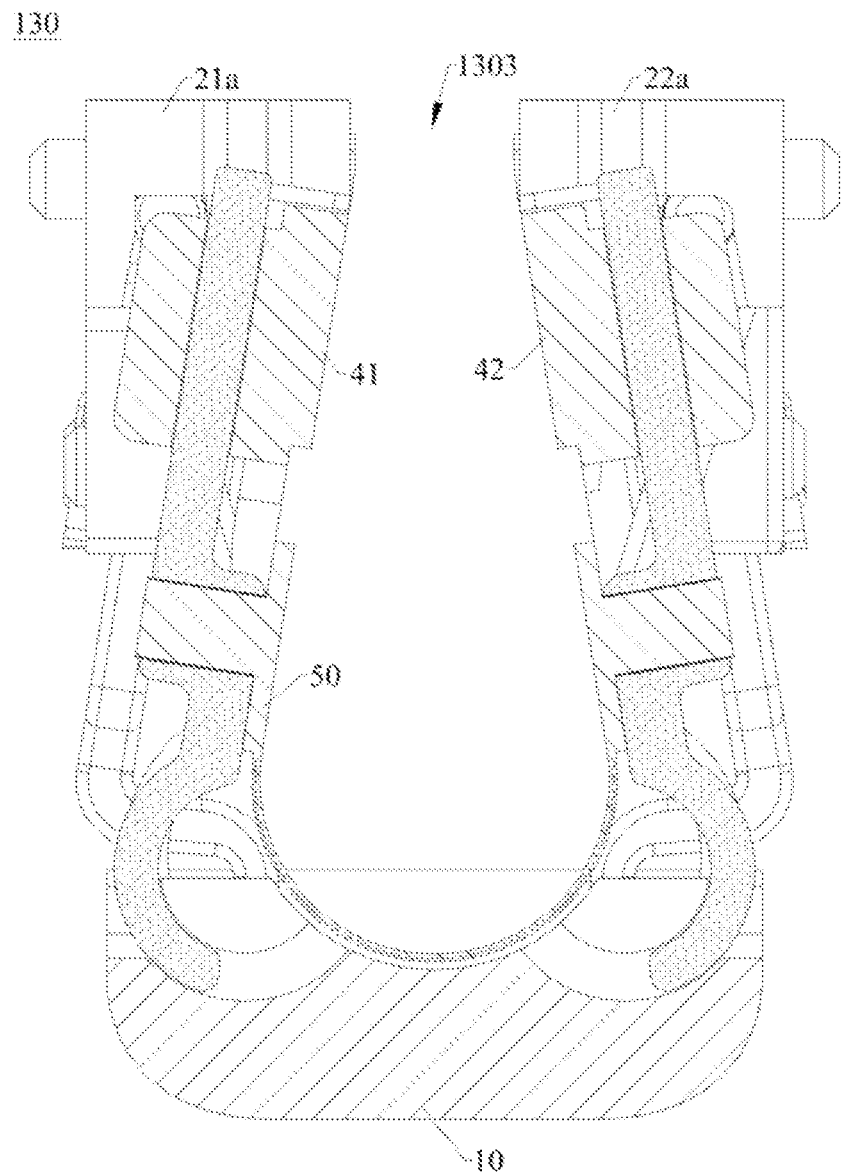
FIG. 22 is a schematic structural diagram of the foldable mechanism shown in FIG. 21 in a folded state.

Refer to FIG. 21 and FIG. 22 together, FIG. 21 is a schematic cross-sectional structural view of the foldable mechanism 130 shown in FIG. 5 cut along I-I, and FIG. 22 is a schematic structural diagram of the foldable mechanism 130 shown in FIG. 21 in a folded state. Being cut along I-I refers to being cut along a place in which the line I-I is located, and similar description in this application may be understood as the same meaning.

When the foldable mechanism 130 is in a flattened state, the pressing plate assembly 40 is in a flattened state, the first pressing plate 41 and the second pressing plate 42 are respectively located on two sides of the base 10, the flexible support plate 50 is relatively flattened, the top surface of the first pressing plate 41 (namely, the top surface of the support portion 411), the top surface of the second pressing plate 42 (namely, the top surface of the support portion 421), and the top surface of the flexible support plate 50 (namely, the top surface of the flexible support portion 51) are flush with each other, and the top surface of the first pressing plate 41, the top surface of the second pressing plate 42, and the top surface of the flexible support plate 50 form a support surface 1302.

The first front avoidance groove 512*a* avoids the sliding portion 232*a* of the first primary swing arm 23*a* (as shown in FIG. 11), the first rear avoidance groove 512*b* avoids the sliding portion 232*b* of the first primary swing arm 23*b* (as shown in FIG. 13), and the first middle avoidance groove 512*c* avoids the sliding portion 232*c* of the first primary swing arm 23*c* (as shown in FIG. 15). The second front avoidance groove 513*a* avoids the sliding portion 242*a* of the second primary swing arm 24*a* (as shown in FIG. 11), the second rear avoidance groove 513*b* avoids the sliding portion 242*b* of the second primary swing arm 24*b* (as shown in FIG. 13), and the second middle avoidance groove 513*c* avoids the sliding portion 242*c* of the second primary swing arm 24*c* (as shown in FIG. 15).

The third front avoidance groove 514*a* avoids the rotating portion 251*a* of the first secondary swing arm 25*a* (as shown in FIG. 11), and the third rear avoidance groove 514*b* avoids the rotating portion 251*b* of the first secondary swing arm 25*b* (as shown in FIG. 13). The fourth front avoidance groove 515*a* avoids the rotating portion 261*a* of the second secondary swing arm 26*a* (as shown in FIG. 11), and the fourth rear avoidance groove 515*b* avoids the rotating portion 261*b* of the second secondary swing arm 26*b* (as shown in FIG. 13).

It may be understood that, when the flexible support plate 50 is in the flattened state, arrangement of the avoidance grooves in the flexible support plate 50 may avoid interference generated between the flexible support plate 50 and the swing arms in the connection assembly 20, so that the flexible support portion 51 may not be abutted against by the swing arms and protrude out relative to the top surface of the first pressing plate 41 and the top surface of the second pressing plate 42, thereby ensuring that the top surface of the flexible support plate 50 is flush with the top surface of the first pressing plate 41 and the top surface of the second pressing plate 42.

When the foldable mechanism 130 is in the folded state, the pressing plate assembly 40 is in the folded state, the first pressing plate 41 and the second pressing plate 42 are disposed opposite to each other, the flexible support plate 50 bends and are folded, and the first fixing frame (for example, the first fixing frame 21*a* shown in FIG. 11, the first fixing frame 21*b* shown in FIG. 13, and the first fixing frame 21*c* shown in FIG. 15), the second fixing frame (for example, the second fixing frame 22*a* shown in FIG. 11, the second fixing frame 22*b* shown in FIG. 13, and the second fixing frame 22*c* shown in FIG. 15), the first pressing plate 41, the second pressing plate 42, and the flexible support plate 50 enclose to form an avoidance space 1303. A cross section of the avoidance space 1303 is in a "droplet" shape. It should be noted that, the cross section of the avoidance space 1303 refers to a section after the avoidance space is cut along a plane X-Z.

The bottom portion of the flexible support plate 50 is received in the avoidance groove 101 of the base 10 (as shown in FIG. 7). It may be understood, the design of the avoidance groove 101 in the base 10 can avoid the bottom portion of the flexible support plate 50, and avoid interference generated between the base 10 and the flexible support plate 50, helping forming the "droplet"-shaped avoidance space 1303.

Figure 23:
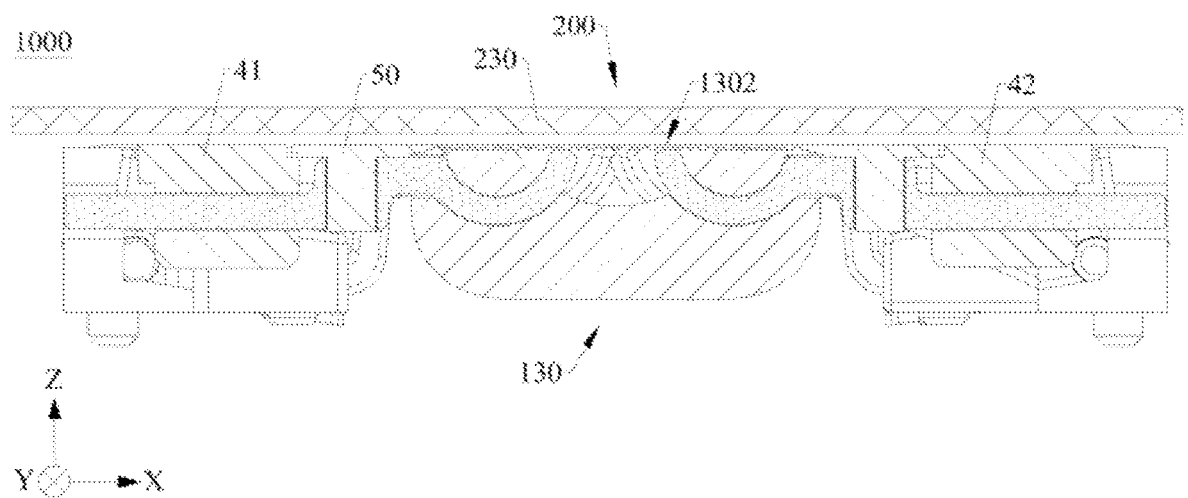
FIG. 23 is a schematic partial cross-sectional structural diagram of the foldable terminal shown in FIG. 2.
Figure 24:
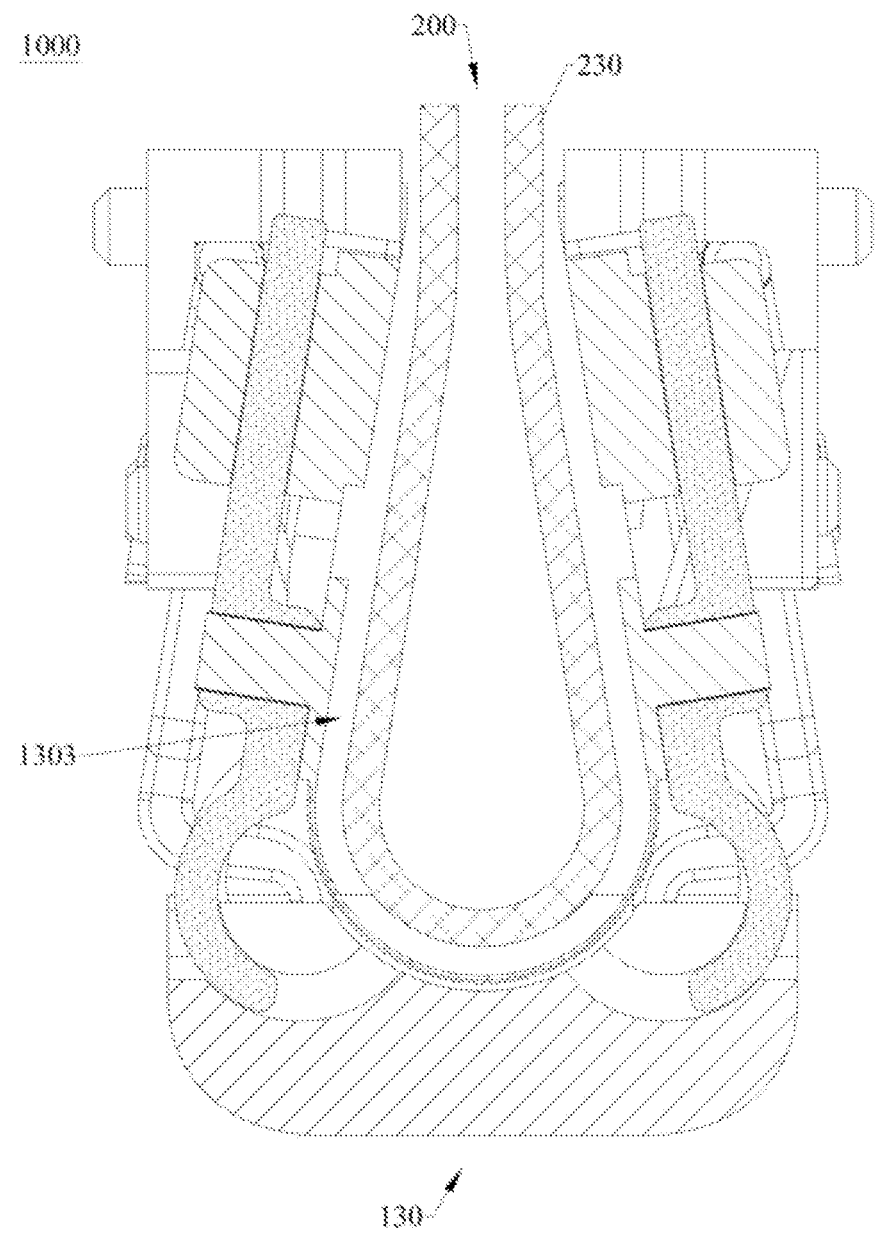
FIG. 24 is a schematic structural diagram of the foldable terminal shown in FIG. 23 in a folded state.

Refer to FIG. 3, FIG. 23, and FIG. 24, FIG. 23 is a schematic partial cross-sectional structural view of the foldable terminal 1000 shown in FIG. 2, and FIG. 24 is a schematic structural diagram of the foldable terminal 1000 shown in FIG. 3 in a folded state. In the foldable terminal 1000 shown in FIG. 23 and FIG. 24, only the foldable mechanism 130 and the foldable part 230 of the display screen 200 are shown.

Specifically, the first fixing frame 21*a* (as shown in FIG. 11), the first fixing frame 21*b* (as shown in FIG. 13), and the first fixing frame 21*c* (as shown in FIG. 15) are fixedly connected to the first housing 110, and the second fixing frame 22*a* (as shown in FIG. 11), the second fixing frame 22*b* (as shown in FIG. 13), and the second fixing frame 22*c* (as shown in FIG. 15) are fixedly connected to the second housing 120. For example, the first fixing frame 21*a*, the first fixing frame 21*b*, and the first fixing frame 21*c* may be fixedly connected to the first housing 110 through a fastener such as a screw or a bolt, and the second fixing frame 22*a*, the second fixing frame 22*b*, and the second fixing frame 22*c* may be fixedly connected to the second housing 120 through a fastener such as a screw or a bolt.

In this case, the support surface 1302 formed by the first pressing plate 41, the second pressing plate 42, and the flexible support plate 50 can support the foldable part 230 of the display screen 200. Therefore, a good display effect of the display screen 200 can be ensured, and in a case that the foldable part 230 is touched, the foldable part 230 is not easily damaged or recessed due to touching of an external force, thereby improving the use reliability of the display screen 200. The support surface 1302 may be flush with the top surface of the first housing 110 and the top surface of the second housing 120, so that the first pressing plate 41, the second pressing plate 42, and the flexible support plate 50 may jointly support the display screen 200 with the first housing 110 and the second housing 120, thereby implementing effective support of the flattened foldable apparatus 100 to the display screen 200.

It may be understood that, the flexible support plate 50 is not provided with an opening. Therefore, the top surface of the flexible support plate 50 is a complete flat surface, and an area of the support surface 1302 is relatively large, so that the foldable part 230 can be well supported, thereby improving a support effect of the flexible support plate 50 to the foldable part 230.

When the foldable terminal 1000 is in the folded state, the foldable part 230 of the display screen 200 is located on an inner side of the foldable mechanism 130. Specifically, the foldable part 230 is located in the avoidance space 1303. In this case, the foldable mechanism 130 may avoid an R angle formed when the foldable part 230 bends, so that the foldable part 230 does not bend at a relatively large angle, thereby avoiding a poor phenomenon such as a crease in the display screen 200, and helping to prolong a service life of the display screen 200.

In the foldable mechanism 130 used by the foldable terminal 1000 shown in this embodiment, the display screen 200 is supported by using the flexible support plate 50, and the flexible support plate 50 is directly mounted on the first pressing plate swing arm 43 and the second pressing plate swing arm 44, so that assembly of the flexible support plate 50 can be implemented without springs. Therefore, a quantity of components of the foldable mechanism 130 is reduced, an assembly process of the foldable mechanism 130 is simplified, a problem of a relatively poor assembly precision is resolved, and the structure of the foldable mechanism 130 is further simplified, so that the structure of the foldable mechanism 130 is simple, which is conducive to a lightweight design of the foldable terminal 1000.

The foregoing descriptions are merely specific implementations of this application, but are not intended to limit the protection scope of this application. Any variation or replacement readily figured out by a person skilled in the art within the technical scope disclosed in this application shall fall within the protection scope of this application. The embodiments in this application and features in the embodiments may be combined with each other in a case that no conflict occurs. Therefore, the protection scope of this application shall be subject to the protection scope of the claims.

What is claimed is:

1. A foldable mechanism, comprising:
   a base;
   a first pressing plate swing arm;
   a second pressing plate swing arm; and
   a flexible support plate,
   wherein a first rotating portion of the first pressing plate swing arm is rotatably connected to the base, the flexible support plate is mounted on the first pressing plate swing arm and bends under driving of the first pressing plate swing arm,
   wherein a bending direction of the flexible support plate is parallel to a first rotation axis of the first pressing plate swing arm relative to the base,
   wherein a second rotating portion of the second pressing plate swing arm is rotatably connected to the base, the flexible support plate is further mounted on the second pressing plate swing arm and bends under driving of the second pressing plate swing arm, and the bending direction of the flexible support plate is further parallel to a second rotation axis of the second pressing plate swing arm relative to the base,
   wherein a first connection portion of the first pressing plate swing arm is provided with a first assembly hole, a second connection portion of the second pressing plate swing arm is provided with a second assembly hole, and the flexible support plate comprises a flexible support portion, a first fixing portion, and a second fixing portion, and
   wherein the flexible support portion is provided with a plurality of strip-shaped grooves, the plurality of strip-shaped grooves are parallel to each other and arranged at intervals, a corresponding extending direction of each of the strip-shaped grooves is parallel to the bending direction of the flexible support plate, the first fixing portion and the second fixing portion are fixedly connected to a bottom surface of the flexible support portion, the first fixing portion is mounted in the first assembly hole of the first pressing plate swing arm, and the second fixing portion is mounted in the second assembly hole of the second pressing plate swing arm.

2. The foldable mechanism according to claim 1, wherein the first pressing plate swing arm is slidably and rotatably connected to the base.

3. The foldable mechanism according to claim 1, wherein the second rotating portion of the second pressing plate swing arm is slidably and rotatably connected to the base.

4. The foldable mechanism according to claim 1, wherein openings of the plurality of strip-shaped grooves are located on the bottom surface of the flexible support portion.

5. The foldable mechanism according to claim 1,
   wherein the foldable mechanism further comprises a first pressing plate and a second pressing plate, the first pressing plate is slidably connected to a first sliding portion of the first pressing plate swing arm, and the second pressing plate is slidably connected to a second sliding portion of the second pressing plate swing arm, and
   wherein the foldable mechanism is in a flattened state, and the first pressing plate and the second pressing plate are respectively located on two opposite sides of the base, and a first top surface of the first pressing plate and a second top surface of the second pressing plate are flush with a top surface of the flexible support plate.

6. The foldable mechanism according to claim 5, wherein the foldable mechanism further comprises a first fixing frame and a second fixing frame, the first fixing frame is slidably and rotatably connected to the first pressing plate, and the second fixing frame is slidably and rotatably connected to the second pressing plate, and
   wherein the foldable mechanism is in a folded state, and the first pressing plate and the second pressing plate are disposed opposite to each other, the first fixing frame, the second fixing frame, the first pressing plate, the second pressing plate, and the flexible support plate encloses to form an avoidance space, and the avoidance space is in a droplet shape.

7. The foldable mechanism according to claim 6, wherein the base is provided with an avoidance groove, the foldable mechanism is in the folded state, and the avoidance groove is configured to avoid a bottom portion of the flexible support plate.

8. The foldable mechanism according to claim 6, further comprising a first primary swing arm and a second primary swing arm, wherein a third rotating portion of the first primary swing arm is rotatably connected to the first fixing frame, a third sliding portion of the first primary swing arm is slidably and rotatably connected to the base, a fourth rotating portion of the second primary swing arm is rotatably connected to the second fixing frame, and a fourth sliding portion of the second primary swing arm is slidably and rotatably connected to the base.

9. The foldable mechanism according to claim 8,
   wherein the flexible support portion is further provided with a first avoidance groove and a second avoidance groove, and openings of the first avoidance groove and the second avoidance groove are both located on the bottom surface of the flexible support portion, and
   wherein the foldable mechanism is in the flattened state, the first avoidance groove is configured to avoid the third sliding portion of the first primary swing arm, and the second avoidance groove is configured to avoid the fourth sliding portion of the second primary swing arm.

10. The foldable mechanism according to claim 6, further comprising a first secondary swing arm and a second secondary swing arm, wherein a fifth sliding portion of the first secondary swing arm is slidably connected to the first fixing frame, a fifth rotating portion of the first secondary swing arm is rotatably connected to the base, a sixth sliding portion of the second secondary swing arm is slidably connected to the second fixing frame, and a sixth rotating portion of the second secondary swing arm is rotatably connected to the base.

11. The foldable mechanism according to claim 10,
wherein the flexible support portion is further provided with a third avoidance groove and a fourth avoidance groove, and openings of the third avoidance groove and the fourth avoidance groove are both located on the bottom surface of the flexible support portion, and
wherein in a case that the foldable mechanism is in the flattened state, the third avoidance groove is configured to avoid the fifth rotating portion of the first secondary swing arm, and the fourth avoidance groove is configured to avoid the sixth rotating portion of the second secondary swing arm.

12. The foldable mechanism according to claim 1, wherein the base is an integrally formed structural member.

13. The foldable mechanism according to claim 12, wherein the base is provided with a first engagement groove, the first engagement groove is an arc-shaped groove, the first rotating portion of the first pressing plate swing arm is in a shape of an arc-shaped plate, and the first rotating portion of the first pressing plate swing arm is mounted in the first engagement groove and slides and rotates relative to the base in the first engagement groove.

14. A foldable terminal, comprising:
a first housing;
a second housing; and
a foldable mechanism, wherein the foldable mechanism is connected between the first housing and the second housing, the foldable mechanism including:
a base;
a first pressing plate swing arm;
a second pressing plate swing arm; and
a flexible support plate,
wherein a first rotating portion of the first pressing plate swing arm is rotatably connected to the base, the flexible support plate is mounted on the first pressing plate swing arm and bends under driving of the first pressing plate swing arm, and
wherein a bending direction of the flexible support plate is parallel to a first rotation axis of the first pressing plate swing arm relative to the base,
wherein a second rotating portion of the second pressing plate swing arm is rotatably connected to the base, the flexible support plate is further mounted on the second pressing plate swing arm and bends under driving of the second pressing plate swing arm, and the bending direction of the flexible support plate is further parallel to a second rotation axis of the second pressing plate swing arm relative to the base,
wherein a first connection portion of the first pressing plate swing arm is provided with a first assembly hole, a second connection portion of the second pressing plate swing arm is provided with a second assembly hole, and the flexible support plate comprises a flexible support portion, a first fixing portion, and a second fixing portion, and
wherein the flexible support portion is provided with a plurality of strip-shaped grooves, the plurality of strip-shaped grooves are parallel to each other and arranged at intervals, a corresponding extending direction of each of the strip-shaped grooves is parallel to the bending direction of the flexible support plate, the first fixing portion and the second fixing portion are fixedly connected to a bottom surface of the flexible support portion, the first fixing portion is mounted in the first assembly hole of the first pressing plate swing arm, and the second fixing portion is mounted in the second assembly hole of the second pressing plate swing arm.

15. The foldable terminal according to claim 14, further comprising a display screen,
wherein the display screen comprises a first display part, a second display part, and a foldable part, the foldable part is connected between the first display part and the second display part, the first display part is mounted in the first housing, the second display part is mounted in the second housing, and the foldable part and the foldable mechanism are disposed opposite to each other, and
wherein the foldable terminal is in an unfolded state, and a top surface of the flexible support plate supports the foldable part.

16. The foldable terminal according to claim 15, wherein the foldable terminal is in a folded state, and the foldable part is received in an avoidance space of the foldable mechanism.

17. The foldable terminal according to claim 14, wherein the first pressing plate swing arm is slidably and rotatably connected to the base.

18. A foldable mechanism, comprising:
a base;
a first pressing plate swing arm;
a second pressing plate swing arm; and
a flexible support plate,
wherein a first rotating portion of the first pressing plate swing arm is rotatably connected to the base, the flexible support plate is mounted on the first pressing plate swing arm and bends under driving of the first pressing plate swing arm,
wherein a bending direction of the flexible support plate is parallel to a first rotation axis of the first pressing plate swing arm relative to the base,
wherein a second rotating portion of the second pressing plate swing arm is rotatably connected to the base, the flexible support plate is further mounted on the second pressing plate swing arm and bends under driving of the second pressing plate swing arm, and the bending direction of the flexible support plate is further parallel to a second rotation axis of the second pressing plate swing arm relative to the base,
wherein the foldable mechanism further comprises a first pressing plate and a second pressing plate, the first pressing plate is slidably connected to a first sliding portion of the first pressing plate swing arm, and the second pressing plate is slidably connected to a second sliding portion of the second pressing plate swing arm, and
wherein the foldable mechanism is in a flattened state, and the first pressing plate and the second pressing plate are respectively located on two opposite sides of the base, and a first top surface of the first pressing plate and a second top surface of the second pressing plate are flush with a top surface of the flexible support plate.

19. The foldable mechanism according to claim 18, wherein the foldable mechanism further comprises a first fixing frame and a second fixing frame, the first fixing frame is slidably and rotatably connected to the first pressing plate, and the second fixing frame is slidably and rotatably connected to the second pressing plate, and wherein the foldable mechanism is in a folded state, and the first pressing plate and the second pressing plate are disposed opposite to each other, the first fixing frame, the second fixing frame, the first pressing plate, the second pressing plate, and the flexible support plate encloses to form an avoidance space, and the avoidance space is in a droplet shape.

20. The foldable mechanism according to claim 19, wherein the base is provided with an avoidance groove, the foldable mechanism is in the folded state, and the avoidance groove is configured to avoid a bottom portion of the flexible support plate.

\* \* \* \* \*